(12) United States Patent
Lambert et al.

(10) Patent No.: US 10,385,150 B2
(45) Date of Patent: Aug. 20, 2019

(54) CYCLOPROPENIUM POLYMERS AND METHODS FOR MAKING THE SAME

(71) Applicant: THE TRUSTEES OF COLUMBIA UNIVERSITY IN THE CITY OF NEW YORK, New York, NY (US)

(72) Inventors: Tristan Hayes Lambert, Monroe, NY (US); Luis M. Campos, New York, NY (US); Jeffrey Bandar, New York, NY (US); Emma Jane Dell, London (GB)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 15/676,686

(22) Filed: Aug. 14, 2017

(65) Prior Publication Data

US 2018/0215847 A1 Aug. 2, 2018

Related U.S. Application Data

(60) Division of application No. 14/611,166, filed on Jan. 30, 2015, now Pat. No. 9,758,606, which is a (Continued)

(51) Int. Cl.
*C08F 12/28* (2006.01)
*C08F 32/02* (2006.01)
(Continued)

(52) U.S. Cl.
CPC .............. *C08F 212/32* (2013.01); *C08F 8/02* (2013.01); *C08F 8/30* (2013.01); *C08F 8/32* (2013.01);
(Continued)

(58) Field of Classification Search
None
See application file for complete search history.

(56) References Cited

U.S. PATENT DOCUMENTS 2,970,098 A 1/1961 Ellis
3,779,989 A * 12/1973 Wadsworth ............... C08F 8/00
430/287.1
(Continued)

FOREIGN PATENT DOCUMENTS

WO WO/1995/024929 A2 9/1995
WO WO/2001/072280 A2 10/2001
(Continued)

OTHER PUBLICATIONS

Kerber and Shu's "Substituent Effects on Cyclopropenium Ions," JACS 1973, 95, 10, 3239-3245. (Year: 1973).*
(Continued)

*Primary Examiner* — Vu A Nguyen
(74) *Attorney, Agent, or Firm* — Hunton Andrews Kurth LLP

(57) ABSTRACT

The present invention provides, inter alia, a process for incorporating a cyclopropenium ion into a polymeric system. Processes for making cross-linked polymers, linear polymers, and dendritic polymers, as well as for incorporating a cyclopropenium ion onto a preformed polymer are also provided. Further provided are stable, polycationic compounds, various polymers that contain stable cyclopropenium cations, and substrates containing such polymers. The use of these polymers in water purification systems, antimicrobial coatings, ion-transport membranes, cell supports, drug delivery vehicles, and gene therapeutic vectors are also provided.

18 Claims, 20 Drawing Sheets

Related U.S. Application Data continuation-in-part of application No. PCT/US2013/052679, filed on Jul. 30, 2013.

(60) Provisional application No. 62/092,726, filed on Dec. 16, 2014, provisional application No. 61/677,837, filed on Jul. 30, 2012.

(51) Int. Cl.
<table>
<tr><td>C08F 212/32</td><td>(2006.01)</td></tr>
<tr><td>C08F 212/08</td><td>(2006.01)</td></tr>
<tr><td>C08F 112/32</td><td>(2006.01)</td></tr>
<tr><td>C08F 212/14</td><td>(2006.01)</td></tr>
<tr><td>C08F 12/26</td><td>(2006.01)</td></tr>
<tr><td>C08F 293/00</td><td>(2006.01)</td></tr>
<tr><td>C08F 8/02</td><td>(2006.01)</td></tr>
<tr><td>C08F 8/30</td><td>(2006.01)</td></tr>
<tr><td>C08F 8/32</td><td>(2006.01)</td></tr>
</table>

(52) U.S. Cl.
CPC ............ *C08F 12/26* (2013.01); *C08F 112/32* (2013.01); *C08F 212/08* (2013.01); *C08F 212/14* (2013.01); *C08F 293/005* (2013.01); C08F 2438/03 (2013.01)

(56) References Cited

U.S. PATENT DOCUMENTS

| | | | |
|---|---|---|---|
| 4,177,177 | A | 12/1979 | Vanderhoff et al. |
| 4,539,088 | A | 9/1985 | Kaneda et al. |
| 4,539,091 | A | 9/1985 | Kaneda et al. |
| 4,728,576 | A | 3/1988 | Gillberg-LaForce et al. |
| 5,069,156 | A | 12/1991 | Suzuki |
| 5,240,480 | A | 8/1993 | Thorogood et al. |
| 5,643,430 | A | 7/1997 | Gorzynski |
| 5,821,031 | A | 10/1998 | Hashimoto et al. |
| 5,844,192 | A | 12/1998 | Wright et al. |
| 6,402,917 | B1 | 6/2002 | Emery et al. |
| 6,461,491 | B1 | 10/2002 | Hryn et al. |
| 6,565,632 | B1 | 5/2003 | van Hassel et al. |
| 6,753,363 | B1 | 6/2004 | Harashina |
| 7,166,745 | B1 | 1/2007 | Chu et al. |
| 7,335,247 | B2 | 2/2008 | Stein et al. |
| 7,338,624 | B2 | 3/2008 | Chen et al. |
| 7,375,234 | B2 | 5/2008 | Sharpless et al. |
| 7,556,676 | B2 | 7/2009 | Nagabhushana et al. |
| 7,642,348 | B2 | 1/2010 | Bentwich et al. |
| 7,825,229 | B2 | 11/2010 | Bentwich et al. |
| 2002/0128234 | A1 | 9/2002 | Hubbel et al. |
| 2005/0013933 | A1 | 1/2005 | Chen et al. |
| 2005/0061663 | A1 | 3/2005 | Chen et al. |
| 2005/0183956 | A1 | 8/2005 | Katefidis |
| 2006/0049540 | A1 | 3/2006 | Hui et al. |
| 2007/0298006 | A1 | 12/2007 | Tomalia et al. |
| 2008/0269525 | A1 | 10/2008 | Bertrand et al. |
| 2009/0044864 | A1 | 2/2009 | Thompson et al. |
| 2010/0029750 | A1 | 2/2010 | Gupta et al. |
| 2010/0055189 | A1 | 3/2010 | Hubbell et al. |
| 2010/0197871 | A1 | 8/2010 | Finn et al. |
| 2010/0282689 | A1 | 11/2010 | Ganzl et al. |
| 2010/0314313 | A1 | 12/2010 | MacLaggan |
| 2011/0056876 | A1 | 3/2011 | Ide et al. |
| 2011/0067405 | A1 | 3/2011 | Armstrong et al. |
| 2011/0077365 | A1 | 3/2011 | Yu et al. |
| 2011/0114184 | A1 | 5/2011 | Brown et al. |
| 2011/0151566 | A1 | 6/2011 | Hedrick et al. |
| 2011/0294653 | A1 | 12/2011 | Carolan et al. |
| 2012/0111796 | A1 | 5/2012 | Anderson |
| 2012/0315322 | A1 | 12/2012 | Chakravarthy et al. |
| 2013/0030119 | A1 | 1/2013 | Wang et al. |
| 2013/0043434 | A1 | 2/2013 | Tierney et al. |
| 2013/0098448 | A1 | 4/2013 | Zhu et al. |
| 2013/0240850 | A1 | 9/2013 | Forrest et al. |
| 2013/0248831 | A1 | 9/2013 | Pan et al. |
| 2013/0337067 | A1 | 12/2013 | Prakash et al. |
| 2014/0224329 | A1 | 8/2014 | Congreve et al. |

FOREIGN PATENT DOCUMENTS

| | | |
|---|---|---|
| WO | WO/2009/015143 A1 | 1/2009 |
| WO | WO/2009/108822 A1 | 9/2009 |
| WO | WO/2010/067041 A1 | 6/2010 |
| WO | WO/2010/086406 A1 | 8/2010 |
| WO | WO/2012/156058 A1 | 11/2012 |
| WO | WO/2014/022365 A1 | 2/2014 |

OTHER PUBLICATIONS

Kesting, Robert E. et al.; "Synthetic Polymeric Membranes: A Structual Perspective," Wiley-Interscience Publication, Second Edition, pp. 1-358, 1985.

Porter, Mark C. "Thin Film Composite Reverse Osmosis Membranes," Handbook of Industrial Membrane Technology, pp. 307-348, 1990.

Afzali A, Dimitrakopoulos CD, Breen TL. High-performance, solution-processed organic thin film transistors from a novel pentacene precursor. J Am Chem Soc. Jul. 31, 2002;124(30):8812-3.

Alguire EC, Subotnik JE, Damrauer NH. Exploring non-Condon effects in a covalent tetracene dimer: how important are vibrations in determining the electronic coupling for singlet fission? J Phys Chem A. Jan. 15, 2015;119(2):299-311.

Amir E, et al. Stimuli-Responsive Azulene-Based Conjugated Small Molecules and Polymers with Polyaniline-like Properties. J Am Chem Soc. 2011; 133:10046-10049.

Amir E, et al. Synthesis and characterization of soluble low-bandgap oligothiophene-[all]-S,S-dioxides-based conjugated oligomers and polymers. J Polym Sci. A Polym Chem. 2011; 49:1933-1941.

Angliker H, Rommel E, Wirz J. Electronic spectra of hexacene in solution (ground state. Triplet state. Dication and dianion). Chem Phys Lett. 1982: 87(2):208-212.

Anthony JE, Eaton DL, Parkin SR. A road map to stable, soluble, easily crystallized pentacene derivatives. Org Lett. Jan. 10, 2002;4(1):15-8.

Anthony JE, et al. Functionalized pentacene: improved electronic properties from control of solid-state order. J Am Chem Soc. Sep. 26, 2001;123(38):9482-3.

Anthony JE. Functionalized acenes and heteroacenes for organic electronics. Chem Rev. Dec. 2006;106(12): 5028-48.

Anthony JE. The larger acenes: versatile organic semiconductors. Angew Chem Int Ed Engl. 2008;47(3): 452-83.

Antognazza MR, et al. Ultrafast excited state relaxation in long-chain polyenes. Chem Phys 2010; 373(1-2): 115-121.

Aryanpour K, et al. Theory of Primary Photoexcitations in Donor-Acceptor Copolymers. Phys Rev Lett, Dec. 31, 2015;115(26):267401.

Ashton PR, et al. Molecular belts. 2. Substrate-directed syntheses of belt-type and cage-type structures. J Am Chem Soc. 1993;115(13):5422-5429.

Ball M, et al. Contorted polycyclic aromatics. Acc Chem Res. Feb. 17, 2015;48(2):267-76.

Banerjee M, Shukla R, Rathore R. Synthesis, optical, and electronic properties of soluble poly-p-phenylene oligomers as models for molecular wires. J Am Chem Soc. Feb. 11, 2009;131(5):1780-6.

Barbarella G, et al. Bright oligothlophene N-succinimidyl esters for efficient fluorescent labeling of proteins and oligonucleotides, Bioconjug Chem. Jan.-Feb. 2006;17(1):58-67.

Bates FS, Fredrickson GH. Block copolymers—designer soft materials. Phys Today 1999; 52(2):32-38.

Beljonne D, et al. Charge-transfer excitations steer the Davydov splitting and mediate singlet exciton fission in pentacene. Phys Rev Lett. May 31, 2013;110(22):226402.

Benard CP, et al. Double diels-alder strategies to soluble 2,9- and 2,9,6,13-tetraethynylpentacenes, photolytic [4+4] cycloadditions, and pentacene crystal packing, J Org Chem. Sep. 14, 2007;72(19):7229-36.

(56) References Cited

OTHER PUBLICATIONS

Bendikov M, Wudl F, Perepichka DF. Tetrathiafulvalenes, oligoacenenes, and their buckminsterfullerene derivatives: the brick and mortar of organic electronics. Chem Rev. Nov. 2004;104(11):4891-946.
Bensasson R, Land EJ, Triplet-triplet extinction coefficients via energy transfer. Trans Faraday Soc. 1971; 67:1904-1915.
Berkelbach TC, Hybertsen MS, Reichman DR. Microscopic theory of singlet exciton fission. I. General formulation. J Chem Phys. Mar. 21, 2013;138(11):114102.
Berkelbach TC, Hybertsen MS, Reichman DR. Microscopic theory of singlet exciton fission. II. Application to pentacene dimers and the role of superexchange. J Chem Phys. Mar. 21, 2013;138(11):114103.
Berlin A, et al. 3,4-Ethylenedioxy-substituted bithiophene-alt-thiophene-S,S-dioxide regular copolymers. Synthesis.and conductive, magnetic and luminescence properties. J Mater Chem. 2003;13(1):27-33.
Bredas JL, et al. Molecular understanding of organic solar cells: the challenges. Acc Chem Res. Nov. 17, 2009;42(11):1691-9.
Bredas JL. Relationship between band gap and bond length alternation in organic conjugated polymers. J Chem Phys 1985; 82(8):3808-3811.
Brouwer AM. Standards for photoluminescence quantum yield measurements in solution. Pure Appl Chem. 2011; 83(12):2213-2228.
Bunz UH. The Larger Linear N-Heteroacenes, Acc Chem Res, Jun. 16, 2015;48(6):1676-86.
Burdett JJ, Bardeen CJ. The dynamics of singlet fission in crystalline tetracene and covalent analogs. Acc Chem Res. Jun. 18, 2013;46(6):1312-20.
Busby E, et al. A design strategy for intramolecular singlet fission mediated by charge-transfer states in donor-acceptor organic materials. Nat Mater. Apr. 2015;14(4):426-33.
Busby E, et al. Fast Singlet Exciton Decay in Push-Pull Molecules Containing Oxidized Thiophenes. J Phys Chem B. Jun. 18, 2015;119(24):7644-50.
Busby M, et al. Interactions of Perylene Bisimide in the One-Dimensional Channels of Zeolite L. J Phys Chem. C 2011; 115(13):5974-5988.
Busing WR, Levy HA. High-speed computation of the absorption correction for single-crystal diffraction measurements. Acta Cryst. 1957; 10(3): 180-182.
Cabanetos C, et al. Linear Side Chains in Benzo[1,2-b:4,5-b']dithiophene-Thieno[3,4-c]pyrrole-4,6-dione Polymers Direct Self-Assembly and Solar Cell Performance. J Am Chem Soc. Mar. 27, 2013;135(12):4656-9.
Capozzi B, et al. Length-dependent conductance of oligothiophenes. J Am Chem Soc. Jul. 23, 2014;136(29): 10486-92.
Carmichael I, Helman WP, and Hug GL. Extinction Coefficients of Triplet-Triplet Absorption Spectra of Organic Molecules in Condensed Phases: A Least-Squares Analysis. J Phys Chem Ref Data. 1987; 16(2): 239-260.
Casida ME. Time-Dependent Density Functional Response Theory for Molecules. In *Recent Advances in Density Functional Methods (Part I)*. (ed. DP Chong) Singapore, World Scientific, 1995; 155-192.
Caspar JV, Meyer TJ. Application of the energy gap law to nonradiative, excited-state decay. J Phys Chem. 1983, 87(6):952-957.
Chai J, Buriak JM. Using cylindrical domains of block copolymers to self-assemble and align metallic nanowires. ACS Nano. Mar. 2008:2(3):489-501.
Chan WL, et al. Observing the multiexciton state in singlet fission and ensuing ultrafast multielectron transfer. Science. Dec. 16, 2011;334(6062):1541-5.
Chan WL, et al. The quantum coherent mechanism for singlet fission: experiment and theory. Acc Chem Res. Jun. 18, 2013;46(6):1321-9.
Chan WL, Ligges M, Zhu XY. The energy barrier in singlet fission can be overcome through coherent coupling and entropic gain. Nat Chem. Oct. 2012;4(10):840-5.
Charbr M, Williams DF. Singlet exciton trapping and heterofission in tetracene doped anthracene crystals. Chem Phys Lett. 1977; 49(3):599-603.
Chen J, et al. The influence of side chains on the structures and properties of functionalized pentacenes. J Mater Chem. 2008; 18:1961-1969.
Clark RC, Reid JS. The analytical calculation of absorption in multifaceted crystals. Acta Cryst. 1995; A51:887-897.
Congreve DN, et al. External quantum efficiency above 100% in a singlet-exciton-fission-based organic photovoltaic cell. Science. Apr. 19, 2013;340(6130):334-7.
Coropceanu V, et al. Charge transport in organic semiconductors. Chem Rev. Apr. 2007;107(4):926-52.
Dell EJ, Campos LM. The preparation of thiophene-S,S-dioxides and their role in organic electronics. J Mater Chem 2012; 22:12945-12952.
Dell EJ, et al. Molecular length dictates the nature of charge carriers in single-molecule junctions of oxidized oligothiophenes. Nat Chem. Mar. 2015;7(3):209-14.
Dolomanov OV, et al. OLEX2: a complete structure solution, refinement and analysis program. J Appl Cryst. 2009;42:339-341.
Ehrler B, et al. In situ measurement of exciton energy in hybrid singlet-fission solar cells. Nat Commun. 2012;3:1019.
Elsabahy M, Wooley KL. Design of polymeric nanoparticles for biomedical delivery applications. Chem Soc Rev. Apr. 7, 2012;41(7):2545-61.
Englman R, Jortner J. The energy gap law for radiationless transitions in large molecules. Mol Phys. 1970; 18(2): 145-164.
Erb T, et al. Correlation Between Structural and Optical Properties of Composite Polymer/Fullerene Films for Organic Solar Cells. Adv Funct Mater 2005; 15:1193-1196.
Farinola GM, et al. Fluorinated Poly(p-phenylenevinylene)s: Synthesis and Optical Properties of an Intriguing Class of Luminescent Polymers. Materials 2010; 3(5):3077-3091.
Fudickar W, Linker T. Why triple bonds protect acenes from oxidation and decomposition. J Am Chem Soc. Sep. 12, 2012;134(36):15071-82.
Geacintov NE, et al. Heterofission of pentacene excited singlets in pentacene-doped tetracene crystals. Chem Phys Lett. 1971;11(4):504-508.
Gelinas S, et al. Ultrafast long-range charge separation in organic semiconductor photovoltaic diodes. Science. Jan. 31, 2014;343(6170):512-6.
Goto K, et al. Intermolecular oxidative annulation of 2-aminoanthracenes to diazaacenes and aza[7]helicenes. Angew Chem Int Ed. 2012; 51:10333-10336.
Gradinaru CC, et al. An unusual pathway of excitation energy deactivation in carotenoids: singlet-to-triplet conversion on an ultrafast timescale in a photosynthetic antenna. Proc Natl Acad Sci U S A. Feb. 27, 2001;98(5):2364-9.
Green MA. Third generation photovoltaics: Ultra-high conversion efficiency at low cost. Prog Photovolt: Res Appl. 2001; 9(2):123-135.
Greyson EC, et al. Maximizing singlet fission in organic dimers: theoretical investigation of triplet yield in the regime of localized excitation and fast coherent electron transfer. J Phys Chem B. Nov. 18, 2010;114(45):14168-77.
Greyson EC, et al. Singlet exciton fission for solar cell applications: energy aspects of interchromophore coupling. J Phys Chem B. Nov. 18, 2010;114(45):14223-32.
Guo J, et al. Near-IR femtosecond transient absorption spectroscopy of ultrafast polaron and triplet exciton formation in polythiophene films with different regioregularities. J Am Chem Soc. Nov. 25, 2009;131(46):16869-80.
Guo X, Huang L. Recent advances in nonviral vectors for gene delivery. Acc Chem Res. Jul. 17, 2012;45(7):971-9.
Hagemann O, Jørgensen M, Krebs FC. Synthesis of an all-in-one molecule (for organic solar cells). J Org Chem. Jul. 21, 2006;71(15):5546-59.
Hanna MC, Nozik AJ. Solar conversion efficiency of photovoltaic and photoelectrolysis cells with carrier multiplication absorbers. J Appl Phys 2006; 100:074510-074518.

(56) References Cited

OTHER PUBLICATIONS

Havinga EE, ten Hoeve W, Wynberg H. A new class of small band gap organic polymer conductors. Polym Bull 1992; 29:119-126.

Hawker CJ, Wooley KL. The convergence of synthetic organic and polymer chemistries. Science. Aug. 19, 2005;309(5738):1200-5.

Head-Gordon M, et al. Analysis of Electronic Transitions as the Difference of Electron Attachment and Detachment Densities. J Phys Chem. 1995; 99(39):14261-14270.

Heinzelmann W, Labhart H. Triplet-triplet spectra and triplet quantum yields of some aromatic hydrocarbons in liquid solution. Chem Phys Lett. 1969; 4(1):20-24.

Herwig PT, Mullen K. A Soluble Pentacene Precursor: Synthesis, Solid-State Conversion into Pentacene and Application in a Field-Effect Transistor. Adv Mater. 1999;11(6):480-483.

Houk KN, Lee PS, Nendel M. Polyacene and cyclacene geometries and electronic structures: bond equalization, vanishing band gaps, and triplet ground states contrast with polyacetylene. J Org Chem. Aug. 10, 2001;66(16):5517-21.

International Search Report for PCT/US2015/000309, dated Jun. 3, 2016.

International Search Report for PCT/US2015/027660, dated Sep. 2, 2015.

International Search Report for PCT/US2015/044331, dated Nov. 9, 2015.

International Search Report for PCT/US2015/066529, dated Feb. 26, 2016.

Ito K, et al. Oligo(2,6-anthrylene)s: Acene—Oligomer Approach for Organic Field-Effect Transistors. Angew Chem 2003; 115(10):1191-1194.

Jiang Y, et al. The evolution of cyclopropenium ions into functional polyelectrolytes. Nat Commun. Jan. 9, 2015;6:5950.

Jo SB, et al. Boosting Photon Harvesting in Organic Solar Cells with Highly Oriented Molecular Crystals via Graphene-Organic Heterointerface. ACS Nano. Aug. 25, 2015;9(8):8206-19.

Johnson JC, et al. Toward designed singlet fission: solution photophysics of two indirectly coupled covalent dimers of 1,3-diphenylisobenzofuran. J Phys Chem B. Apr. 25, 2013;117(16):4680-95.

Johnson JC, Nozik AJ, Michl J. The role of chromophore coupling in singlet fission. Acc Chem Res. Jun. 18, 2013;46(6):1290-9.

Kang J, et al. Structure and properties of small molecule-polymer blend semiconductors for organic thin film transistors. J Am Chem Soc. Sep. 17, 2008;130(37):12273-5.

Kanimozhi C, et al. Synthesis of diketopyrrolopyrrole containing copolymers: a study of their optical and photovoltaic properties, J Phys Chem B. Mar. 11, 2010:114(9):3095-103.

Katz HE, Bao Z, Gilat SL. Synthetic chemistry for ultrapure, processable, and high-mobility organic transistor semiconductors. Acc Chem Res. May 2001;34(5):359-69.

Killops KL, et al. Synthesis of Robust Surface-Charged Nanoparticles Based on Cyclopropenium Ions. Macromolecules 2015; 48(8): 2519-2525.

Kim JY, et al. Efficient tandem polymer solar cells fabricated by all-solution processing. Science. Jul. 13, 2007;317(5835):222-5.

Kitamura C, et al. Design of Narrow-Bandgap Polymers. Syntheses and Properties of Monomers and Polymers Containing Aromatic-Donor and o-Quinoid-Acceptor Units. Chem Mater. 1996; 8(2):570-578.

Kline RJ, et al. Controlling the Microstructure of Solution-Processable Small Molecules in Thin-Film Transistors through Substrate Chemistry. Chem Mater. 2011;23(5):1194-1203.

Knychala P, Banaszak NP, Balsara NP. Effect of Composition on the Phase Behavior of Ion-Containing Block Copolymers Studied by a Minimal Lattice Model. Macromolecules 2014; 47(7):2529-2535.

Koch FP, Heeney M, Smith P. Thermal and structural characteristics of oligo(3-hexylthiophene)s (3HT)n, n=4-36. J Am Chem Soc. Sep. 18, 2013;135(37):13699-709.

Koch FP, Smith P, Heeney M. "Fibonacci's route" to regioregular oligo(3-hexylthiophene)s. J Am Chem Soc. Sep. 15, 2013;135(37)13695-8.

Kraabel B, et al. Triplet exciton generation, transport and relaxation in isolated polydiacetylene chains: Subpicosecond pump-probe experiments. Chem Phys 1998; 227(1-2): 83-98.

Kumarasamy E, et al. Nonbiaryl and Heterobiaryl Atropisomers: Molecular Templates with Promise for Atropselective Chemical Transformations. Chem Rev. Oct. 28, 2015;115(20):11239-300.

Lee J, et al. Singlet exciton fission photovoltaics. Acc Chem Res. Jun. 18, 2013;46(6):1300-11.

Lee OJ, et al. Ultrafast switching of a nanomagnet by a combined out-of-plane and in-plane polarized spin current pulse. App. Phys Lett. 2009; 95:012506.

Lehnherr D, et al. A modular synthetic approach to conjugated pentacene di-,.tri-, and tetramers. Angew Chem Int Ed Engl. Aug. 16, 2010;49(35):6190-4.

Lehnherr D, et al. Synthesis and electronic properties of conjugated pentacene dimers. Org Lett. Nov. 6, 2008;10(21):4779-82.

Lehnherr D, et al. Synthesis of soluble oligo- and polymeric pentacene-based materials. Tetrahedron 2008; 64(50):11449-11461.

Lehnherr D, Gao J, Hegmann FA, Tykwinski RR. Pentacene-based dendrimers: synthesis and thin film photoconductivity measurements of branched pentacene oligomers. J Org Chem. Jul. 17, 2009;74(14):5017-24.

Lehnherr D, McDonald R, Tykwinski RR. Exploring electronically polarized pentacenes. Org Lett. Oct. 2, 2008;10(19):4163-6.

Lehnherr D, Tykwinski RR. Pentacene oligomers and polymers: functionalization of pentacene to afford mono-, di-, tri-, and polymeric materials. Org Lett. Oct. 25, 2007;9(22):4583-6.

Lin YY, et al. Pentacene-based organic thin-film transistors. IEEE Transactions on Electron Devices Aug. 1997; 44(8): 1325-1331.

Liu F, et al. Multifaceted Regioregular Oligo(thieno[3,4-b]thiophene)s Enabled by Tunable Quinoidization and Reduced Energy Band Gap. J Am Chem Soc. Aug. 19, 2015;137(32):10357-66.

Liu HY, et al. Quinoxaline-Based Polymer Dots with Ultrabright Red to Near-Infrared Fluorescence for In Vivo Biological Imaging. J Am Chem Soc. Aug. 19, 2015;137(32):10420-9.

Low JZ, et al. Correlating Structure and Function in Organic Electronics: From Single Molecule Transport to Singlet Fission. Chem Mater. 2015; 27(16): 5453-5463.

Lu J, et al. Synthesis, structure, and resolution of exceptionally twisted pentacenes. J Am Chem Soc. Dec. 27, 2006;128(51):17043-50.

Lukman S, et al. Tuneable Singlet Exciton Fission and Triplet-Triplet Annihilation in an Orthogonal Pentacene Dimer. Adv. Funct. Mater. 2015; 25(34):5452-5461.

Maitra NT, et al. Double excitations within time-dependent density functional theory linear response. J Chem Phys. Apr. 1, 2004;120(13):5932-7.

Maliakal A, et al. Photochemical Stability of Pentacene and a Substituted Pentacene in Solution and in Thin Films. Chem Mater. 2004; 16(24):4980-4986.

Mannsfeld SC, Tang ML, Bao Z. Thin film structure of triisopropylsilylethynyl-functionalized pentacene and tetraceno[2,3-b]thiophene from grazing incidence X-ray diffraction. Adv Mater. Jan. 4, 2011;23(1):127-31.

Mastron JN, et al. Aqueous colloidal acene nanoparticles: a new platform for studying singlet fission. J Phys Chem B. Dec. 12, 2013;117(49):15519-26.

Merkel OM, Kissel T. Quo vadis polyplex? J Control Release. Sep. 28, 2014;190:415-23.

Miao Q, et al. Organization of acenes with a cruciform assembly motif. J Am Chem Soc. Feb. 1, 2006;128(4): 1340-5.

Mintzer MA, Simanek EE. Nonviral vectors for gene delivery. Chem Rev. Feb. 2009;109(2):259-302.

Monahan N, Zhu XY. Charge transfer-mediated singlet fission. Annu Rev Phys Chem. Apr. 2015;66:601-18.

Mullen K, Wegner G. *Electronic Materials: The Oligomer Approach*. Wiley: Weinham. 1998.

Mullen, K.M., Vengris, M. & van Stokkum, I.H.M. Algorithms for separable nonlinear least squares with application to modelling time-resolved spectra. J Glob Optim 2007; 38(2): 201-213.

(56) References Cited

OTHER PUBLICATIONS

Muller AM, et al. Evidence for exciton fission and fusion in a covalently linked tetracene dimer. CHem Phys Lett. 2006; 421(4-8):518-522.
Muller AM, et al. Exciton fission and fusion in bis(tetracene) molecules with different covalent linker structures. J Am Chem Soc. Nov. 21, 2007;129(46):14240-50.
Musser AJ, et al. Activated singlet exciton fission in a semiconducting polymer. J Am Chem Soc. Aug. 28, 2013;135(34)12747-54.
Nozik Aj. Quantum dot solar cells. Phys E 2002; 14(1):115-120.
Okamoto T, Bao Z. Synthesis of solution-soluble pentacene-containing conjugated copolymers. J Am Chem Soc. Aug. 29, 2007;129(34):10308-9.
Okamoto T, et al. 2,9-Dibromopentacene: Synthesis and the role of substituent and symmetry on solid-state order. Synth Met. Dec. 2010;160(23-24):2447-2451.
Oliva MM, et al. Do [all]-S,S'-Dioxide Oligothiophenes Show Electronic and Optical Properties of Oligoenes and/or of Oligothiophenes? J Am Chem Soc Apr. 2010; 132(17):6231-42.
Ornelas-Megiatto C, Wich PR, Fréchet JM. Polyphosphonium polymers for siRNA delivery: an efficient and nontoxic alternative to polyammonium carriers. J Am Chem Soc. Feb. 1, 2012;134(4):1902-5.
Paci I, et al. Singlet fission for dye-sensitized solar cells: can a suitable sensitizer be found? J Am Chem Soc. Dec. 27, 2006;128(51):16546-53.
Papagiannakis E, et al. Light Harvesting by Carotenoids Incorporated into the B850 Light-Harvesting Complex from Rhodobacter sphaeroides R-26.1: Excited-State Relaxation, Ultrafast Triplet Formation, and Energy Transfer to Bacteriochlorophyll. J Phys Chem B 2003; 107(23):5642-5649.
Park SK, et al. High mobility solution processed 6,13-bis(triisopropylsilylethynyppentacene organic thin film transistors. Appl Phys Lett. 2007; 91:063514.
Payne MM, et al. Stable, crystalline acenedithlophenes with up to seven linearly fused rings. Org Lett. Sep. 16, 2004;6(19):3325-8.
Payne MM, Parkin SR, Anthony JE. Functionalized higher acenes: hexacene and heptacene. J Am Chem Soc. Jun. 8, 2005;127(22):8028-9.
Pensack RD, et al. Exciton delocalization drives rapid singlet fission in nanoparticles of acene derivatives. J Am Chem Soc. Jun. 3, 2015;137(21):6790-803.
Plunkett KN, et al. Expeditious synthesis of contorted hexabenzocoronenes. Org Lett. 2009 Jun 4;11(11):2225-8.
Porz M, et al. TIPS-tetracene- and TIPS-pentacene-annulated poly(norbornadiene)s: synthesis and properties. Macromol Rapid Commun. Oct. 2013;34(20):1611-7.
Purushothaman B, Parkin SR, Anthony JE. Synthesis and stability of soluble hexacenes. Org Lett. May 7, 2010;12(9):2060-3.
Resch-Genger U, Rurack K. Determination of the photoluminescence quantum yield of dilute dye solutions. Pure Appl Chem. 2013; 85(10):2005-2013.
Roberts ST, et al. Efficient singlet fission discovered in a disordered acene film. J Am Chem Soc. Apr. 11, 2012;134(14):6388-400.
Sanders SN, et al. Quantitative Intramolecular Singlet Fission in Bipentacenes. J Am Chem Soc. Jul. 22, 2015;137(28):8965-72.
Shao Y, et al. Advances in methods and algorithms in a modern quantum chemistry program package. Phys Chem Chem Phys. Jul. 21, 2006;8(27):3172-91.
Sharifzadeh S, et al. Low-Energy Charge-Transfer Excitons in Organic Solids from First-Principles: The Case of Pentacene. J Phys Chem Lett. 2013; 4(13):2197-2201.
Sheldrick G. A short history of SHELX. Acta Cryst. 2008; A64:112-122.
Shi Z, et al. Ordered, microphase-separated, noncharged-charged diblock copolymers via the sequential ATRP of styrene and styrenic imidazollum monomers. Polymer Nov. 2014; 55(26):6664-6671.
Shockley W, Queisser HJ. Detailed Balance Limit of Efficiency of p-n Junction Solar Cells. J Appl Phys 1961; 32:510-519.

Shu Y, et al. A survey of electron-deficient pentacenes as acceptors in polymer bulk heterojunction solar cells. Chem Sci. 2011;2:363-368.
Singh S, et al. Laser generation of excitons and fluorescence in anthracene crystals. J Chem Phys. 1965;42(1): 330-342.
Small CE, et al. High-efficiency Inverted dithienogermole-thienopyrrolodione-based polymer solar cells. Nature Photon 2012; 6:115-120.
Smith MB, Michl J. Recent advances in singlet fission. Annu Rev Phys Chem. 2013;64:361-86.
Smith MB, Michl J. Singlet fission, Chem Rev. Nov. 10, 2010;110(11):6891-936.
Snellenburg JJ, et al. Glotaran: A Java-Based Graphical User Interface for the R Package TIMP. J Stat Sofw. 2012; 49(3):1-22.
Sreearunothai P, et al. Triplet Transport to and Trapping by Acceptor End Groups on Conjugated Polyfluorene Chains, J Phys Chem. C 2011; 115:19569-19577.
Stern HL, et al. Identification of a triplet pair intermediate in singlet exciton fission in solution. Proc Natl Acad Sci U S A. Jun. 23, 2015;112(25):7656-61.
Stuart MA, et al. Emerging applications of stimuli-responsive polymer materials. Nat Mater. Feb. 2010;9(2):101-13.
Such GK, Yan Y, Johnston AP, Gunawan ST, Caruso F. Interfacing materials science and biology for drug carrier design. Adv Mater, Apr. 8, 2015;27(14):2278-97.
Sun Y, et al. Solution-processed small-molecule solar cells with 6.7% efficiency. Nature Mater 2012; 11(1):44-48.
Sundar VC, et al. Elastomeric transistor stamps: reversible probing of charge transport in organic crystals. Science. Mar. 12, 2004;303(5664):1644-6.
Swartz CR, et al. Synthesis and characterization of electron-deficient pentacenes, Org Lett. Jul. 21, 2005;7(15): 3163-6.
Szarko JM, et al. Electronic processes in conjugated diblock oligomers mimicking low band-gap polymers: experimental and theoretical spectral analysis. J Phys Chem B. Nov. 18, 2010;114(45):14505-13.
Takahashi T, et al. Straightforward Method for Synthesis of Highly Alkyl-Substituted Naphthacene and Pentacene Derivatives by Homologation. J Am Chem Soc. 2000; 122(51):12876-12877.
Tang CW. Two-layer organic photovoltaic cell. Appi. Phys. Lett. 1986; 48:183-185.
Tautz R, et al. Charge photogeneration in donor-acceptor conjugated materials: influence of excess excitation energy and chain length. J Am Chem Soc. Mar. 20, 2013;135(11):4282-90.
Tokito S, et al. Acene containing polyfluorenes for red, green, and blue emission in organic light-emitting diodes. Proc SPIE Int Soc Opt Eng. 2001; 4105:69-74.
Tritsch JR, et al. Harvesting singlet fission for solar energy conversion via triplet energy transfer. Nat Commun. 2013;4:2679.
Trlifaj, M. Nonradiative heterofission of a singlet host exciton into a pair of triplet electronic excitations in doped aromatic hydrocarbon molecular crystals. Czech J Phys. 1977; 27:190-199.
Tsefrikas VM, Scott LT. Geodesic polyarenes by flash vacuum pyrolysis. Chem Rev. Dec. 2006;106(12): 4868-84.
Vallett PJ, Snyder JL, Damrauer NH. Tunable electronic coupling and driving force in structurally well-defined tetracene dimers for molecular singlet fission: a computational exploration using density functional theory. J Phys Chem A. Oct. 24, 2013;117(42):10824-38.
Van Stokkum IH, Larsen DS, van Grondelle R. Global and target analysis of time-resolved spectra. Biochim Biophys Acta. Jul. 9, 2004;1657(2-3):82-104.
Varnavski O, et al. High Yield Ultrafast Intramolecular Singlet Exciton Fission in a Quinoidal Bithiophene. J Phys Chem Lett. Apr. 16, 2015;6(8)1375-84.
Walker BJ, et al. Singlet exciton fission in solution. Nat Chem. Dec. 2013;5(12):1019-24.
Weber RL, et al. Effect of nanoscale morphology on the conductivity of polymerized Ionic liquid block copolymers. Macromolecules 2011; 44(14); 5727-5735.
Wei L, et al. Vibrational imaging of newly synthesized proteins in live cells by stimulated Raman scattering microscopy. Proc Natl Acad Sci U S A. Jul. 9, 2013;110(28)11226-31.

(56) References Cited

OTHER PUBLICATIONS

Wei S, et al. Bandgap engineering through controlled oxidation of polythiophenes. Angew Chem Int Ed Engl. Feb. 10, 2014;53(7):1832-6.
Wilson JS, et al. The energy gap law for triplet states in Pt-containing conjugated polymers and monomers. J Am Chem Soc. Sep. 26, 2001;123(38):9412-7.
Wishart, JF, Cook, AR, and Miller, JR. The LEAF picosecond pulse radiolysis facility at Brookhaven National Laboratory. Rev Sci Instrum. 2004; 75(11):4359-4366.
Wu Q, Van Voorhis T. Direct optimization method to study constrained systems within density-functional theory. Phys. Rev. A 2005; 72: 024502.
Wu W, Liu Y, Zhu D. Pi-conjugated molecules with fused rings for organic field-effect transistors: design, synthesis and applications. Chem Soc Rev. May 2010;39(5):1489-502.
Wullner U, et al. Targeted delivery of short interfering RNAs—strategies for in vivo delivery. Recent Pat Anticancer Drug Discov. Jan. 2009;4(1):1-8.
Xiao S, et al. Supersized contorted aromatics. Chem Sci. 2013; 4:2018-2023.
Yang L, et al. Solution-processable singlet fission photovoltaic devices. Nano Lett. Jan. 14, 2015;15(1):354-8.
Yin H, et al. Non-viral vectors for gene-based therapy. Nat Rev Genet. Aug. 2014;15(8):541-55.
Yoon H, et al. Polymeric supramolecular assemblies based on multivalent ionic interactions for biomedical applications. Polymer 2014; 55(2):453-464.
Yost SR, et al. A transferable model for singlet-fission kinetics. Nat Chem. Jun. 2014;6(6):492-7.
You J, et al. A polymer tandem solar cell with 10.6% power conversion efficiency. Nat Commun. 2013;4:1446.
Yu CL, et al. Enhanced DNA-binding activity of a Stat3-related protein in cells transformed by the Src oncoprotein. Science. Jul. 7, 1995;269(5220):81-3.
Zade SS, Bendikov M. Heptacene and beyond: the longest characterized acenes. Angew Chem Int Ed Engl. Jun. 1, 2010;49(24):4012-5.
Zeng T, Hoffmann R, Ananth N. The low-lying electronic states of pentacene and their roles in singlet fission. J Am Chem Soc. Apr. 16, 2014;136(15):5755-64.
Zhai Y, Sheng C, Vardeny ZV. Singlet fission of hot excitons in π-conjugated polymers. Philos Trans A Math Phys Eng Sci. Jun. 28, 2015;373(2044).
Zhang L, et al. Synthesis, electronic structure, molecular packing/morphology evolution, and carrier mobilities of pure oligo-/poly(alkylthiophenes). J Am Chem Soc. Jan. 16, 2013;135(2):844-54.
Zhao Y, Mondal R, Neckers DC. Photochemical Formation of Substituted Pentacenes. J Org Chem. 2008; 73(14): 5506-5513.
Zhou H, et al. Rational Design of High Performance Conjugated Polymers for Organic Solar Cells. Macromolecules 2012; 45(2):607-632.
Zirzlmeier J, et al. Singlet fission in pentacene dimers. Proc Natl Acad Sol U S A. Apr. 28, 2015;112(17): 5325-5330.
Albert, Julie NL, and Thomas H. Epps III. "Self-assembly of block copolymer thin films." *Materials Today* 13.6 (2010): 24-33.
Alexander, H. et al. A SAXS/WAXS/GISAXS beamline with multilayer monochromator. *J. Phys. Conf. Ser* 247, 012007 (2010).
Antoni et al., "Pushing the Limits for Thiol-Ene and CuAAC Reactions: Synthesis of a 6th Generation Dendrimer in a Single Day." *Macromolecules*, vol. 43, pp. 6625-6631 (2010).
Bandar, J. S. & Lambert, T. H. Enantioselective bronsted base catalysis with chiral cyclopropenimines. *J. Am. Chem. Soc.* 134, 5552-5555 (2012).
Bandar, J. S. & Lambert, T. H. Aminocyclopropenium ions: synthesis, properties, and applications, *Synthesis* 45, 2485-2498 (2013a).
Bandar, J. S. & Lambert, T. H. Cyclopropenimine-catalyzed enantioselective mannich reactions of tent-butyl glycinates with n-boc-imines. *J. Am. Chem. Soc.* 135, 11799-11802 (2013b).

Blackman, M.L. et al. (2008). "Tetrazine Ligation: Fast Bioconjugation Based on Inverse-Electron-Demand Diels-Alder Reactivity". Journal of the American Chemical Society 130 (41): 13518-13519.
Blake, S. et al. Chemically reactive derivatives of gramicidin A for developing ion channel-based nanoprobes. Bioconjug Chem. Aug. 2008:19(8)1614-24.
Bock et al., Cu-catalyzed alkyne-azide click cycloadditions from a mechanistic and synthetic perspective. Eur J Org Chem. 2006;2006:51.
Boren, BC, et al. (2008). "Ruthenium-Catalyzed Azide-Alkyne Cycloaddition: Scope and Mechanism". Journal of the American Chemical Society 130 (28): 8923-8930.
Breslow, R. Synthesis of the s-triphenylcyclopropenyl cation. *J. Am. Chem. Soc.* 79, 5318-5318 (1957).
Bruns, H, et al. Synthesis and coordination properties of nitrogen(i)-based ligands. *Angew. Chem. Int. Ed.* 49, 3680-3683 (2010).
Cabasso, I., "Membranes", in *Encyclopedia of Polymer Science and Engineering*, vol. 9, pp. 509-579, John Wiley & Sons, Inc., New York (1987).
Campos et al., "Development of Thermal and Photochemical Strategies for Thio-Ene Click Polymer Functionalization", *Macromolecules*, vol. 41, pp. 7063-7070 (2008a).
Campos et al., "Highly Versatile and Robust Materials for Soft Imprint Lithography Based on Thiol-ene Click Chemistry", *Advanced Materials*, vol. 20, pp. 3728-3733 (2008b).
Chiefari, J. et al. Living free-radical polymerization by reversible addition-fragmentation chain transfer the RAFT process. *Macromolecules* 31, 5559-5562 (1998).
Chen, Y. et al. Enhancement of anhydrous proton transport by supramolecular nanochannels in comb polymers. *Nat. Chem.* 2, 503-508 (2010).
Choi, J.-H., Ye, Y., Elabd, Y. A. & Winey, K. I. Network structure and strong microphase separation for high ion conductivity in polymerized ionic liquid block copolymers. *Macromolecules* 46, 5290-5300 (2013).
Curnow, O. J., MacFarlane, D. R. & Waist, K. J. Triaminocyclopropenium salts as ionic liquids. *Chem. Commun.* 47, 10248-10250 (2011).
Curnow, O. J., Holmes, M. T., Ratten, L C., Waist, K. J. & Yunis, R. A facile route to functionalised, protic and chiral ionic liquids based on the triaminocyclopropeniurn cation. *RSC Adv.* 2, 10794-10797 (2012).
De Smedt, S., Demeester, J. & Hennink, W. Cationic polymer based gene delivery systems. *Pharm. Res.* 17, 113-126 (2000).
Decher, G. Fuzzy Nanoassemblies: Toward Layered Polymeric Multicomposites. *Science*, vol. 277, pp. 1232-1237 (1997).
Devaraj, Neal K. and Weissleder, Ralph and Hilderbrand, Scott A. (2008). "Tetrazine Based Cycloadditions: Application to Pretargeted Live Cell Imaging". Bioconjugate Chemistry 19 (12): 2297-2299.
Elimelech, M. & Phillip, W. A. The future of seawater desalination: energy, technology, and the environment. *Science* 333, 712-717 (2011).
Fairbanks et al., (2009) "Photoinitiated polymerization of PEG-diacrylate with lithium phenyl-2,4,6- trimethylbenzoylphosphlnate: polymerization rate and cytocompatibility" Biomaterials. 30(35): 6702-6707.
Gao, R., Wang, D., Heflin, J. R. & Long, T. E. Imidazolium sulfonate-containing pentablock copolymer-ionic liquid membranes for electroactive actuators. *J. Mater. Chem.* 22, 13473-13476 (2012).
Gillies, E.R., et al., "Dendrimers and dendritic polymers in drug delivery." Drug Discovery Today, vol. 10, pp. 35-43 (2005).
Gin, D. L & Noble, R. D. Designing the next generation of chemical separation membranes. *Science* 332, 674-676 (2011).
Hallinan, D. T. & Balsara, N. P. Polymer electrolytes. *Annu. Rev. Mater. Res.* 43, 503-525 (2013).
Hawker, C. J., Bosman, A. W. & Harth, E. New polymer synthesis by nitroxide mediated living radical polymerizations. *Chem. Rev.* 101, 3661-3688 (2001).
Hemp, S. T. et al. Comparing ammonium and phosphonium polymerized ionic liquids: thermal analysis, conductivity, and morphology. *Macromol. Chem. Phys.* 214, 2099-2107 (2013).
Hickner, M. A., Herring, A. M. & Coughlin, E. B. Anion exchange membranes: current status and moving forward. *J. Polym. Sci. B Polym. Phys.* 51, 1727-1735 (2013).

(56) References Cited

OTHER PUBLICATIONS

Himo, T.L., et al., (2005). "Copper(I)-Catalyzed Synthesis of Azoles, DFT Study Predicts Unprecedented Reactivity and Intermediates". Journal of the American Chemical Society 127: 210-216.

Hoarfrost, M. L, Tyagl, M. S., Segalman, R. A. & Reimer, J. A. Effect of confinement on proton transport mechanisms in block copolymer/ionic liquid membranes. *Macromolecules* 45, 3112-3120 (2012).

Hoyle, Charles E. and Bowman, Christopher N. (2010). "Thiol—Ene Click Chemistry". Angewandte Chemie International Edition 49 (9): 1540-1573.

Hückel, E. Grundzüge der Theorie ungesättigter and aromatischer Verbindungen. *Z. Physik* 70, 77-85 (1938).

Huddleston, J. G. et al. Characterization and comparison of hydrophilic and hydrophobic room temperature ionic liquids incorporating the imidazdium cation, *Green Chem.* 3, 156-164 (2001).

Hunt, J. N. et al. Tunable, high modulus hydrogels driven by ionic coacervation. *Adv. Mater.* 23, 2327-2331 (2011).

Jangu, C. & Long, T. E. Phosphonium cation-containing polymers: from ionic liquids to polyelectrolytes. *Polymer* 55, 3298-3304 (2014).

Kenawy et al., "The Chemistry and Applications of Antimicrobial Polymers: A State-of-the-Art Review" *Biomacromolecules*, vol. 8, pp. 1359-1384 (2007).

Kerber, R. C. & Hsu, C. M. Substituent effects on cyclopropenium ions. *J. Am. Chem. Soc.* 95, 3239-3245 (1973).

Kolb, H. C.; Finn, M. G.; Sharpless, K. B. Click Chemistry: Diverse Chemical Function from a Few Good Reactions. Angew. Chem. Int. Ed. 2001, 40, 2004-2021.

Kolb, H. C.; Sharpless, K. B. The growing impact of click chemistry on drug discovery. Drug Discov Today. Dec. 15, 2003;8(24):1128-37.

Krogman, K.C., et al., Spraying asymmetry into functional membranes layer-by-layer. Nat Mater Jun. 19, 2009;8(6):512-8.

Lee, L. V.; et al. A Potent and Highly Selective Inhibitor of Human r-1,3-Fucosyltransferase via Click Chemistry J. Am. Chem. Soc. 2003, 125, 9588-9589.

Leibfarth, F. A. et al. A facile route to ketene-functionalized polymers for general materials applications. *Nat. Chem.* 2, 207-212 (2010).

Lewis W.G, et al. Click chemistry in situ: acetylcholinesterase as a reaction vessel for the selective assembly of a femtomolar inhibitor from an array of building blocks. Angew Chem Int Ed Engl. Mar. 15, 2002;41(6):1053-7.

Lodge, T. P. Materials science. A unique platform for materials design. *Science* 321, 50-51 (2008).

Mai, Y, and Eisenberg, A. "Self-assembly of block copolymers." Chem Soc Rev. Sep. 21, 2012;41(18):5969-85.

Matyjaszewski, K & Xia, J. Atom transfer radical polymerization. *Chem. Rev.* 101, 2921-2990 (2001).

McNulty,J.; et al, (2011). "The First Well-Defined Silver(I)-Complex-Catalyzed Cycloaddition of Azides onto Terminal Alkynes at Room Temperature". Chemistry—A European Journal 17 (52): 14727-14730.

Moses, J.E. et al. (2007). "The growing applications of click chemistry". Chem. Soc. Rev. 36 (36): 1249-1262.

Nederberg, F. et al. Biodegradable nanostructures with selective lysis of microbial membranes. *Nat. Chem.* 3, 409-414 (2011).

Pan, J., Chen, C., Zhuang, L & Lu, J. Designing advanced alkaline polymer electrolytes for fuel cell applications. *Acc. Chem. Res.* 45, 473-481 (2011).

Park, M. J. et al. Increased water retention in polymer electrolyte membranes at elevated temperatures assisted by capillary condensation. *Nano Lett.* 7, 3547-3552 (2007).

Peart, P. A. & Tover, J. D. Poly(cyclopropenone)s: formal Inclusion of the smallest Hückel aromatic into it-conjugated polymers. *J. Org. Chem.* 75, 5689-5696 (2010).

Peterson, RJ, & Cadotte, JE. (1990) "Thin Film Composite Reverse Osmosis Membranes" *Handbook of Industrial Membrane Technology*. 307-348 (1990).

Qiu, B., Lin, B., Qiu, L. & Yan, F. Alkaline imidazolium- and quaternary ammonium-functionalized anion exchange membranes for alkaline fuel cell applications. *J. Mater. Chem.* 22, 1040-1045 (2012).

Ramos, J., Forcada, J. & Hidalgo-Alvarez, R. Cationic polymer nanoparticles and nanogels: from synthesis to biotechnological applications. *Chem. Rev.* 114, 367-428 (2013).

Rostovtsev et al., A Stepwise Huisgen Cycloaddition Process: Copper(I)-Catalyzed Regioselective Ligation of Azides and Terminal Alkynes. Angew. Chem. Int. Ed. 41, 2596-2599 (2002).

Rothberg, J. M. et al. An integrated semiconductor device enabling non-optical genome sequencing. *Nature* 475, 348-352 (2011).

Samal, S. K. et al. Cationic polymers and their therapeutic potential. *Chem. Soc. Rev.* 41, 7147-7194 (2012).

Schmidt-Rohr, K. & Chen, Q. Parallel cylindrical water nanochannels in Nafion fuel-cell membranes. *Nat. Mater.* 7, 75-83 (2008).

Sing, C. E., Zwanikken, J. W. & Olvera de la Cruz, M. Electrostatic control of block copolymer morphology. *Nat. Mater.* 13, 694-698 (2014).

Song et al., "Aqueous Synthesis of Silver Nanoparticle Embedded Cationic Polymer Nanofibers and Their Antibacterial Activity". *Applied Materials and Interfaces*, vol. 4, pp. 460-465 (2012).

Steele, B. C. H. & Heinzel, A. Materials for fuel-cell technologies. *Nature* 414, 345-352 (2001).

Stöckmann, H, et al. (2011). Exploring isonitrile-based click chemistry for ligation with biomolecules. Org. Biomol. Chem., 9, 7303-7305.

Strathmann, H., "Synthetic Membranes and Their Preparation" in *Handbook of Industrial Membrane Technology*, M. Porter, ed., pp. 1-60, Noyes Publications, Park Ridge, NJ (1990).

Sudre, G., et al. Influence of bound ion on the morphology and conductivity of anion-conducting block copolymers, *Macromolecules* 46, 1519-1527 (2013).

Takenaka, M., and Hirokazu Hasegawa. "Directed self-assembly of block copolymers." *Current Opinion in Chemical Engineering* (2013), 2(1), 88-94.

Texter, J. Anion responsive imidazolium-based polymers. *Macromol. Rapid Commun.* 33, 1996-2014 (2012).

Tobey, S. W. & West, R. Pentachlorocyclopropane, *J. Am. Chem. Soc.* 88, 2478-2481 (1966).

Tornoe, C. W.; Christensen, C.; Meldal, M. (2002). "Peptidotriazoles on Solid Phase: [1,2,3]-Triazoles by Regiospecific Copper(I)-Catalyzed 1,3-Dipolar Cycloadditions of Terminal Alkynes to Azides". Journal of Organic Chemistry 67 (9): 3057-3064.

Tucker-Schwartz et al., "Thiol-ene Click Reaction as a General Route to Functional Trialkoxysilanes for Surface Coating Applications," J. Am. Chem. Soc., 2011, vol. 133 (29), pp. 11026-11029.

Vendra et al., "Polymer Thin Films for Biomedical Applications", *Nanomaterials for the Life Scicences vol. 5: Nanostructured Thin Films and Surfaces*, vol. 5, pp. 1-54 (2010).

Wang, Q.; et al. Bioconjugation by Copper(I)-Catalyzed Azide-Alkyne [3+2] Cycloaddition. J. Am. Chem. Soc. 2003, 125, 3192-3193.

Wang, R. & Lowe, A. B. Raft polymerization of styrenic-based phosphonium monomers and a new family of well-defined statistical and block polyampholytes. *J. Polym. Sci. A Polym. Chem.* 45, 2468-2483 (2007).

Weber, R. L. et al. Thermal and ion transport properties of hydrophilic and hydrophobic polymerized styrenic imidazolium ionic liquids. *J. Polym. Sci. B Polym. Phys* 49, 1287-1296 (2011).

Weidner, C. H. & Long, T. E. Synthesis and characterization of 3-aryl-2-(polystyryl)cyclopropenones via cyclopropenium ion substitution on polystyrene. *J. Polym. Chem. A Polym. Chem.* 33, 1-6 (1995).

Wilcox and Breslow. A convenient synthesis of bis-dialkylaminoacetylenes. Tetrahedron Letters, 21, 3241-3242 (1980).

Wilde, M. M. D. & Gravel, M. Bis(amino)cyclopropenylidenes as organocatalysts for acyl anion and extended umpolung reactions. *Angew. Chem. Int. Ed.* 52, 12651-12654 (2013).

Ye, Y., Choi, J.-H., Winey, K. L & Elabd, Y. A. Polymerized ionic liquid block and random copolymers: effect of weak microphase separation on Ion transport. *Macromolecules* 45, 7027-7035 (2012).

(56) References Cited

OTHER PUBLICATIONS

Ye, Y., Sharick, S., Davis, E. M., Winey, K. I. & Elabd, Y. A. High hydroxide conductivity in polymerized ionic liquid block copolymers. *ACS Macro Lett.* 2, 575-580 (2013).

Yoshida, Z, "Heteroatom-Substituted Cyclopropenium Compounds", *Topics in Current Chemistry*, vol. 40, p. 47-72 (1973).

Yoshida, Z. & Tawara, Y. Aminocyclopropenium ion. *J. Am. Chem. Soc.* 93, 2573-2574 (1971).

Yoshida, Z., Tawara, Y., Hirota, S. & Ogoshi, H. Vibrational spectrum of trisdimethylaminocyclopropenium perchlorate. *Bull. Chem. Soc. Jpn* 47, 797800 (1974).

Yuan, J. & Antonietti, M. Poly(ionic liquid)s: polymers expanding classical property profiles. *Polymer* 52, 1469-1482 (2011).

Yuan, J., Mecerreyes, D. & Antonietti, M. Poly(ionic liquid)s: an update. *Prog. Polym. Sci.* 38, 1009-1036 (2013).

\* cited by examiner

CYCLOPROPENIUM POLYMERS AND METHODS FOR MAKING THE SAME

CROSS-REFERENCE TO RELATED APPLICATIONS

This application is a divisional application of and claims priority from U.S. application Ser. No. 14/611,166, filed on Jan. 30, 2015, which is a Continuation in Part of International Application No. PCT/US2013/052679, which was filed on Jul. 30, 2013, and which claims priority to U.S. Provisional Application No. 61/677,837, which was filed on Jul. 31, 2012, which applications are incorporated by reference in their entireties as if recited in full herein. U.S. application Ser. No. 14/611,166, filed on Jan. 30, 2015, also claims priority to U.S. Provisional Application No. 62/092,726, filed Dec. 16, 2014, the entire contents of which are incorporated by reference.

FIELD OF INVENTION

The present invention provides, inter alia, processes for incorporating a cyclopropenium ion into a polymeric system, for making cross-linked polymers, linear polymers, and dendritic polymers, as well as for incorporating a cyclopropenium ion onto a preformed polymer. Further provided are substrates made from such processes.

BACKGROUND OF THE INVENTION

Modularly designed polymeric materials can be engineered to suit a broad range of applications representing an attractive platform for technological advancement. Materials that possess both inherent compositional versatility and ready accessibility via robust and scalable synthetic pathways are of particular import to the field (Hunt et al. 2011, Leibfarth et al. 2010). In this regard, cationic polyelectrolytes have emerged as a versatile class of materials that have been exploited in a broad array of applications (Lodge 2008, Gao et al. 2012, Hallinan et al. 2013), ranging from gene delivery (De Smedt et al. 2000, Samal et al. 2012) to ion-conducting membranes (Pan et al. 2011, Hickner et al. 2013, Chen et al. 2010), and water purification (Elimelech et al 2011, Gin et al. 2011). Development in the area of cationic polyelectrolytes has thus far focused on a limited menu of monomeric functionalities, including ammonium, phosphonium, imidazolium, pyridinium and guanidinium ions (Jangu et al. 2014, Qiu et al. 2012, Yuan et al. 2013). These heteroatomic systems, while valuable, are application specific and suffer from the ability to finely tune their physical properties. Thus, the identification of new modular cationic polyelectrolytes, with superior characteristics for processing, controllable self-assembly and function, represents an important goal for this field (Sing et al. 2014, Steele et al. 2001). In developing a new family of polyelectrolytes, certain criteria must be met (Chen et al. 2010, Gin et al. 2011, Sing et al. 2014) including: (1) thermodynamic stability; (2) ease and scalability of polymerisations by controlled methods; (3) incorporation of accessible chemical handles to allow for diversity and intimate control of physical properties and (4) tunable Coulombic interactions. As an outgrowth of ongoing research efforts, it was postulated that polyelectrolytes based on the cyclopropenium ion could satisfy these design criteria, while offering a highly distinct structural architecture and electronic properties. It was further recognized that such cyclopropenium-based systems possess unique characteristics that distinguish them from existing cationic polyelectrolytes, namely: enhanced dispersion of the positive charge (compared with ammonium, phosphonium and guanidinium systems) and weaker H-bond donor capacity (compared with imidazolium and pyridinium ions) (Curnow et al. 2011).

As the smallest of the Hückel aromatics (Hückel 1938), the cyclopropenium (CP) ion possesses significant stability despite its carbocationic nature (Breslow 1957, Bandar et al. 2013b). This remarkable degree of stability may be further enhanced through the incorporation of amino substituents onto the CP ring (Yoshida et al (1971). Indeed, with $pK_{R+}$ values estimated at >13, aminocyclopropenium ions are stable even in strongly alkaline aqueous solutions (Yoshida et al. 1974, Kerber et al. 1973). Moreover, thermal decomposition ($T_{dec}$) of the tris(dialkylamino)CP chloride salts has been measured at >300° C. (Curnow et al. 2011), significantly exceeding that of dialkylimidazolium chloride salts ($T_{dec}$, 250° C.) (Huddleston et al. 2001). These unique structural features have already inspired the development of aminocyclopropenium ions for a range of applications, including as metal ligands (Bruns et al. 2010), organocatalysts (Bander et al. 2012, Bander et al. 2013, Wilde et al. 2013) and ionic liquids (Curnow et al, 2011); however, the incorporation of these cations into a polymeric backbone has only led to polymers with unstable CP ions as intermediates (Weidner et al. 1995). Given the tunable functionality and robust, efficient and orthogonal chemistry characterizing CP ions, it is desirable to exploit them in polymeric materials.

Indeed, the ability to incorporate stable ionic moieties on linear, branched, dendritic, and cross-linked polymeric systems has led to the development of materials that can be employed in a wide variety of applications, such as water purification, drug delivery, gene therapy, antimicrobial coatings, ion transporting membranes, and as cell substrates, among others. For example, water desalination membranes are currently being synthesized by cross-linking polymerization of 1,3-benzenediamine and trimesoyl chloride, to yield a polyelectrolyte. Other materials, such as electrostatic layers have also been evaluated. Starpharma has developed dendritic polyelectrolytes based on polyamidoamine (PAMAM) as HIV prevention drugs and for drug delivery. Drug delivery vectors containing guanidine have also been shown to be effective mimics of cell-penetrating peptides.

Such polymers are desirable for many reasons, but available materials suffer from a number of limitations, such as pH sensitivity, difficulty of synthesis, or lack of variability. For example, in water purification membranes, currently available materials lack tunable mechanical properties and can be brittle. Furthermore, the chemistry is more difficult to manage due to the fact that the acid chlorides that are currently used are water sensitive, and must be processed in dry conditions.

Accordingly, there is a need for, inter alia, stable ionic moieties on linear, branched, dendritic, and cross-linked polymeric systems that are simple to prepare, are broadly tunable in terms of their properties, and are stable across a wide range of pH levels. The present invention is directed to meeting these and other needs.

SUMMARY OF THE INVENTION

Here, the synthesis and evaluation of a new family of cationic polyelectrolytes is described. As outlined in FIG. 4b, a vision for the design of the parent ionic monomer includes a polymerisable unit, a spectator group (which could also serve as a functional handle) and four additional modular groups that provide the means to tune the physical properties of the resulting macromolecules. These initial studies, focused on styrenic CP monomers (termed, CPR) bearing a series of dialkylamino (NR$_2$) substituents. Styrene-based monomers can be subjected to various reversible-deactivation radical polymerization strategies (Hawker et al. 2001, Matyjaszewsld et al. 2001, Chiefari et al. 1998). Reversible-addition fragmentation chain transfer (RAFT) polymerization (Chiefari et al. 1998) was used to assemble homopolymers, statistical copolymers and diblock copolymers of different compositions ranging from 20 to 50 mol % of CP functionality. It was demonstrated that macromolecular assemblies of these materials can be used as ion-conducting membranes, and that the physical properties of these assemblies may be tuned through variation of the dialkylamino handles. In addition, it was demonstrated that CPR monomers undergo a surfactant-free emulsion polymerization with styrene, yielding well defined, sub-100 nm nanoparticles with charged surfaces.

The inventors have discovered the ability to incorporate a cyclopropenium cation (CPC) into polymeric architectures and modular platforms and to exploit these materials in applications where stable polycationic species are desired. The CPC is an esoteric functional group in materials chemistry. It has the unique ability to remain positively charged at high pH, a property that is difficult to match with any other functional group. Conventional materials having ionic moieties integrated into polymeric systems traditionally have used basic units that are protonated (such as amines), and these materials tend to lose their charge at pHs above 7. Due to the loss of charge at physiological conditions, such conventional materials are less efficient in their respective applications, including but not limited to desalinization, drug delivery, surface coatings, antimicrobial coatings, etc. In contrast, the stable polycationic materials of the present invention are simple to prepare, are broadly tunable in terms of their properties, and are stable in pHs ranging from 0 to greater than 14. Thus, the stable polycationic materials of the present invention will provide unparalleled performance for drug delivery, DNA binding, desalinization, and myriad other applications.

In this regard, one embodiment of the present invention is a process for incorporating a cyclopropenium ion into a polymeric system. This process comprises contacting a functionalized cyclopropenium ion with a functionalized compound capable of reacting with the functional group of the cyclopropenium ion for a period of time and under conditions suitable for the functionalized cyclopropenium and the functionalized compound to react and form a polymeric system that comprises a stable cyclopropenium cation that remains positively charged at a high pH.

Another embodiment of the present invention is a process for making a cross-linked polymer. This process comprises contacting an alkene functionalized cyclopropenium ion with a polymer comprising a pendant thiol group, for a period of time and under conditions suitable for the functionalized cyclopropenium ion and the polymer to react and form a cross-linked polymer that comprises a stable cyclopropenium cation that remains positively charged at a high pH.

Yet another embodiment of the present invention is a process for making a cross-linked polymer. This process comprises contacting a thiol functionalized cyclopropenium ion with a functionalized compound comprising an alkene group, for a period of time and under conditions suitable for the functionalized cyclopropenium ion and the functionalized compound to react and form a cross-linked polymer that comprises a stable cyclopropenium cation that remains positively charged at a high pH.

A further embodiment of the present invention is a process for making a linear polymer. This process comprises contacting a functionalized cyclopropenium ion with a polymerizing agent for a period of time and under conditions suitable for the functionalized cyclopropenium ion to react and to form a linear polymer that comprises a stable cyclopropenium cation that remains positively charged at a high pH.

An additional embodiment of the present invention is a process for incorporating a cyclopropenium ion onto a preformed polymer. This process comprises contacting a cyclopropenium ion functionalized to participate in a click reaction with a preformed polymer backbone having a pendant group that is functionalized with a complementary group suitable for participating in a click reaction with the cyclopropenium ion for a period of time and under conditions suitable for the functionalized cyclopropenium ion and the preformed polymer to react via a click chemistry mechanism and form a polymer that comprises a stable cyclopropenium cation that remains positively charged at a high pH.

Another embodiment of the present invention is a process for making a dendritic polymer. This process comprises the steps of:

a. providing a first functionalized compound comprising a cyclopropenium ion, which has a reactive group at each position of the ring; and b. grafting a second functionalized compound onto each reactive group of the first functionalized compound such that chemical bonds are formed between the first functionalized compound and the second functionalized compound at the reactive groups, the second functionalized compound including reactive groups capable of forming bonds with the reactive groups on the cyclopropenium ion, and wherein the bonds are formed through a click chemistry mechanism.

An additional embodiment of the present invention is a stable, polycationic compound made by any process disclosed herein.

A further embodiment of the present invention is a polymer that comprises a stable cyclopropenium cation that remains positively charged at a high pH, the polymer having the structure:

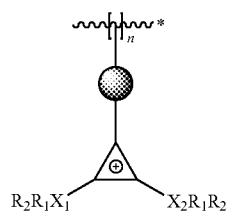

wherein
$X_{1-2}$ are independently selected from the group consisting of Cl, N, and any other atom suitable for participating in the process;
$R_{1-2}$ are independently selected from the group consisting of no atom, amino, aryl, heteroaryl, $C_{1-10}$alkoxy, $C_{2-10}$alkenyloxy, $C_{2-10}$alkynyloxy, $C_{1-10}$alkyl, $C_{3-10}$cycloalkyl, $C_{2-10}$alkenyl, $C_{3-10}$cycloalkenyl, $C_{2-10}$alkynyl, halogen, aryloxy, heteroaryloxy, $C_{2-10}$alkoxycarbonyl, $C_{1-10}$alkylthio, $C_{2-10}$alkenylthio, $C_{2-10}$alkynylthio, $C_{1-10}$alkylsulfonyl, $C_{1-10}$alkylsulfinyl, aryl-$C_{1-10}$alkyl, heteroaryl-$C_{1-10}$alkyl, aryl-$C_{1-10}$heteroalkyl, heteroaryl-$C_{1-10}$heteroalkyl, a phosphorus group, a silicon group and a boron group, wherein $R_1$ and $R_2$ are optionally combined to form a 5 to 8-membered carbocyclic or heterocyclic ring; further wherein the aliphatic or aromatic portions of $R_1$ and $R_2$ are optionally substituted with from 1 to 4 substituents selected from the group consisting of halogen, cyano, nitro, $C_{1-4}$alkyl, $C_{2-6}$alkenyl, $C_{2-6}$alkynyl, aryl, $C_{1-6}$alkoxy, $C_{2-6}$alkenyloxy, $C_{2-6}$alkynyloxy, aryloxy, $C_{2-6}$alkoxycarbonyl, $C_{1-6}$alkylthio, $C_{1-6}$alkylsulfonyl, $C_{1-6}$alkylsulfinyl, oxo, imino, thiono, primary amino, carboxyl, $C_{1-6}$alkylamino, $C_{1-6}$dialkylamino, amido, nitrogen heterocycles, hydroxy, thiol and phosphorus;

represents a suitable linking group; and
n is an integer.

Another embodiment of the present invention is a cross-linked polymer. This polymer comprises a stable cyclopropenium cation that remains positively charged at a high pH, the cross-linked polymer having the structure:

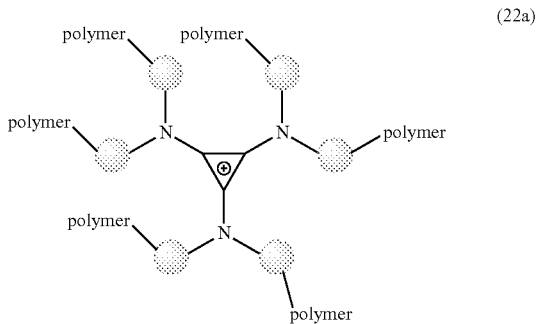

(22a)

wherein

represents a suitable linking group; and
polymer is any polymer that can be bonded to the cyclopropenium ion.

An additional embodiment of the present invention is a dendrimer having (1) a cationic core comprising a tri-functional cyclopropenium monomer and (2) at least two ordered dendritic core branches which (a) are covalently bonded to the cationic core, (b) extend through at least two generations, and (c) have at least 3 terminal groups per core branch.

A further embodiment of the present invention is a substrate. This substrate comprises a stable, polycationic compound made by any process disclosed herein.

Another embodiment of the present invention is a support coated with any substrate disclosed herein for use in a water purification system.

Additional embodiments of the present invention include an antimicrobial coating, an ion-transport membrane, and a cell support, each of which comprises a substrate as disclosed herein.

Yet another embodiment of the present invention is a drug delivery vehicle comprising a stable cationic dendritic polymer made according to any method disclosed herein.

A further embodiment of the present invention is a gene therapeutic vector comprising a stable cationic dendritic polymer made according to any method disclosed herein.

Another embodiment of the present invention is a process for incorporating a cyclopropenium ion into a polymeric system. This process comprises contacting a functionalized cyclopropene with a functionalized compound capable of reacting with the functionalized cyclopropene for a period of time and under conditions suitable for the functionalized cyclopropene and the functionalized compound to react and form a polymeric system that comprises a stable cyclopropenium cation that remains positively charged at a high pH.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
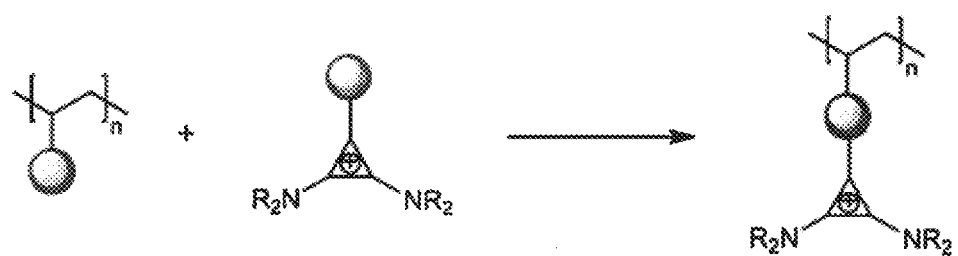
FIG. 1 shows a schematic representation of clicking the cyclopropenium groups onto a preformed polymer.

One embodiment of the present invention is a process for incorporating a cyclopropenium ion into a polymeric system. This process comprises contacting a functionalized cyclopropenium ion with a functionalized compound capable of reacting with the functional group of the cyclopropenium ion for a period of time and under conditions suitable for the functionalized cyclopropenium and the functionalized compound to react and form a polymeric system that comprises a stable cyclopropenium cation that remains positively charged at a high pH.

In the present invention "incorporating" means to reset and form a bond between, e.g., a cyclopropenium ion and a preformed or currently forming polymeric system. Preferably, the bond formed between the cyclopropenium and the polymeric system is covalent.

As used herein, the term "cyclopropenium ion" means a charged species derived from a cyclopropene having the structure:

(cyclopropene)

Derivatives of cyclopropenes, such as tetrachlorocyclopropene, are commercially available from e.g., Sigma Aldrich (St. Louis, Mo.). As is also known, cyclopropenium ions are highly geometrically strained, but they are stabilized due to aromaticity. Various methods for making cyclopropenium ions are also known. See, e.g., Wilcox et al., 1980; Yoshida, 1973.

In one aspect of the present embodiment, the polymeric system may be any polymer containing agents into which a stable cyclopropenium cation that remains positively charged at a high pH may be integrated. As used herein, a "polymeric system" means a macromolecule having repeating sub-units that are connected by covalent bonds. Non-limiting examples of polymeric systems include linear polymers, branched polymers, cross-linked polymers, and dendritic polymers. "Linear polymers" mean polymers whose subunits are arranged in a linear chain. "Branched polymers" mean polymers whose chains have branching points that connect two or more chain segments. Branching generally occurs by the replacement of a substituent, e.g., a hydrogen atom, on a monomer subunit, by another covalently bonded chain of that polymer or by a chain of another type. "Cross-linked polymers" mean branched polymers in which adjacent long chains are joined to one and another at various positions along their lengths. The cross-linking creates greater rigidity and stability. "Dendritic polymers" or "dendrimers" mean a polymer having a polyvalent core that is covalently bonded to at least two ordered dendritic (tree-like) branches which extend through at least two generations. Dendrimers thus have a starburst structure. As an exemplary illustration only, an ordered second generation dendritic branch is depicted by the following configuration:

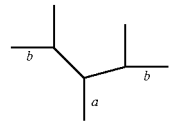

wherein "a" represents the first generation and "b" represents the second generation. An ordered, third generation dendritic branch may be depicted by the following exemplary configuration:

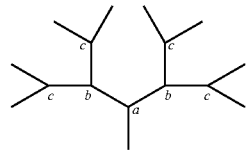 [SMILES: CC(C)C(C(C)C)C(C)C(C(C)C)C(C)C]

wherein "a" and "b" represent the first and second generation, respectively, and "c" represents the third generation. A primary characteristic of the ordered dendritic branch which distinguishes it from conventional branches of conventional polymers is the uniform or essentially symmetrical character of the branches as is shown in the foregoing exemplary illustrations. In addition, with each new generation, the number of terminal groups on the dendritic branch is an exact multiple of the number of terminal groups in the previous generation. In the present invention, the number of generations is unlimited. Preferably, however, there are from about 1-1,000 generations, such as from about 1-500, 1-250, 1-100, 1-50, 1-25, 1-15, 1-10, 1-5, including 1-3 generations. The number of generations will be determined based on the particular end use of the final product.

As used herein, the term "functionalized" with reference to the cyclopropenium ion and the compound means possessing a functional group, which is an atom, or a group of atoms that has similar chemical properties whenever it occurs in different compounds. The respective functional groups, under certain suitable conditions defined herein, react to form the polymeric system.

Functional groups include without limitation, alkoxy, alkoxycarbonyl, alkyl, alkenyl, alkenyloxy, alkenylthio, alkylamino, alkylsulfinyl, alkylsulfonyl, alkylthio, alkynyloxy, alkynylthio, amino, amido, aryl, aryloxy, aryl-alkyl, aryl-heteroalkyl, azide, carbocycle, carbonyl, carboxy, carboxylate, cyano, cycloalkyl, cycloalkenyl, ether, halo, heteroaryl, heteroaryloxy, heteroaryl-alkyl, heteroaryl-heteroalkyl, heteroalkyl, heteroaromatic, heterocycle, hydrocarbyl, hydroxyalkyl, hydroxyl, imino, nitro, polycycle, oxo, sulfate, sulfinyl, sulfonyl, thiol, thioalkyl, and thiono groups.

As used herein, conditions "suitable" for the functionalized cyclopropenium and the functionalized compound to react and form a polymeric system are as exemplified herein and may also include those conditions disclosed by, e.g., Campos, 2008a and Campos 2008b. Parameters that may be varied to achieve such "suitable" conditions include the concentration of the reactants, the duration of the reaction, the temperature of the reaction, the selection/use of solvent(s), and other reagents for isolating or otherwise purifying the products. Non-limiting exemplary "conditions suitable" for this process are disclosed, e.g., in the Examples herein and may be further apparent to those skilled in the art in view of the disclosures herein.

In the present invention, a "stable" cyclopropenium cation means a cyclopropenium group with a positive charge that is not particularly reactive under anticipated conditions of use, and retains its useful properties on the timescale of its expected usefulness. For example, a stable cyclopropenium cation would not undergo ring opening reactions under normal conditions.

In the present invention, the polymeric system formed by contacting a functionalized cyclopropenium ion with a functionalized compound includes a stable cyclopropenium cation that is positively charged preferably over a large pH range such as, e.g., from 0 to greater than 14. Preferably, such cyclopropenium cation remains positively charged at a high pH, such as, e.g., a pH above 7, such as 7.5, 8, 8.5, 9, 9.5, 10, 10.5, 11, 11.5, 12, 12.5, 13, 13.5, or 14. More preferably, the cyclopropenium cation incorporated into the polymeric system remains positively charged in a pH range from 8 to 13.

In another aspect of this embodiment, the functionalized cyclopropenium ion is a compound of formula (100):

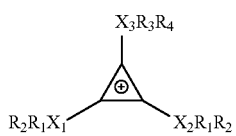

(100)

wherein $X_{1-3}$ are independently selected from the group consisting of Cl, N and any other atoms suitable for participating in the process; and $R_{1-4}$ are independently selected from the group consisting of no atom, amino, aryl, heteroaryl, $C_{1-10}$alkoxy, $C_{2-10}$alkenyloxy, $C_{2-10}$alkynyloxy, $C_{1-10}$alkyl, $C_{3-10}$cycloalkyl, $C_{2-10}$alkenyl, $C_{3-10}$cycloalkenyl, $C_{2-10}$alkynyl, halogen, aryloxy, heteroaryloxy, $C_{2-10}$alkoxycarbonyl, $C_{1-10}$alkylthio, $C_{2-10}$alkenylthio, $C_{2-10}$alkynylthio, $C_{1-10}$alkylsulfonyl, $C_{1-10}$alkylsulfinyl, aryl-$C_{1-10}$alkyl, heteroaryl-$C_{1-10}$alkyl, aryl-$C_{1-10}$heteroalkyl, heteroaryl-$C_{1-10}$heteroalkyl, a phosphorus group, a silicon group and a boron group, wherein $R_1$ and $R_2$ or $R_3$ and $R_4$ are optionally combined to form a 5 to 8-membered carbocyclic or heterocyclic ring; further wherein the aliphatic or aromatic portions of $R_1$ and $R_2$ are optionally substituted with from 1 to 4 substituents selected from the group consisting of halogen, cyano, nitro, $C_{1-4}$alkyl, $C_{2-6}$alkenyl, $C_{2-6}$alkynyl, aryl, $C_{1-6}$alkoxy, $C_{2-6}$alkenyloxy, $C_{2-6}$alkynyloxy, aryloxy, $C_{2-6}$alkoxycarbonyl, $C_{1-6}$alkylthio, $C_{1-6}$alkylsulfonyl, $C_{1-6}$alkylsulfinyl, oxo, imino, thiono, primary amino, carboxyl, $C_{1-6}$alkylamino, $C_{1-6}$dialkylamino, amido, nitrogen heterocycles, hydroxy, thiol and phosphorus.

As used herein, atoms "suitable for participating in the process" means atoms that do not interfere with the incorporation of a cyclopropenium ion into a polymeric system. Besides N and Cl, non-limiting examples of other atoms that are suitable for participating in the process may include halogens such as F, Br, and I.

Preferably, the functionalized cyclopropenium ion is selected from the group consisting of:

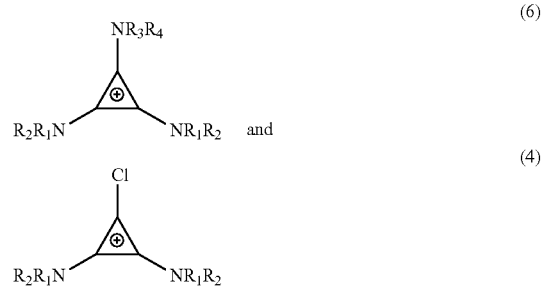

optionally together with an appropriate counter ion. Such counter ions may be any negatively charged ion, including without limitation, chloride, bicarbonate, phosphate, and sulfate ions.

In another preferred embodiment, the functionalized cyclopropenium ion is selected from the group consisting of:

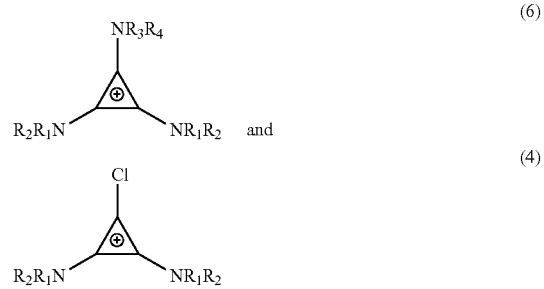

wherein
R$_{1-4}$ are independently selected from the group consisting of

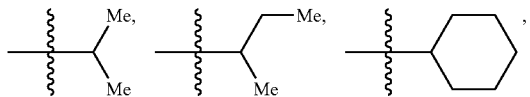

and combinations thereof.

In yet another preferred embodiment, the functionalized cyclopropenium ion is selected from the group consisting of:

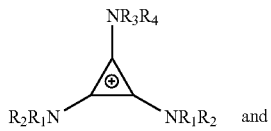 and (6)

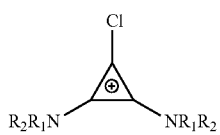

(4)

wherein
R$_{1-4}$ are independently selected from the group consisting of

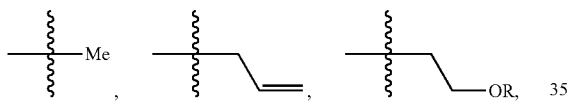

wherein R is any group that is suitable for participating in the process of incorporating the cyclopropenium ion into the polymeric system; and combinations thereof.

As used herein, a group that is "suitable for participating in the process of incorporating the cyclopropenium ion into the polymeric system" is any chemical group that can be stably attached to the cyclopropenium ion in the polymeric system. Such suitable groups are selected from moieties that are not overly bulky, such as, e.g., hydrogen and methyl, so as to minimize crowding around the cyclopropenium ion.

In yet another preferred embodiment, the functionalized cyclopropenium ion is:

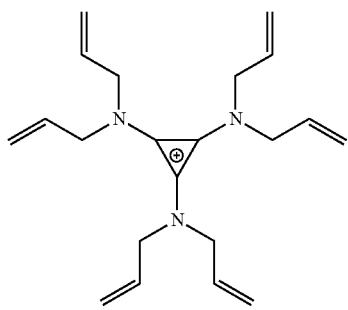

(21)

In an additional preferred embodiment, the functionalized cyclopropenium ion is:

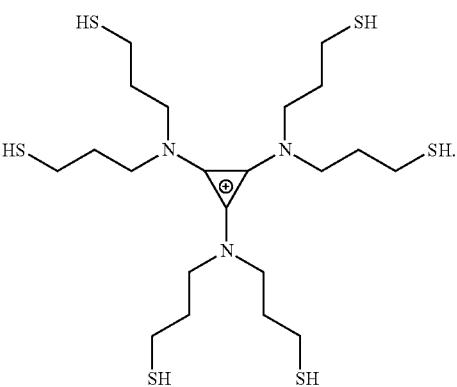

(23)

In a further preferred embodiment, the functionalized cyclopropenium ion is:

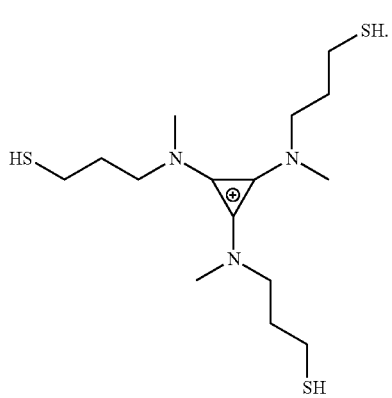

(24)

In another preferred embodiment, the functionalized cyclopropenium ion is:

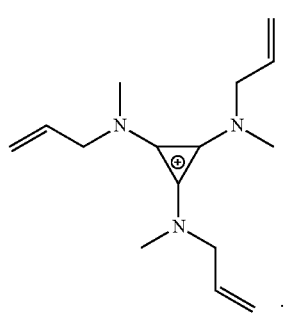

(25)

In a further aspect of this embodiment, the functionalized compound capable of reacting with the functional group of the cyclopropenium ion is a polymer selected from the group consisting of a linear polymer, a branched polymer, a cross-linked polymer, and a dendritic polymer. Preferably, the polymer is a homopolymer or a heteropolymer. As used herein, a "homopolymer" is a polymer that contains only a single type of repeating sub-unit. A "heteropolymer" or "copolymer" is a polymer containing a mixture of repeating sub-units. Heteropolymers include random copolymers, block copolymers, and graft copolymers.

As used herein, a "random copolymer" means a copolymer in which the probability of finding a given monomeric unit at any given site in the chain is independent of the nature of the adjacent units.

As used herein, a "block copolymer" means a copolymer containing blocks or segments of different polymerized monomers.

As used herein, a "graft copolymer" means a copolymer with one or more species of segments connected to the backbone as side chains, these side chains having different composition or sequence distribution from the backbone. The term "backbone" as used herein refers to that portion of the polymer which is a continuous chain. The term "side chain" refers to portions of the polymer that append from the backbone.

In another aspect of this embodiment, the backbone of the polymer comprises a group selected from the group consisting of ethylene, propylene, styrene, (meth)acrylate, vinyl chloride, urethane, ethylene terephthalate, ester, amide, norbornene, silicon, oxygen, and combinations thereof.

In another aspect of this embodiment the functionalized cyclopropenium ion is a compound of formula (100):

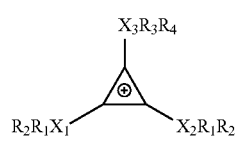

(100)

wherein
$X_{1-3}$ are independently selected from the group consisting of Cl, N, and any other atom suitable for participating in the process; and
$R_{1-4}$ are independently selected from the group consisting of no atom, amino, aryl, heteroaryl, $C_{1-10}$alkoxy, $C_{2-10}$alkenyloxy, $C_{2-10}$alkynyloxy, $C_{1-10}$alkyl, $C_{3-10}$cycloalkyl, $C_{2-10}$alkenyl, $C_{3-10}$cycloalkenyl, $C_{2-10}$alkynyl, halogen, aryloxy, heteroaryloxy, $C_{2-10}$alkoxycarbonyl, $C_{1-10}$alkylthio, $C_{2-10}$alkenylthio, $C_{2-10}$alkynylthio, $C_{1-10}$alkylsulfonyl, $C_{1-10}$alkylsulfinyl aryl-$C_{1-10}$alkyl, heteroaryl-$C_{1-10}$alkyl, $C_{1-10}$alkyl-aryl-$C_{2-6}$alkenyl, aryl-$C_{1-10}$heteroalkyl, heteroaryl-$C_{1-10}$heteroalkyl, a phosphorus group, a silicon group and a boron group, wherein $R_1$ and $R_2$ or $R_3$ and $R_4$ are optionally combined to form a 5 to 8-membered carbocyclic or heterocyclic ring; further wherein the aliphatic or aromatic portions of $R_1$ and $R_2$ are optionally substituted with from 1 to 4 substituents selected from the group consisting of halogen, cyano, nitro, $C_{1-4}$alkyl, $C_{2-6}$alkenyl, $C_{2-6}$alkynyl, aryl, $C_{1-6}$alkoxy, $C_{2-6}$alkenyloxy, $C_{2-6}$alkynyloxy, aryloxy, $C_{2-6}$alkoxycarbonyl, $C_{1-6}$alkylthio, $C_{1-6}$alkylsulfonyl, $C_{1-6}$alkylsulfinyl, oxo, imino, thiono, primary amino, carboxyl, $C_{1-6}$alkylamino, $C_{1-6}$dialkylamino, amido, nitrogen heterocycles, hydroxy, thiol and phosphorus.

In a further aspect of this embodiment the functionalized cyclopropenium ion is selected from the group consisting of:

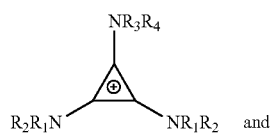

(6)

and

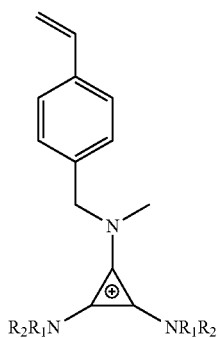

wherein
$R_1$ and $R_2$ are independently selected from the group consisting of

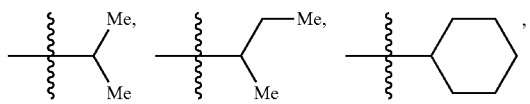

wherein $R_1$ and $R_2$ are optionally combined to form

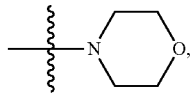

and combinations thereof.

In a preferred aspect of this embodiment the functionalized cyclopropenium ion is selected from the group consisting of:

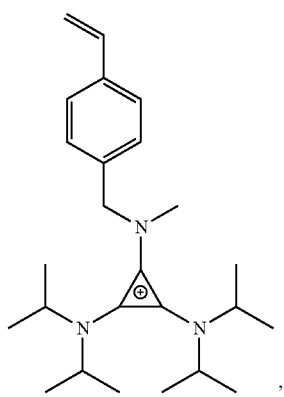

-continued
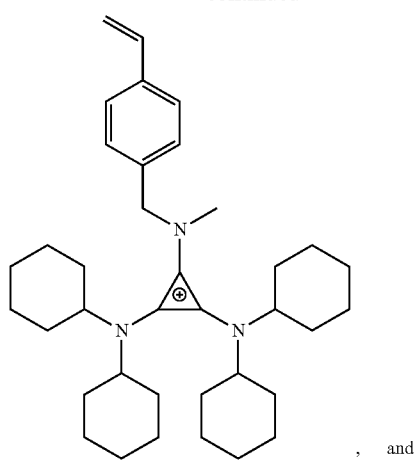
, and
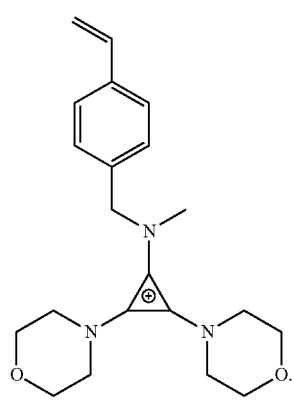
In another preferred aspect of this embodiment, the process is carried out according to a process selected from the following:
a)
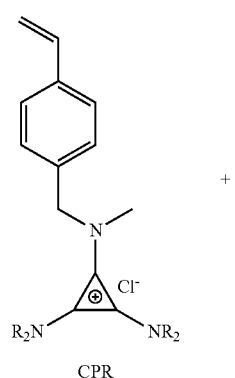
CPR
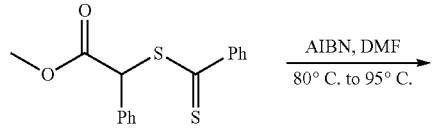
-continued
Homopolymer
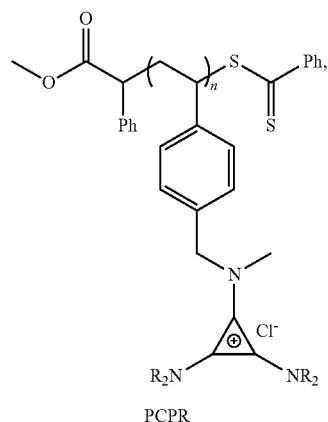
b)
Homopolymer
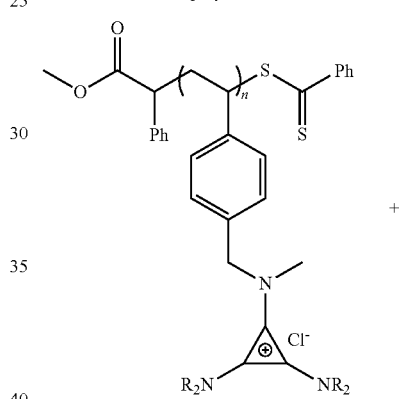
PCPR
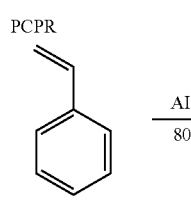
$\xrightarrow{\text{AIBN, DMF}}_{\text{80 to 90° C.}}$
Block copolymer
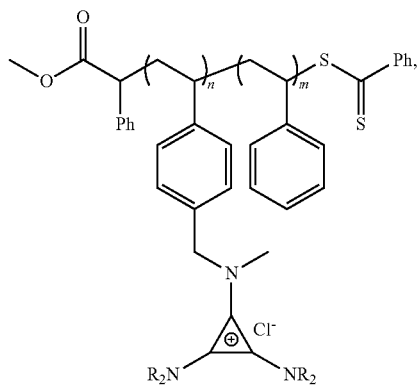
PS-b-PCPR c)

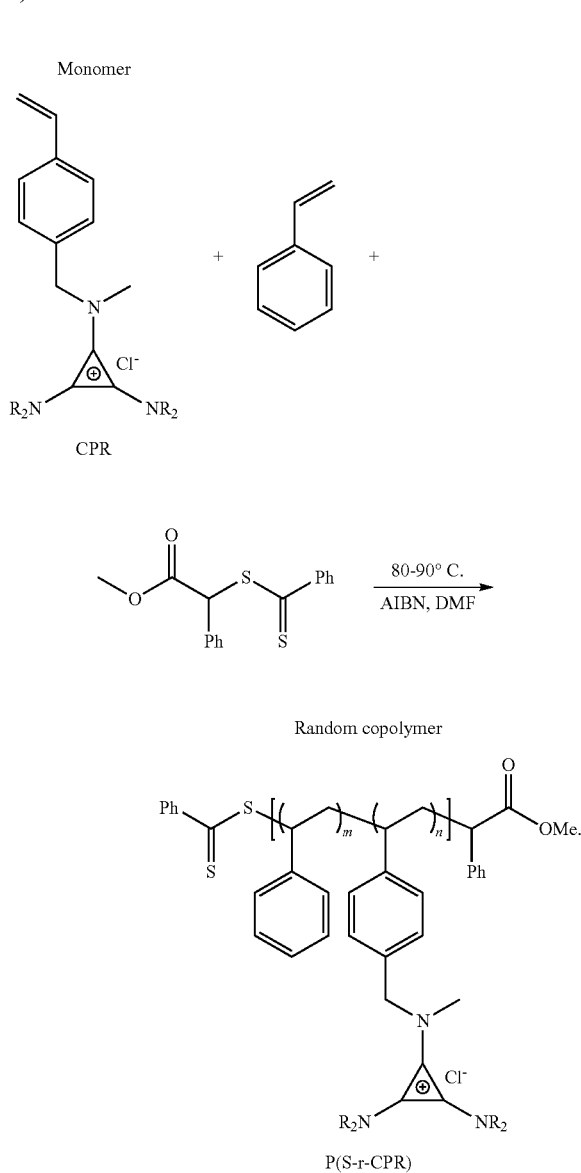

Another embodiment of the present invention is a stable, polycationic compound made by a process of the invention.

Another embodiment of the present invention is a substrate comprising a compound of the invention.

Another embodiment of the present invention is a support coated with a substrate of the invention for use in an electronic device.

Another embodiment of the present invention is a process for making a cross-linked polymer. This process comprises contacting an alkene functionalized cyclopropenium ion with a polymer comprising a pendant thiol group, for a period of time and under conditions suitable for the functionalized cyclopropenium ion and the polymer to react and form a cross-linked polymer that comprises a stable cyclopropenium cation that remains positively charged at a high pH.

In one aspect of this embodiment, the process is carried out according to the following reaction:

In this reaction, n may be any integer. Preferably, n is from 1 to $10^{10}$, such as from 1 to $10^7$, 1 to $10^5$, 1 to 1000, 1 to 500, 1 to 50, and 1 to 10. Selection of the size of the polymer will be driven by the desired functions of the cross-linked polymer.

The initiator in this reaction is preferably, a radical initiator that is activated by heat or light, such as, e.g., phenylacetophenone (DMPA), azobisisobutyronitrile (AIBN), 4,4'-azobis(4-cyanovaleric acid), 1,1'-azobis(cyclohexanecarbonitrile), 2-benzyl-2-(dimethylamino)-4'-morpholinobutyrophenone, 4'-tert-butyl-2',6'-dimethylacetophenone, 2,2-diethoxyacetophenone, 2,2-dimethoxy-2-phenylacetophenone, diphenyl(2,4,6-trimethylbenzoyl) phosphine oxide/2-hydroxy-2-methylpropiophenone, 4'-ethoxyacetophenone, 3'-hydroxyacetophenone, 4'-hydroxyacetophenone, 1-hydroxycyclohexyl phenyl ketone, 2-hydroxy-4'-(2-hydroxyethoxy)-2-methylpropiophenone, 2-hydroxy-2-methylpropiophenone, 2-methyl-4'-(methylthio)-2-morpholinopropiophenone, 4'-phenoxyacetophenone, benzoin, 4,4'-dimethoxybenzoin, 4,4'-dimethylbenzil, benzophenone-3,3',4,4'-tetracarboxylic dianhydride, 4-benzoylbiphenyl, 4,4'-bis(diethylamino)benzophenone, 4,4'-bis[2-(1-propenyl)phenoxy]benzophenone, 4-(diethylamino) benzophenone, 4,4'-dihydroxybenzophenone, 4-(dimethylamino)benzophenone, 3,4-dimethylbenzophenone, 3-hydroxybenzophenone, 4-hydroxybenzophenone, 2-methylbenzophenone, 3-methylbenzophenone, 4-methylbenzophenone, methyl benzoylformate, michler's ketone, bis(4-tert-butylphenyl)iodonium perfluoro-1-butanesulfonate, bis(4-tert-butylphenyl)iodonium p-toluenesulfonate, bis(4-tert-butylphenyl)iodonium triflate, boc-methoxyphenyldiphenylsulfonium triflate, (4-bromophenyl)diphenylsulfonium triflate, (tert-butoxycarbonylmethoxynaphthyl)-diphenylsulfonium triflate, (4-tert-butylphenyl)diphenylsulfonium triflate, diphenyliodonium hexafluorophosphate, diphenyliodonium nitrate, diphenyliodonium perfluoro-1-butanesulfonate, diphenyliodonium p-toluenesulfonate, diphenyliodonium triflate, (4-fluorophenyl)diphenylsulfonium triflate, n-hydroxynaphthalimide triflate, n-hydroxy-5-norbornene-2,3-dicarboximide perfluoro-1-butanesulfonate, (4-iodophenyl)diphenylsulfonium triflate, (4-methoxyphenyl)diphenylsulfonium triflate, 2-(4-methoxystyryl)-4,6-bis(trichloromethyl)-1,3,5-triazine, (4-methylphenyl)diphenylsulfonium triflate, (4-methylthiophenyl)methyl phenyl sulfonium triflate, 1-naphthyl diphenylsulfonium triflate, (4-phenoxyphenyl)diphenylsulfonium triflate, (4-phenylthiophenyl)diphenylsulfonium triflate, triarylsulfonium hexafluoroantimonate, triarylsulfonium hexafluorophosphate, triphenylsulfonium perfluoro-1-butanesufonate, triphenylsulfonium triflate, tris(4-tert-butylphenyl)sulfonium perfluoro-1-butanesulfonate, tris(4-tert-butylphenyl)sulfonium triflate, 1-chloro-4-propoxy-9h-thioxanthen-9-one, 2-chlorothioxanthen-9-one, 2,4-diethyl-9h-thioxanthen-9-one, isopropyl-9h-thioxanthen-9-one, 10-methylphenothiazine, thioxanthen-9-one, persulfate, tert-butyl hydroperoxide, tert-butyl peracetate, cumene hydroperoxide, 2,5-di(tert-butylperoxy)-2,5-dimethyl-3-hexyne, dicumyl peroxide, 2,5-bis(tert-butylperoxy)-2,5-dimethylhexane, 2,4-pentanedione peroxide, 1-bis(tert-butylperoxy)-3,3,5-trimethylcyclohexane, 1,1-bis(tert-butylperoxy)cyclohexane, 1,1-bis(tert-amylperoxy)cyclohexane, benzoyl peroxide, 2-butanone peroxide, tert-butyl peroxide, di-tert-amyl peroxide, lauroyl peroxide, tert-butyl peroxybenzoate, tert-butylperoxy 2-ethylhexyl carbonate, tert-butyl hydroperoxide, and lithium phenyl-2,4,6-trimethylbenzoylphosphinate (LAP) (Fairbanks et al., 2009).

Yet another embodiment of the present invention is a process for making a cross-linked polymer. This process comprises contacting a thiol functionalized cyclopropenium ion with a functionalized compound comprising an alkene group, for a period of time and under conditions suitable for the functionalized cyclopropenium ion and the functionalized compound to react and form a cross-linked polymer that comprises a stable cyclopropenium cation that remains positively charged at a high pH.

In one aspect of this embodiment, the process is carried out according to the following reaction:

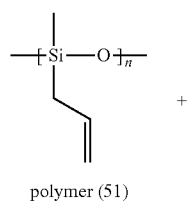

polymer (51)

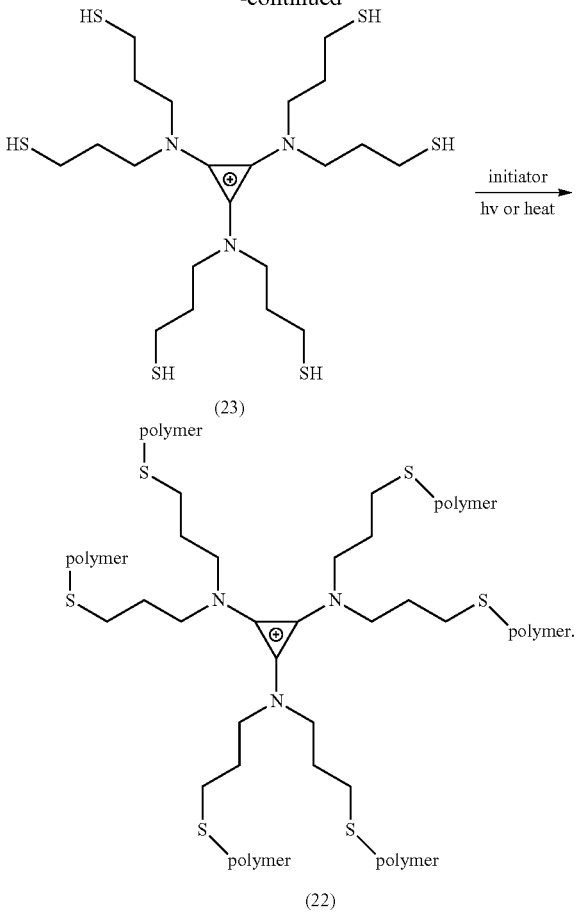

In this embodiment, "n", "initiator", and "polymer" are as disclosed above.

Another embodiment of the present invention is a process for making a linear polymer. This process comprises contacting a functionalized cyclopropenium ion with a polymerizing agent for a period of time and under conditions suitable for the functionalized cyclopropenium ion to react and to form a linear polymer that comprises a stable cyclopropenium cation that remains positively charged at a high pH.

In this embodiment, a "polymerizing agent" is a substance that facilitates the formation of covalent bonds among monomers to form polymers. Polymerizing agents include radical initiators, Reversible Addition-Fragmentation chain Transfer (RAFT) agents, and catalysts for click chemistry. Radical initiators are as disclosed above. RAFT agents include without limitation,

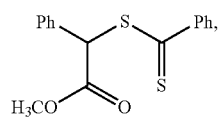

pentamethyldiethylenetriamine (PMDETA), dithioesters, dithiocarbamates, trithiocarbonates, and xanthates. Catalysts for click chemistry include without limitation Cu(I).

In one aspect of this embodiment, the process further comprises contacting the functionalized cyclopropenium ion with a monomer suitable for forming a copolymer with the functionalized cyclopropenium ion. In the present invention, a suitable monomer is one that will not interfere with the reaction in a substantive way and that provides a desired attribute as a part of the copolymer. Representative non-limiting examples of a suitable monomer in this reaction include vinyl monomers, pyrolyzates, alcohols, phenols, carboxylic acids, and their salts, esters, anhydrides, amides, hydrazides, urethanes, cyanates, fulminates, heterocycles, amino, and thiocarboxylic acids, and sulphonamides.

In another aspect of this embodiment, the process is carried out according to the following reaction:

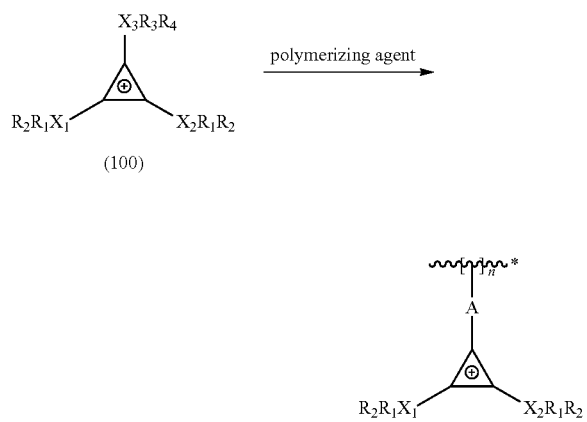

wherein

is any suitable polymer backbone;

$X_{1-3}$ are independently selected from the group consisting of Cl, N, and any other atom suitable for participating in the process;

$R_{1-4}$ are independently selected from the group consisting of no atom, amino, aryl, heteroaryl, $C_{1-10}$alkoxy, $C_{2-10}$alkenyloxy, $C_{2-10}$alkynyloxy, $C_{1-10}$alkyl, $C_{3-10}$cycloalkyl, $C_{2-10}$alkenyl, $C_{3-10}$cycloalkenyl, $C_{2-10}$alkynyl, halogen, aryloxy, heteroaryloxy, $C_{2-10}$alkoxycarbonyl, $C_{1-10}$alkylthio, $C_{2-10}$alkenylthio, $C_{2-10}$alkynylthio, $C_{1-10}$alkylsulfonyl, $C_{1-10}$alkylsulfinyl, aryl-$C_{1-10}$alkyl, heteroaryl-$C_{1-10}$alkyl, aryl-$C_{1-10}$heteroalkyl, heteroaryl-$C_{1-10}$heteroalkyl, a phosphorus group, a silicon group and a boron group, wherein $R_1$ and $R_2$ or $R_3$ and $R_4$ are optionally combined to form a 5 to 8-membered carbocyclic or heterocyclic ring; further wherein the aliphatic or aromatic portions of $R_1$ and $R_2$ are optionally substituted with from 1 to 4 substituents selected from the group consisting of halogen, cyano, nitro, $C_{1-4}$alkyl, $C_{2-6}$alkenyl, $C_{2-6}$alkynyl, aryl, $C_{1-6}$alkoxy, $C_{2-6}$alkenyloxy, $C_{2-6}$alkynyloxy, aryloxy, $C_{2-6}$alkoxycarbonyl, $C_{1-6}$alkylthio, $C_{1-6}$alkylsulfonyl, $C_{1-6}$alkylsulfinyl, oxo, imino, thiono, primary amino, carboxyl, $C_{1-6}$alkylamino, $C_{1-6}$dialkylamino, amido, nitrogen heterocycles, hydroxy, thiol and phosphorus, wherein one of $R_3$ or $R_4$ is a group that forms a polymer backbone when contacted with the polymerizing agent; and A is selected from the group consisting of:

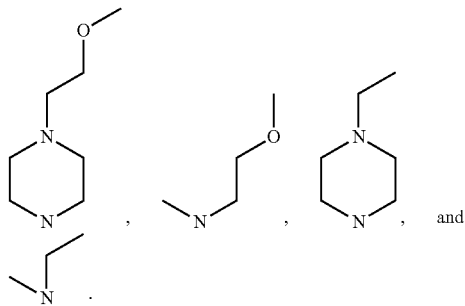

The polymerizing agent is as disclosed above. Preferably, the polymerizing agent is DMPA or AIBN.

In this aspect of the present invention, the length of the polymer backbone is not critical and is readily determined and/or modified according to the end use of the linear polymer. Thus n may be any positive integer. For example, n may vary between 1-1,000,000, such as 1-500,000, or 1-250,000, or 1-100,000, or 1-50,000, or 1-25,000, or 1-10,000, or 1-1,000, or 1-500, or 1-250, or 1-100, or 1-50, or 1-25, or 1-10, or 1-5.

Preferably, the backbone of the polymer is selected from the group consisting of polymers based on styrene, (meth) acrylate, norbornene, and combinations thereof.

In another preferred embodiment, $R_1$ and $R_2$ are independently selected from the group consisting of:

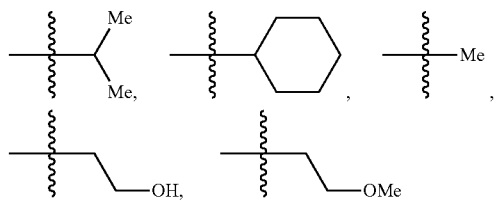

combinations thereof.

In an additional preferred embodiment, $X_3R_3R_4$ is selected from the group consisting of:

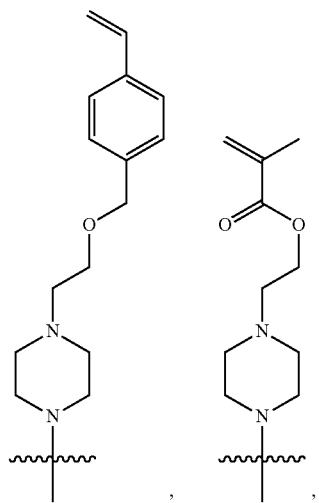

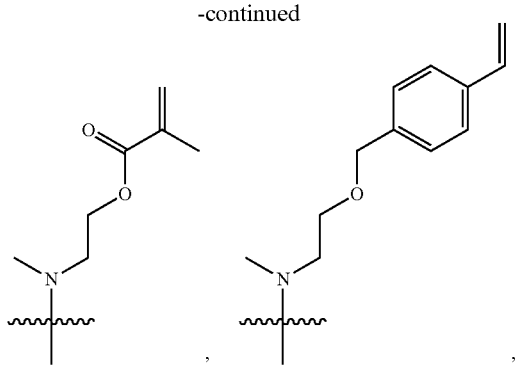

and combinations thereof.

An additional embodiment of the present invention is a process for incorporating a cyclopropenium ion onto a preformed polymer. This process comprises contacting a cyclopropenium ion functionalized to participate in a click reaction with a preformed polymer backbone having a pendant group that is functionalized with a complementary group suitable for participating in a click reaction with the cyclopropenium ion for a period of time and under conditions suitable for the functionalized cyclopropenium ion and the preformed polymer to react via a click chemistry mechanism and form a polymer that comprises a stable cyclopropenium cation that remains positively charged at a high pH.

In the present invention, a "preformed polymer" is intended to include any polymer suitable for participating in a click chemistry reaction with a suitably functionalized cyclopropenium ion as disclosed in more detail herein. Typically, the polymer is formed prior to the click reaction. The preformed polymer contains one or more pendant groups, which are able to react in a click chemistry reaction with the functionalized cyclopropenium as set forth in more detail below. Non-limiting examples of functionalized groups for the cyclopropenium ion and the preformed polymers are alkynes, azides, thiols, enes, epoxides, aziridines, aziridinium ions, aldehydes, and aminooxy groups.

The reaction time and conditions for the click chemistry will depend on the particular functional groups used and other desired properties and are well within the skill of the art to determine. Representative non-limiting reaction times and conditions are set forth in more detail below and in the Examples.

As used herein, a "click" reaction means a chemical reaction in which small modular components are joined together to form a larger molecule, are easy to perform, and give rise to their intended products in very high yields with little or no byproducts. Many click components are derived from alkenes and alkynes, and most click reactions involve the formation of carbon-heteroatom (mostly N, O, and S) bonds. Click reactions are usually fusion processes (leaving no byproducts) or condensation processes (producing water as a byproduct).

Perhaps the most famous of click reactions is the Huisgen 1,3-dipolar cycloaddition of alkynes and azides to yield 1,2,3-triazoles, which reaction is accelerated by copper(I) catalysis (Kolb et al., 2001). This reaction requires no protecting groups, and proceeds with extremely high yield and selectivity for the 1,4-disubstituted 1,2,3-triazole (anti-1,2,3-triazole). For a detailed review of the mechanistic aspects of this reaction, see, e.g., Bock et al., 2006.

Another example of a click reaction is the thiol-ene reaction involving the addition of a S—H bond across a double or triple bond by either a free radical or ionic mechanism. The reaction product is an alkenyl sulfide. For a review, see, e.g., Hoyle et al., 2010.

Other non-limiting examples of click reactions include nucleophilic ring opening reactions, such as the opening of epoxides, aziridines, and aziridinium ions; non-aldol carbonyl chemistry, such as the formation of ureas, oximes and hydrazones; additions to carbon-carbon multiple bonds, especially oxidative addition, Michael additions of Nu-H reactants; and cycloaddition reactions, especially the Diels-Alder reaction (Lee et al., 2003; Lewis et al., 2002; Rostovtsev, 2002; Black et al., 2008, Devaraj et al., 2008, Stockmann et al., 2011, Tornoe et al., 2002, Boren et al., 2008, McNulty et al., 2011; Himo et al., 2005; Moses et al., 2007; U.S. Pat. No. 7,375,234; US Patent Publication NOs. 2011/0077365 and 2010/0197871).

In one aspect of this embodiment, the reaction is carried out according to:

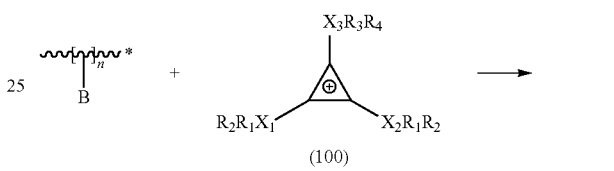

wherein

B represents a pendant group that comprises a group suitable for participating in a click reaction with the cyclopropenium ion;

is selected from the group consisting of:

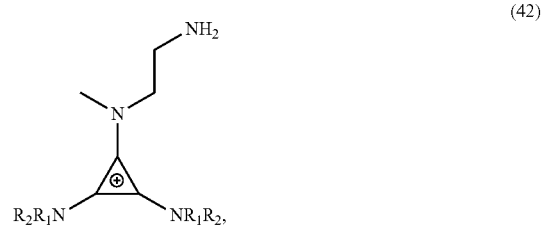

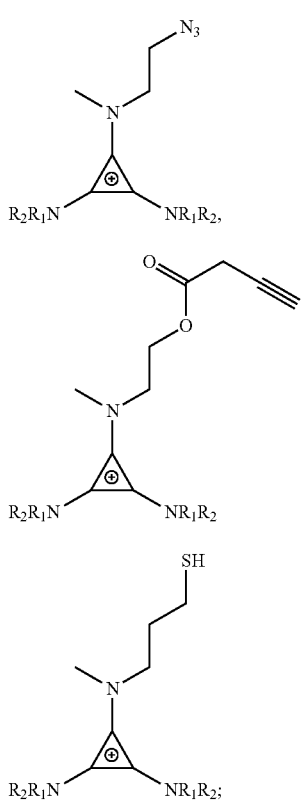

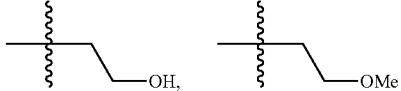

and combinations thereof.

Another embodiment of the present invention is a process for making a dendritic polymer. This process comprises the steps of:

a. providing a first functionalized compound comprising a cyclopropenium ion, which has a reactive group at each position of the ring; and b. grafting a second functionalized compound onto each reactive group of the first functionalized compound such that chemical bonds are formed between the first functionalized compound and the second functionalized compound at the reactive groups, the second functionalized compound including reactive groups capable of forming bonds with the reactive groups on the cyclopropenium ion, and wherein the bonds are formed through a click chemistry mechanism.

The first and second compounds include any compound or polymer that will not prevent or substantially interfere in the click chemistry reaction. Selection of the particular first and second compounds is within the skill of the art and will be driven by the particular properties desired of the dendritic polymer. Non-limiting examples of the first and second compounds include the following:

$R_{1-2}$ are independently selected from the group consisting of no atom, amino, aryl, heteroaryl, $C_{1-10}$alkoxy, $C_{2-10}$alkenyloxy, $C_{2-10}$alkynyloxy, $C_{1-10}$alkyl, $C_{3-10}$cycloalkyl, $C_{2-10}$alkenyl, $C_{3-10}$cycloalkenyl, $C_{2-10}$alkynyl, halogen, aryloxy, heteroaryloxy, $C_{2-10}$alkoxycarbonyl, $C_{1-10}$alkylthio, $C_{2-10}$alkenylthio, $C_{2-10}$alkynylthio, $C_{1-10}$alkylsulfonyl, $C_{1-10}$alkylsulfinyl, aryl-$C_{1-10}$alkyl, heteroaryl-$C_{1-10}$alkyl, aryl-$C_{1-10}$heteroalkyl, heteroaryl-$C_{1-10}$heteroalkyl, a phosphorus group, a silicon group and a boron group, wherein $R_1$ and $R_2$ are optionally combined to form a 5 to 8-membered carbocyclic or heterocyclic ring; further wherein the aliphatic or aromatic portions of $R_1$ and $R_2$ are optionally substituted with from 1 to 4 substituents selected from the group consisting of halogen, cyano, nitro, $C_{1-4}$alkyl, $C_{2-6}$alkenyl, $C_{2-6}$alkynyl, aryl, $C_{1-6}$alkoxy, $C_{2-6}$alkenyloxy, $C_{2-6}$alkynyloxy, aryloxy, $C_{2-6}$alkoxycarbonyl, $C_{1-6}$alkylthio, $C_{1-6}$alkylsulfonyl, $C_{1-6}$alkylsulfinyl, oxo, imino, thiono, primary amino, carboxyl, $C_{1-6}$alkylamino, $C_{1-6}$dialkylamino, amido, nitrogen heterocycles, hydroxy, thiol and phosphorus; and C represents the linkage formed between the cyclopropenium ion and the polymer. Typically, the linkage, C, includes a covalent linkage.

Preferably, $R_1$ and $R_2$ are independently selected from the group consisting of:

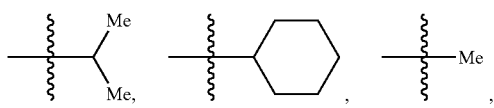

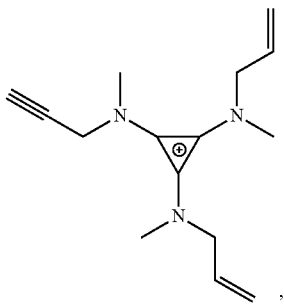

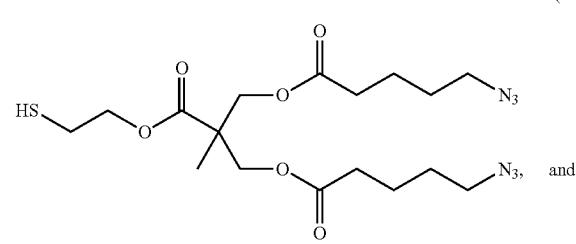

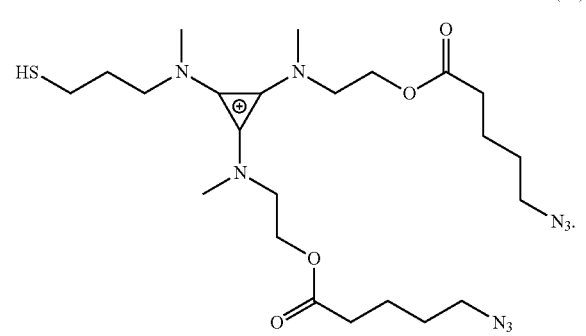

As set forth above, the reactive groups on the respective first and second compounds are suitable for participation in click chemistry. Preferred reactive groups include without limitation azide, alkynyl, alkenyl, and thiol.

In one aspect of this embodiment, the first functionalized compound and the second functionalized compound are independently selected from a homopolymer or a copolymer, and are further independently selected from linear, branched, or dendritic polymers.

In another aspect of this embodiment, both the first and the second functionalized compounds comprise a cyclopropenium ion.

In yet another aspect of this embodiment, the first functionalized compound is:

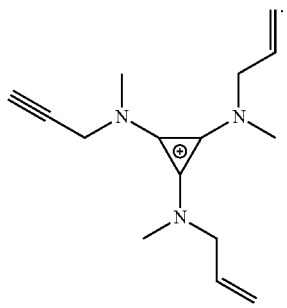

(46)

In a further aspect of this embodiment, the second functionalized compound is selected from:

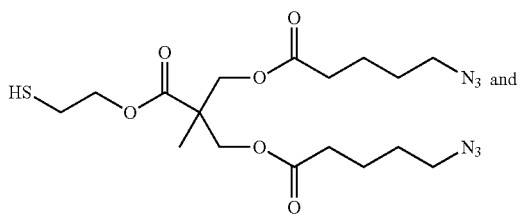

(47)

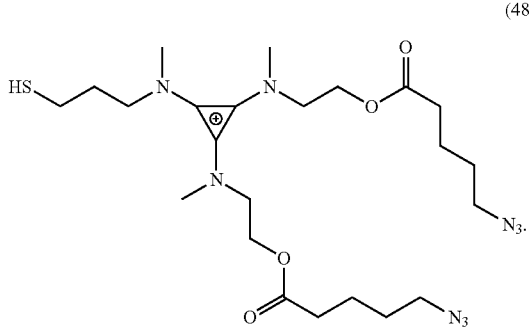

(48)

In yet another aspect of this embodiment, the reactive groups are located at a terminal position on the second functionalized compound.

In an additional aspect of this embodiment, a cycle defined by steps (a) and (b) is repeated at least once, such as 2, 3, 4, 5, 6, 7, 8, 9, 10, 12, 15, 20 or more times, and the polymer formed at step (b) of the preceding cycle is a substrate for the providing step (a) in the subsequent cycle. Preferably, the cycle is repeated from 1 to 6 times.

An additional embodiment of the present invention is a stable, polycationic compound made by any process disclosed herein.

A further embodiment of the present invention is a polymer that comprises a stable cyclopropenium cation that remains positively charged at a high pH. The polymer has the structure:

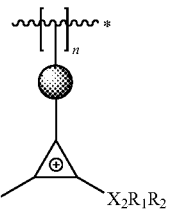

wherein $X_{1-2}$ are independently selected from the group consisting of Cl, N, and any other atom suitable for participating in the process;

$R_{1-2}$ are independently selected from the group consisting of no atom, amino, aryl, heteroaryl, $C_{1-10}$alkoxy, $C_{2-10}$alkenyloxy, $C_{2-10}$alkynyloxy, $C_{1-10}$alkyl, $C_{3-10}$cycloalkyl, $C_{2-10}$alkenyl, $C_{3-10}$cycloalkenyl, $C_{2-10}$alkynyl, halogen, aryloxy, heteroaryloxy, $C_{2-10}$alkoxycarbonyl, $C_{1-10}$alkylthio, $C_{2-10}$alkenylthio, $C_{2-10}$alkynylthio, $C_{1-10}$alkylsulfonyl, $C_{1-10}$alkylsulfinyl, aryl-$C_{1-10}$alkyl, heteroaryl-$C_{1-10}$alkyl, aryl-$C_{1-10}$heteroalkyl, heteroaryl-$C_{1-10}$heteroalkyl, a phosphorus group, a silicon group and a boron group, wherein $R_1$ and $R_2$ are optionally combined to form a 5 to 8-membered carbocyclic or heterocyclic ring; further wherein the aliphatic or aromatic portions of $R_1$ and $R_2$ are optionally substituted with from 1 to 4 substituents selected from the group consisting of halogen, cyano, nitro, $C_{1-4}$alkyl, $C_{2-6}$alkenyl, $C_{2-6}$alkynyl, aryl, $C_{1-6}$alkoxy, $C_{2-6}$alkenyloxy, $C_{2-6}$alkynyloxy, aryloxy, $C_{2-6}$alkoxycarbonyl, $C_{1-6}$alkylthio, $C_{1-6}$alkylsulfonyl, $C_{1-6}$alkylsulfinyl, oxo, imino, thiono, primary amino, carboxyl, $C_{1-6}$alkylamino, $C_{1-6}$dialkylamino, amido, nitrogen heterocycles, hydroxy, thiol and phosphorus;

represents a suitable linking group; and n is an integer.

In one aspect of this embodiment, the polymer is selected from the group consisting of a linear polymer, a branched polymer, a cross-linked polymer, and a dendritic polymer.

In another aspect of this embodiment, the polymer is a homopolymer or a heteropolymer. Suitable homopolymers and heteropolymers are as disclosed herein. Representative non-limiting examples of heteropolymers within the scope of the present invention include random copolymers, block copolymers, and graft copolymers.

In a further aspect of this embodiment, the polymer backbone is any suitable polymeric backbone having useful properties in accordance with the present invention. For example, the polymer backbone may be selected from the group consisting of ethylene, propylene, styrene, (meth)acrylate, vinyl chloride, urethane, ethylene terephthalate, ester, amide, norbornene, silicon, oxygen, and combinations thereof.

Preferred pH ranges are as disclosed above.

In this embodiment of the present invention, the integer "n" is as previously defined.

A "suitable linking group" as used herein means a moiety that covalently connects a cyclopropenium ion to the polymer backbone, which moiety does not render the polymer unstable by, e.g., reaction with $R_1$ or $R_2$ groups. Suitable linking groups include, without limitation, no atom, unsubstituted and substituted functional groups such as amino, aryl, heteroaryl, alkoxy, alkenyloxy, alkynyloxy, alkyl, cycloalkyl, alkenyl, cycloalkenyl, alkynyl, ether, halogen, aryloxy, heteroaryloxy, alkoxycarbonyl, alkylthio, alkenylthio, alkynylthio, alkylsulfonyl, alkylsulfinyl, aryl-alkyl, heteroaryl-alkyl, aryl-heteroalkyl, heteroaryl-heteroalkyl, a phosphorus group, a silicon group and a boron group.

In another aspect of this embodiment, $R_{1-2}$ are independently selected from the group consisting of

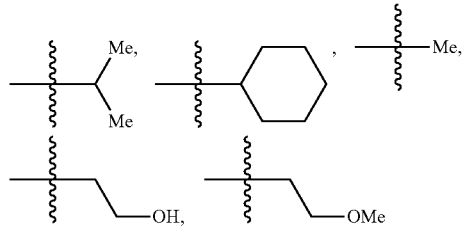

and combinations thereof.

In another aspect of this embodiment, $R_{1-2}$ are independently selected from the group consisting of

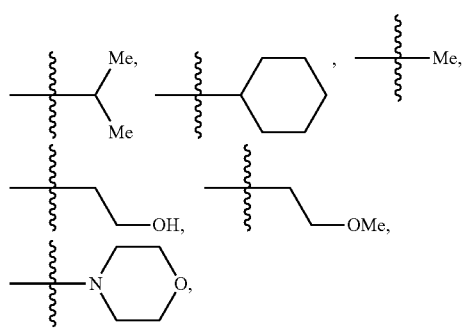

and combinations thereof.

In a preferred aspect of this embodiment the polymer is

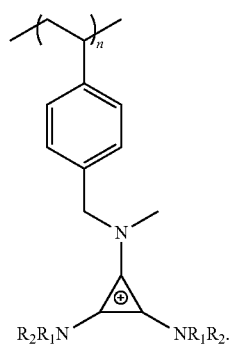

In an additional aspect of this embodiment, the polymer is selected from the group consisting of:

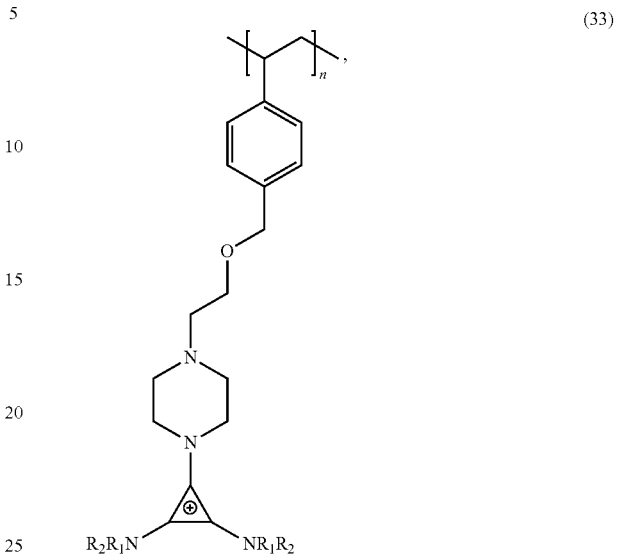

(33)

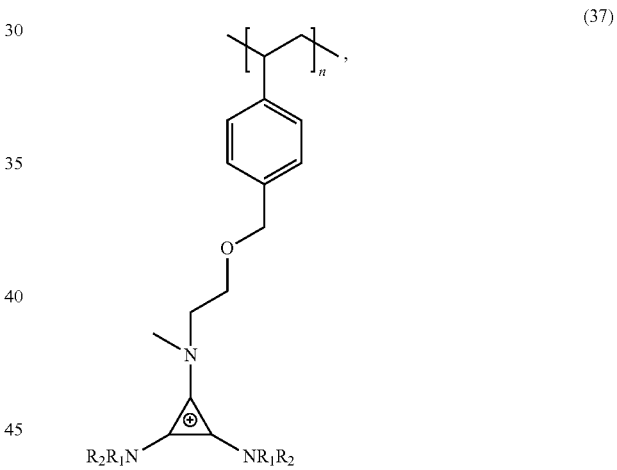

(37)

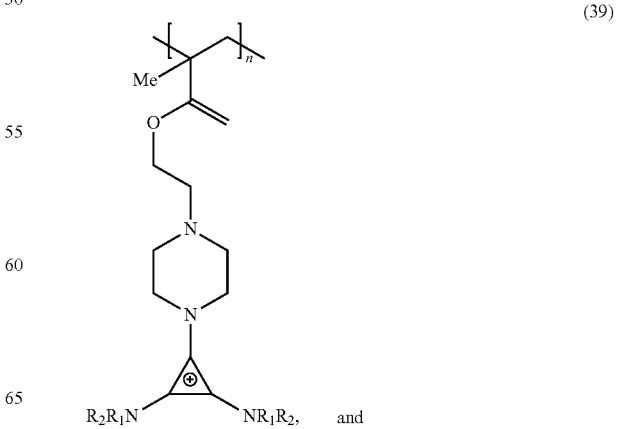

(39)

and

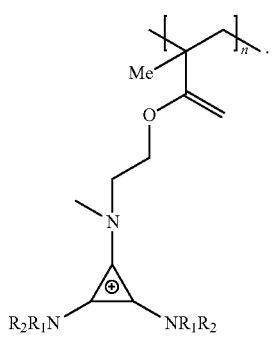
(41)

Another embodiment of the present invention is a cross-linked polymer that comprises a stable cyclopropenium cation that remains positively charged at a high pH, the cross-linked polymer having the structure:

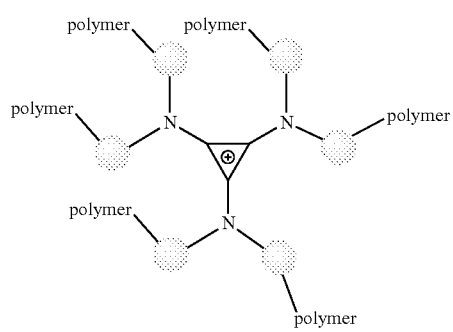
(22a)

wherein

represents a suitable linking group; and
polymer is any polymer that can be bonded to the cyclopropenium ion.

In one aspect of this embodiment, the cross-linked polymer is selected from the group consisting of:

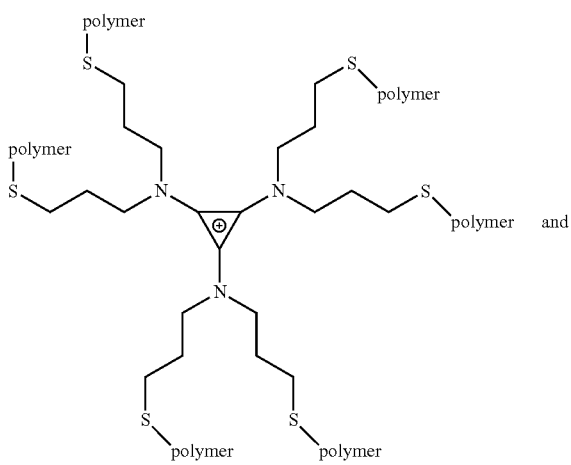
(22)

and

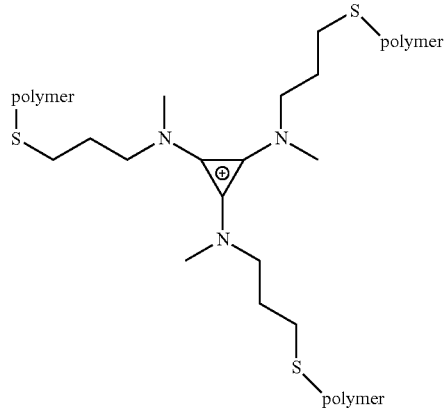
(22b)

wherein polymer is any polymer that can be bonded to the cyclopropenium ion. Suitable polymers include, e.g., those whose backbones comprise ethylene, propylene, styrene, (meth)acrylate, vinyl chloride, urethane, ethylene terephthalate, ester, amide, norbornene, silicon, oxygen, or combinations thereof.

An additional embodiment of the present invention is a dendrimer having (1) a cationic core comprising a tri-functional cyclopropenium monomer and (2) at least two ordered dendritic core branches which (a) are covalently bonded to the cationic core, (b) extend through at least two generations, and (c) have at least 3 terminal groups per core branch.

In one aspect of this embodiment, the cationic core is:

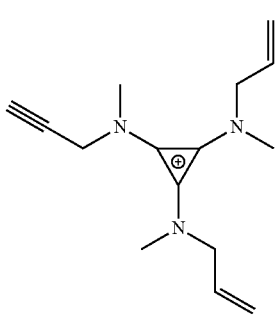
(46)

In another aspect of this embodiment, the dendritic core branches are independently selected from:

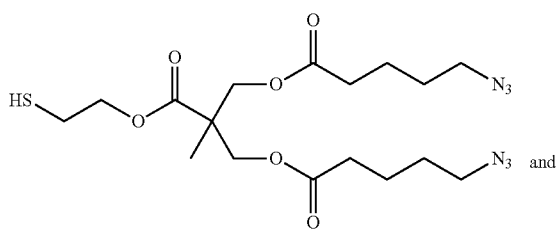
(47)

and

-continued (48)

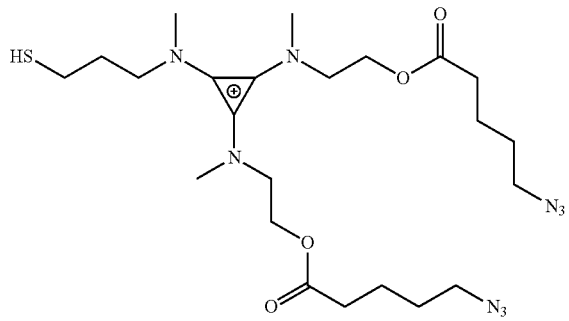

Another embodiment of the present invention is a process for incorporating a cyclopropenium ion into a polymeric system. This process comprises contacting a functionalized cyclopropene with a functionalized compound capable of reacting with the functionalized cyclopropene for a period of time and under conditions suitable for the functionalized cyclopropene and the functionalized compound to react and form a polymeric system that comprises a stable cyclopropenium cation that remains positively charged at a high pH.

In one aspect of this embodiment, the functionalized cyclopropene is a compound of formula (200):

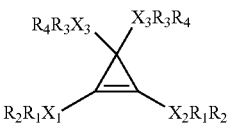

(200)

wherein
$X_{1-3}$ are independently selected from the group consisting of Cl, N and any other atoms suitable for participating in the process; and
$R_{1-4}$ are independently selected from the group consisting of no atom, amino, aryl, heteroaryl, $C_{1-10}$alkoxy, $C_{2-10}$alkenyloxy, $C_{2-10}$alkynyloxy, $C_{1-10}$alkyl, $C_3$-10cycloalkyl, $C_{2-10}$alkenyl, $C_{3-10}$cycloalkenyl, $C_{2-10}$alkynyl, halogen, aryloxy, heteroaryloxy, $C_{2-10}$alkoxycarbonyl, $C_{1-10}$alkylthio, $C_{2-10}$alkenylthio, $C_{2-10}$alkynylthio, $C_{1-10}$alkylsulfonyl, $C_{1-10}$alkylsulfinyl, aryl-$C_{1-10}$alkyl, heteroaryl-$C_{1-10}$alkyl, aryl-$C_{1-10}$heteroalkyl, heteroaryl-$C_{1-10}$heteroalkyl, a phosphorus group, a silicon group and a boron group, wherein $R_1$ and $R_2$ or $R_3$ and $R_4$ are optionally combined to form a 5 to 8-membered carbocyclic or heterocyclic ring; further wherein the aliphatic or aromatic portions of $R_1$ and $R_2$ are optionally substituted with from 1 to 4 substituents selected from the group consisting of halogen, cyano, nitro, $C_{1-4}$alkyl, $C_{2-6}$alkenyl, $C_{2-6}$alkynyl, aryl, $C_{1-6}$alkoxy, $C_{2-6}$alkenyloxy, $C_{2-6}$alkynyloxy, aryloxy, $C_{2-6}$alkoxycarbonyl, $C_{1-6}$alkylthio, $C_{1-6}$alkylsulfonyl, $C_{1-6}$alkylsulfinyl, oxo, imino, thiono, primary amino, carboxyl, $C_{1-6}$alkylamino, $C_{1-6}$dialkylamino, amido, nitrogen heterocycles, hydroxy, thiol and phosphorus.

Preferably, the functionalized cyclopropene is:

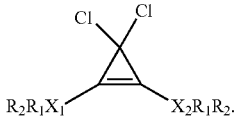

(201)

In another preferred embodiment, $X_{1-2}$ are both N, and $R_{1-2}$ are independently selected from the group consisting of $C_{1-6}$alkyl, aryl, and $C_{3-10}$cycloalkyl. More preferably, $R_{1-2}$ are both cyclohexyl.

In another aspect of this embodiment, the functionalized compound capable of reacting with the functional group of the functionalized cyclopropene is a polymer selected from the group consisting of a linear polymer, a branch polymer, a cross-linked polymer, and a dendritic polymer.

Preferably, the polymer is a homopolymer or a heteropolymer. In one preferred embodiment, the polymer is a homopolymer of poly(N-alkylamino)methylstyrene.

In another preferred embodiment, the polymer is a heteropolymer, such as a random copolymer or a block polymer. More preferably, the random copolymer is a copolymer of polystyrene and poly(N-alkylamino)methylstyrene. Preferred block polymers include diblock copolymer, such as one that has the following structure:

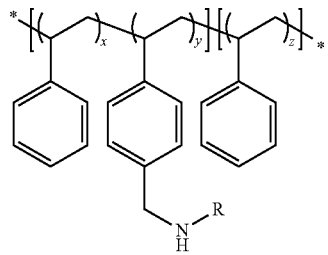

wherein
x, y, and z are independently selected from integers greater than or equal to zero, and R is any group that is suitable for participating in the process of incorporating the cyclopropenium ion into the polymeric system. x, y, and z may range from 0-1,000, including 0-500, 0-250, 0-100, 0-50, 0-25, 0-10, and 0-5. For example, x, y, and z may be independently selected from 0, 1, 2, 3, 4, 5, 6, 7, 8, 9, and 10.

A stable, polycationic compound made by the process disclosed herein may be self-assembling when contacted with a substrate. As used herein, "self-assembling" refers to a process in which molecules (including macromolecules such as polymers) form ordered structures, such as spheres, cylinders, lamellae, vesicles, as a consequence of interactions among the molecules themselves. Such ordered structures may be on the scale of nanometers, and thus, polymers, especially block polymers, are suitable for different applications in various fields, such as biomedicine, biomaterials, microelectronics, photoelectric materials, and catalysis. Self-assembly of polymers may further be directed by modifying confinement conditions, surface of the substrate in contact with the polymers (including graphoepitaxy and chemical registration techniques), and thermal and solvent annealing conditions. Such methods are known in the art and are disclosed in e.g., Albert et al., 2010; Mai et al., 2012; and Takenaka et al., 2013.

Figure 3:
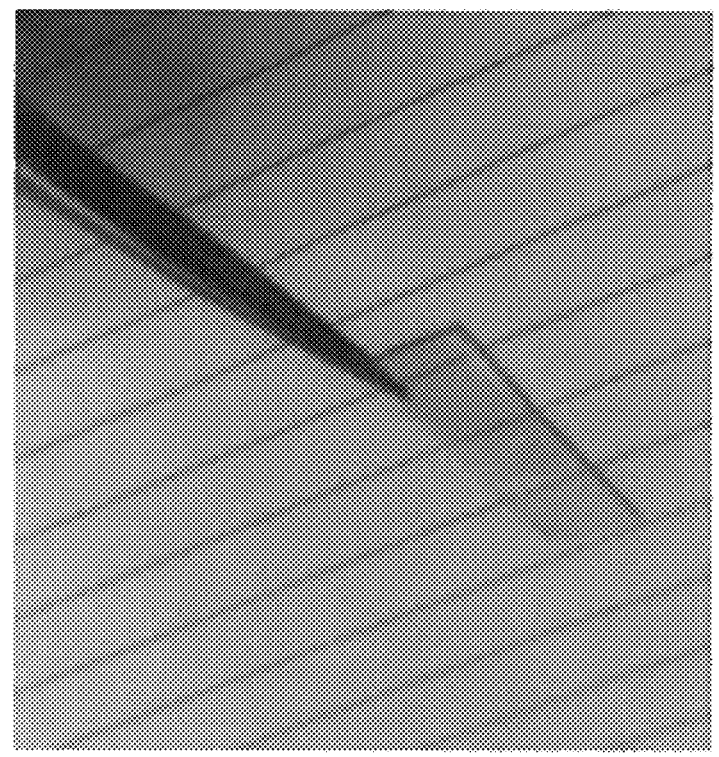
FIG. 3 shows an image of a cross-linked polymer made according to the present invention.

A further embodiment of the present invention is a substrate. This substrate comprises a stable, polycationic compound made by any process disclosed herein. A "substrate" as used in this embodiment may take any form convenient to the end use, such as, e.g., a film, a bead, a gel, a membrane, a coating, a powder, and the like. A non-limiting exemplary substrate made by the process disclosed herein is shown in FIG. 3.

Another embodiment of the present invention is a support coated with any substrate disclosed herein for use in a water purification system.

The support generally serves as a mechanical structure for the coating substrate. The support may be made from the same polymer as the coating material or from one or more different polymers.

The support coated with one or more substrates disclosed herein may be used, inter alia, to adsorb contaminants, to disinfect (i.e., used as an antimicrobial), or for reverse osmosis (e.g., for desalination).

Methods of coating a support are known in the art and such methods may be used to coat a support with a substrate according to the present invention. Such methods include, without limitation, spin-coating, dip-coating, interfacial polymerization, painting, spraying, electrophoretic deposition, tape casting, and Langmuir-Blodget coating, phase inversion (polymer precipitation), such as those disclosed in e.g., U.S. Pat. Nos. 4,728,576; 5,069,156; and 5,844,192; U.S. Patent Publication No. 2006/0049540; Krogman et al., 2009; Kesting, 1985; Cabasso, 1987; Strathmann, 1990. Multiple layers may be deposited using layer-by layer methods, such as those disclosed in e.g., Decher et al., 1997.

In currently available water purification systems, the purification membranes used typically lack tunable mechanical properties and can be brittle. Furthermore, the chemistry for making such membranes is difficult to manage due to the fact that typically, acid chlorides used to make the membrane must be processed in dry conditions because upon contact with water, acid chlorides reacts with water to form the corresponding carboxylic acids. See, e.g., Porter, 1990. The new substrates disclosed herein can be used with a wide variety of cross-linking units to tune the mechanical properties. Furthermore, the chemistry disclosed herein to make the water purification membrane can be done at a bench top, in the presence of water, under ambient conditions, and in as little as a few seconds. Furthermore, the chemistry disclosed herein is versatile and may be used to make antimicrobial coatings and substrates for cell cultures, as disclosed in more detail below.

The chemistry disclosed herein is also modular. For example, functionalized cyclopropenium cations may be linked to any preformed polymer with the corresponding functional group by click chemistry. Moreover, functionalized cyclopropenium cations may serve as dendritic cores, and various dendritic core branches may be added onto the cores. In addition, the cyclopropenium cation units can be obtained from readily available precursors and the chemistry is robust, efficient, and user-friendly. Furthermore, it provides a new level of functionality in materials science, yielding a cationic species that can maintain its charge at high pH.

Yet another embodiment of the present invention is an antimicrobial coating comprising any substrate disclosed herein. The term "antimicrobial," as used herein, means that the present coatings inhibit, prevent, or destroy the growth or proliferation of microorganisms, such as viruses, bacteria, and fungi.

Polymers bearing quaternary ammonium cations have antibacterial activities. Furthermore, it has been shown that antibacterial activity increased with the increase of the amount of quaternary ammonium groups in the polymer (Kenawy et al., 2007). Other groups that may be incorporated into the antibacterial coatings of the present invention include phosphonium and pyridinium groups. Therefore, it is expected that polymeric systems containing cyclopropenium cations as disclosed herein will have similar antibacterial activities. It is also expected that antibacterial activity will increase with the increase of the amount of cyclopropenium cations incorporated in the polymer.

In one aspect of this embodiment, a stable cationic dendritic polymer may be deposited onto electrospun sheets, beads coated on sutures, and on, e.g., dental restorative materials for local antibiotic therapy in various infections.

Preferably, the antimicrobial coating further comprises additional antimicrobial agents, such as silver or organic compounds, for example, sesquiterpenoids, penicillin, 2-benzimidazole carbamoyl. Preferably, silver in the form of nanoparticles are incorporated into the antimicrobial coating. More preferably, the silver nanoparticles are in the size range of 1-100 nm. Methods of incorporating additional antimicrobial agents into the substrate are known in the art. For example, silver may be incorporated into the coating by radical-mediated dispersion polymerization using radical initiators, such as AIBN, as disclosed in Song et al., 2012. Other methods of incorporating the organic antimicrobial agents into the substrate are reviewed in Kenawy et al., 2007.

An additional embodiment of the present invention is an ion-transport membrane comprising any substrate disclosed herein. Such a membrane would allow for the diffusion of ions and are useful in, e.g., dialysis, desalination, gas separations, batteries and fuel cells. Exemplary ion transport membrane assemblies for fuel cells or batteries include those disclosed in, e.g., U.S. Pat. Nos. 6,565,632 and 7,335,247; and U.S. Patent Publication Nos. 2007/0137478, 2011/0294653, and 2011/0067405. Generally, fuel cells or batteries contain oxygen ion transport membranes, which conduct oxygen ions. Oxygen ion transport membranes have a cathode side, on which oxygen ionizes by gaining electrons. The substrates disclosed herein are useful in coating the anode side of the membrane, on which the oxygen ions lose electrons and reconstitute into elemental oxygen. Composite oxygen ion transport membranes are known in the art and are disclosed in e.g., U.S. Pat. Nos. 7,556,676, 7,338,624, and 5,240,480; and U.S. Patent Publication Nos. 2005/0061663, and 2005/0013933. The substrates disclosed herein are useful for (electro)dialysis because the electrical potential difference on the two sides of the membrane allows the transport of charged species. Electrodialysis apparatus are known in the art and are disclosed in e.g., U.S. Pat. Nos. 2,970,098, 5,643,430, 6,402,917, and 6,461,491; and U.S. Patent Publication No. 2005/0183956. One of the ways to desalinate water is use an electrodialysis process in which pairs of anionic and cationic membranes are placed such that salt water is separated into diluted solution and concentrated brine. Desalination systems are known in the art and are disclosed in e.g., U.S. Pat. Nos. 4,539,088 and 4,539,091; and U.S. Patent Publication No. 2011/0056876, 2010/0282689, and 2010/0314313.

Another embodiment of the present invention is a cell support comprising any substrate disclosed herein. Such a cell support may be used for culturing of cells, such as e.g., stem cells. Generally, cell cultures are maintained in plastic dishes, the surface of which are negatively charged. Thus, some anchorage-dependent cell types, such as stem cells, do not produce sufficient amounts of positively charged extracellular matrix proteins, adhering only weakly to the plastic substratum. Accordingly, cationic substrates according to the present invention may be used to provide support for such cells. Typically, the cationic substrates include a cyclopropenium ion according to the present invention as part of a polymeric system that also includes one or more cell culture compatible monomers such as, e.g., iminoethylene, methacrylate (e.g., choline methacrylate), and others known in the art such as those disclosed in Vendra et al., 2010.

Yet another embodiment of the present invention is a drug delivery vehicle comprising a stable cationic dendritic polymer made according to any method disclosed herein. The cationic dendrite polymer of the present invention is well-suited to carry negatively charged DNA into living cells.

Drug delivery vehicles containing guanidine have also been shown to be effective mimics of cell-penetrating peptides. The charged nature of a cationic dendritic polymer made according to the methods disclosed herein can also be used to mimic these types of materials, which may be useful in drug delivery. The high degree of branching of dendrimers also make them well-suited for drug delivery. For a review, see Gillies et al., 2005. Preferably, the core branches of the dendrimer are selected so that they are compatible with introduction into living organisms, e.g., they are non-toxic and on-immunogenic. See, e.g., Vendra et al., 2010. The drug delivery vehicles of the present invention may be used to deliver one or more agents into a living organism, such as, e.g., a cell or a mammal, including a human. Representative, non-limiting examples of drugs that may be delivered according to the present invention include adenosine deaminase, doxorubicin, interferon α-2b, and granulocyte colony stimulating factor.

A further embodiment of the present invention is a gene therapeutic vector comprising a stable cationic dendritic polymer made according to any method disclosed herein. Exemplary, non-limiting examples of monomer units that may be incorporated into the dendritic polymer of the present invention include (poly)(β-aminoesters), (poly)(2-aminoethylpropylenephosphate), allylamine, and the like. See, e.g., Vendra et al., 2010.

As used herein, a "gene therapeutic vector" means a vehicle used to transfer genetic material to a target cell. The gene therapeutic vector may be administered in vivo or in vitro. Preferably the cell is a mammalian cell, but other types of cells, e.g., insect, plant, or fungal, or non-mammalian vertebrate cells may be used.

In operation, the genetic material, which may be nucleic acids, such as DNA, RNA, RNAi, mRNA, tRNA, short hairpin RNA (shRNA), short interfering RNA (siRNA), double-stranded RNA (dsRNA), transcriptional gene silencing RNA (ptgsRNA), Piwi-interacting RNA, pri-miRNA, pre-miRNA, micro-RNA (miRNA), or anti-miRNA (as described, e.g., in U.S. patent application Ser. Nos. 11/429,720, 11/384,049, 11/418,870, and 11/429,720 and Published International Application Nos. WO 2005/116250 and WO 2006/126040), is reversibly linked to one or more of the dendritic core branches. Upon delivery of the gene therapeutic vector to the target cell, the nucleic acid(s) are released.

Additional Definitions

In the foregoing embodiments, the following definitions apply.

The term "alkoxy" refers to an alkyl group, preferably a lower alkyl group, having an oxygen attached thereto. Representative alkoxy groups include methoxy, ethoxy, propoxy, isopropoxy, tert-butoxy and the like. Other alkoxy groups within the scope of the present invention include, for example, the following:

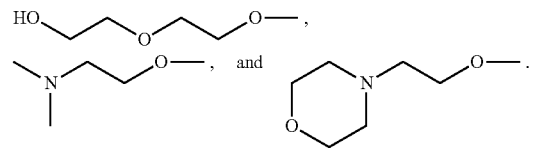

The term "alkoxycarbonyl" refers to a carbonyl group substituted with an alkoxy group.

The term "alkenyl", as used herein, refers to an aliphatic group containing at least one double bond and is intended to include both "unsubstituted alkenyls" and "substituted alkenyls", the latter of which refers to alkenyl moieties having substituents replacing a hydrogen on one or more carbons of the alkenyl group. Such substituents may occur on one or more carbons that are included or not included in one or more double bonds. Moreover, such substituents include all those contemplated for alkyl groups, as discussed below, except where stability is prohibitive. For example, substitution of alkenyl groups by one or more alkyl, carbocyclyl, aryl, heterocyclyl, or heteroaryl groups is contemplated.

The term "alkene functionalized" compound means a compound containing a —C=C group.

The term "alkenyloxy" refers to an alkenyl group having an oxygen attached thereto.

The term "alkenylthio", as used herein, refers to a thiol group substituted with an alkenyl group and may be represented by the general formula alkenyl-S—.

The term "alkyl" refers to the radical of saturated aliphatic groups, including straight-chain alkyl groups, branched-chain alkyl groups, cycloalkyl (alicyclic) groups, alkyl-substituted cycloalkyl groups, and cycloalkyl-substituted alkyl groups. In certain embodiments, a straight chain or branched chain alkyl has 10 or fewer carbon atoms in its backbone (e.g., $C_1$-$C_{10}$ for straight chains, $C_3$-$C_{10}$ for branched chains). Likewise, certain cycloalkyls have from 3-8 carbon atoms in their ring structure, including 5, 6 or 7 carbons in the ring structure.

Moreover, unless otherwise indicated, the term "alkyl" (or "lower alkyl") as used throughout the specification, examples, and claims is intended to include both "unsubstituted alkyls" and "substituted alkyls", the latter of which refers to alkyl moieties having substituents replacing a hydrogen on one or more carbons of the hydrocarbon backbone. Such substituents can include, for example, a halogen, a hydroxyl, a carbonyl (such as a carboxyl, an alkoxycarbonyl, a formyl, or an acyl), a thiocarbonyl (such as a thioester, a thioacetate, or a thioformate), an alkoxyl, a phosphoryl, a phosphate, a phosphonate, a phosphinate, an amino, an amido, an amidine, an imine, a cyano, a nitro, an azido, a sulfhydryl, an alkylthio, a sulfate, a sulfonate, a sulfamoyl, a sulfonamido, a sulfonyl, a heterocyclyl, an aralkyl, an aromatic, or heteroaromatic moiety. It will be understood by those skilled in the art that the moieties substituted on the hydrocarbon chain can themselves be substituted, if appropriate. For instance, the substituents of a substituted alkyl may include substituted and unsubstituted forms of amino, azido, imino, amido, phosphoryl (including phosphonate and phosphinate), sulfonyl (including sulfate, sulfonamido, sulfamoyl and sulfonate), and silyl groups, as well as ethers, alkylthios, carbonyls (including ketones, aldehydes, carboxylates, and esters), —$CF_3$, —CN and the like. Exemplary substituted alkyls are described below. Cycloalkyls can be further substituted with alkyls, alkenyls, alkoxys, alkylthios, aminoalkyls, carbonyl-substituted alkyls, —CF3, —CN, and the like.

The term "Cx-y" when used in conjunction with a chemical moiety, such as, alkyl, alkenyl, or alkoxy is meant to include groups that contain from x to y carbons in the chain. For example, the term "$C_{x-y}$alkyl" refers to substituted or unsubstituted saturated hydrocarbon groups, including straight-chain alkyl and branched-chain alkyl groups that contain from x to y carbons in the chain, including haloalkyl groups such as trifluoromethyl and 2,2,2-trifluoroethyl, etc. The terms "$C_{2-y}$alkenyl" and "$C_{2-y}$alkynyl" refer to substituted or unsubstituted unsaturated aliphatic groups analogous in length and possible substitution to the alkyls described above, but that contain at least one double or triple bond respectively.

The term "alkylamino", as used herein, refers to an amino group substituted with at least one alkyl group.

The term "alkylsulfinyl" means a sulfinyl group substituted with an alkyl group.

The term "alkylsulfonyl" means a sulfonyl group substituted with an alkyl group.

The term "alkylthio", as used herein, refers to a thiol group substituted with an alkyl group and may be represented by the general formula alkylS—.

The term "alkynyl", as used herein, refers to an aliphatic group containing at least one triple bond and is intended to include both "unsubstituted alkynyls" and "substituted alkynyls", the latter of which refers to alkynyl moieties having substituents replacing a hydrogen on one or more carbons of the alkynyl group. Such substituents may occur on one or more carbons that are included or not included in one or more triple bonds. Moreover, such substituents include all those contemplated for alkyl groups, as discussed above, except where stability is prohibitive. For example, substitution of alkynyl groups by one or more alkyl, carbocyclyl, aryl, heterocyclyl, or heteroaryl groups is contemplated.

The term "alkynyloxy" means an alkynyl group having an oxygen attached thereto.

The term "alkynylthio", as used herein, refers to a thiol group substituted with an alkynyl group and may be represented by the general formula alknyl-S—.

The term "amide", as used herein in the context of polymers, refers to a backbone containing the functional group:

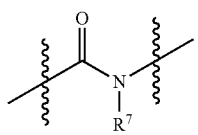

wherein $R^7$ represent a hydrogen or hydrocarbyl group.

The term "amido", as used herein, refers to a group

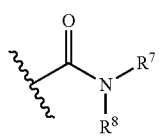

wherein $R^7$ and $R^8$ each independently represent a hydrogen or hydrocarbyl group, or $R^7$ and $R^8$ taken together with the N atom to which they are attached complete a heterocycle having from 4 to 8 atoms in the ring structure.

The terms "amine" and "amino" are art-recognized and refer to both unsubstituted and substituted amines and salts thereof, e.g., a moiety that can be represented by

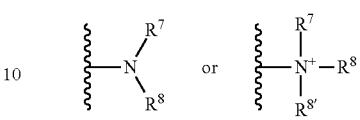

wherein $R^7$, $R^8$, and $R^{8'}$ each independently represent a hydrogen or a hydrocarbyl group, or $R^7$ and $R^8$ taken together with the N atom to which they are attached complete a heterocycle having from 4 to 8 atoms in the ring structure. The term "primary" amine means only one of $R^7$ and $R^8$ or one of $R^7$, $R^8$, and $R^{8'}$ is a hydrocarbyl group. Secondary amines have two hydrocarbyl groups bound to N. In tertiary amines, all three groups, $R^7$, $R^8$, and $R^{8'}$, are replaced by hydrocarbyl groups.

The term "aryl" as used herein includes substituted or unsubstituted single-ring aromatic groups in which each atom of the ring is carbon. Preferably the ring is a 3- to 8-membered ring, more preferably a 6-membered ring. The term "aryl" also includes polycyclic ring systems having two or more cyclic rings in which two or more carbons are common to two adjoining rings wherein at least one of the rings is aromatic, e.g., the other cyclic rings can be cycloalkyls, cycloalkenyls, cycloalkynyls, aryls, heteroaryls, and/or heterocyclyls. Aryl groups include benzene, naphthalene, phenanthrene, phenol, aniline, and the like.

As used herein, "aryloxy" means which an aryl group singularly bonded to oxygen.

The term "aryl-alkyl" means an alkyl group substituted with aryl.

The term "aryl-heteroalkyl" means an heteroalkyl group substituted with aryl.

The term "azide" means a functional group containing —$N_3$.

The terms "carbocycle", "carbocyclyl", and "carbocyclic", as used herein, refer to a non-aromatic saturated or unsaturated ring in which each atom of the ring is carbon. Preferably a carbocycle ring contains from 3 to 8 atoms, including 5 to 7 atoms, such as for example, 6 atoms.

The term "carbonyl" means a functional group composed of a carbon atom double-bonded to an oxygen atom: C=O. Carbonyls include without limitation, aldehydes, ketones, carboxylic acids, esters, and amides.

The terms "carboxy" and "carboxyl", as used herein, refer to a group represented by the formula —$CO_2H$.

The term "carboxylate" refers to the conjugate base of a carboxyl group, represented by the formula —$COO^-$.

The term "cyano" means of a functional group composed of a carbon atom triple-bonded to a nitrogen atom: —C≡N.

The term "cycloalkyl" means a univalent groups derived from cycloalkanes by removal of a hydrogen atom from a ring carbon atom.

The term "cycloalkenyl" means a univalent groups derived from cycloalkenes by removal of a hydrogen atom from a ring carbon atom.

The term "ester", as used herein in the context of polymers, refers to a backbone containing the functional group:

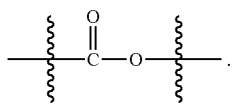 [SMILES: *OC(*)=O]

The term "ether", as used herein, refers to a hydrocarbyl group linked through an oxygen to another hydrocarbyl group. Accordingly, an ether substituent of a hydrocarbyl group may be hydrocarbyl-O—. Ethers may be either symmetrical or unsymmetrical. Examples of ethers include, but are not limited to, heterocycle-O-heterocycle and aryl-O-heterocycle. Ethers include "alkoxyalkyl" groups, which may be represented by the general formula alkyl-O-alkyl.

The term "ethylene" as used herein in the context of polymers, refers to a backbone containing the functional group:

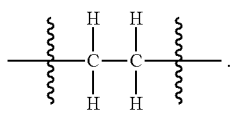 [SMILES: *CC*]

The term "ethylene terephthalate refers to the following functional group:

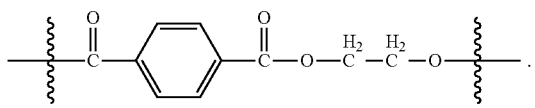

The terms "halo" and "halogen" are used interchangeably herein and mean halogen and include chloro, fluoro, bromo, and iodo.

The term "heteroaryl" includes substituted or unsubstituted aromatic single ring structures, preferably 3- to 8-membered rings, more preferably 5- to 7-membered rings, even more preferably 5- to 6-membered rings, whose ring structures include at least one heteroatom, preferably one to four heteroatoms, more preferably one or two heteroatoms. The term "heteroaryl" also includes polycyclic ring systems having two or more cyclic rings in which two or more carbons are common to two adjoining rings wherein at least one of the rings is heteroaromatic, e.g., the other cyclic rings can be cycloalkyls, cycloalkenyls, cycloalkynyls, aryls, heteroaryls, and/or heterocyclyls. Heteroaryl groups include, for example, pyrrole, furan, thiophene, imidazole, oxazole, thiazole, pyrazole, pyridine, pyrazine, pyridazine, and pyrimidine, and the like.

As used herein, "heteroaryloxy" means which a heteroaryl group singularly bonded to oxygen.

"Heteroaryl-alkyl" means a alkyl group substituted with a heteroaryl group.

"Heteroaryl-heteroalkyl" means a heteroalkyl group substituted with a heteroaryl group.

The term "heteroatom" as used herein means an atom of any element other than carbon or hydrogen. Preferred heteroatoms are nitrogen, oxygen, and sulfur.

The term "heteroalkyl" means an alkyl in which at least one carbon of a hydrocarbon backbone is substituted with a heteroatom. Heteroalkyls include alkoxyalkyls, such as $C_{1-8}$ alkoxyalkyl.

The term "heteroaromatic" means at least one carbon atoms in the aromatic group is substituted with a heteroatom.

The terms "heterocyclyl", "heterocycle", "heterocyclic", and the like refer to substituted or unsubstituted non-aromatic ring structures, preferably 3- to 8-membered rings, whose ring structures include at least one heteroatom, preferably one to four heteroatoms, more preferably one or two heteroatoms. For example, "nitrogen heterocycle" means to substituted or unsubstituted non-aromatic ring structures, whose ring structures contain at least one nitrogen. The terms "heterocyclyl," "heterocyclic," and the like also include polycyclic ring systems having two or more cyclic rings in which two or more carbons are common to two adjoining rings wherein at least one of the rings is heterocyclic, e.g., the other cyclic rings can be cycloalkyls, cycloalkenyls, cycloalkynyls, aryls, heteroaryls, and/or heterocyclyls. Heterocyclyl groups include, for example, piperidine, piperazine, pyrrolidine, morpholine, lactones, lactams, and the like.

The term "hydrocarbyl", as used herein, refers to a group that is bonded through a carbon atom that does not have a =O or =S substituent, and typically has at least one carbon-hydrogen bond and a primarily carbon backbone, but may optionally include heteroatoms. Thus, groups like methyl, ethoxyethyl, 2-pyridyl, and trifluoromethyl are considered to be hydrocarbyl for the purposes of this application, but substituents such as acetyl (which has a =O substituent on the linking carbon) and ethoxy (which is linked through oxygen, not carbon) are not. Hydrocarbyl groups include, but are not limited to aryl, heteroaryl, carbocycle, heterocycle, alkyl, alkenyl, alkynyl, and combinations thereof.

The term "hydroxyalkyl", as used herein, refers to an alkyl group substituted with a hydroxy group.

The term "hydroxyl" or "hydroxy," as used herein, refers to the group —OH.

The term "imino" group means a functional group containing a carbon-nitrogen double bond.

The term "lower" when used in conjunction with a chemical moiety, such as, acyl, alkyl, alkenyl, alkynyl, or alkoxy is meant to include groups where there are ten or fewer non-hydrogen atoms in the substituent, preferably eight or fewer, such as for example, from about 2 to 8 carbon atoms, including less than 6 carbon atoms. A "lower alkyl", for example, refers to an alkyl group that contains ten or fewer carbon atoms, preferably eight or fewer. In certain embodiments, acyl, alkyl, alkenyl, alkynyl, or alkoxy substituents defined herein are respectively lower acyl, lower alkyl, lower alkenyl, lower alkynyl, or lower alkoxy, whether they appear alone or in combination with other substituents, such as in the recitations hydroxyalkyl and aralkyl (in which case, for example, the atoms within the aryl group are not counted when counting the carbon atoms in the alkyl substituent).

The term "(meth)acrylate" refers to the following functional group:

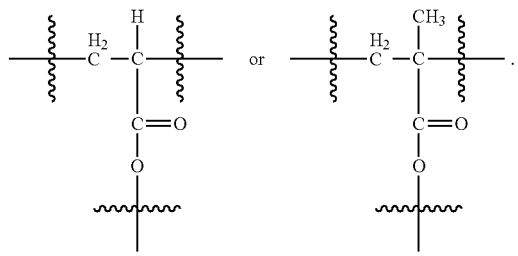

The term "nitro" means the functional group —NO$_2$.

The term "norbornene" refers to the following functional group:

The terms "polycyclyl", "polycycle", and "polycyclic" refer to two or more rings (e.g., cycloalkyls, cycloalkenyls, cycloalkynyls, aryls, heteroaryls, and/or heterocyclyls) in which two or more atoms are common to two adjoining rings, e.g., the rings are "fused rings". Each of the rings of the polycycle can be substituted or unsubstituted. In certain embodiments, each ring of the polycycle contains from 3 to 10 atoms in the ring, preferably from 3 to 8, such as for example, 5 to 7.

The term "propylene" refers to the following functional group:

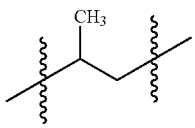

The term "oxo" refers to the group =O.

The term "substituted" refers to moieties having substituents replacing a hydrogen on one or more carbons of the backbone. It will be understood that "substitution" or "substituted with" includes the implicit proviso that such substitution is in accordance with the permitted valence of the substituted atom and the substituent, and that the substitution results in a stable compound, e.g., which does not spontaneously undergo transformation such as by rearrangement, cyclization, elimination, etc. As used herein, the term "substituted" is contemplated to include all permissible substituents of organic compounds. In a broad aspect, the permissible substituents include acyclic and cyclic, branched and unbranched, carbocyclic and heterocyclic, aromatic and non-aromatic substituents of organic compounds. The permissible substituents can be one or more and the same or different for appropriate organic compounds. For purposes of this invention, the heteroatoms such as nitrogen may have hydrogen substituents and/or any permissible substituents of organic compounds described herein which satisfy the valences of the heteroatoms. Substituents can include any substituents described herein, for example, a halogen, a hydroxyl, a carbonyl (such as a carboxyl, an alkoxycarbonyl, a formyl, or an acyl), a thiocarbonyl (such as a thioester, a thioacetate, or a thioformate), an alkoxyl, a phosphoryl, a phosphate, a phosphonate, a phosphinate, an amino, an amido, an amidine, an imine, a cyano, a nitro, an azido, a sulfhydryl, an alkylthio, a sulfate, a sulfonate, a sulfamoyl, a sulfonamido, a sulfonyl, a heterocyclyl, an aralkyl, or an aromatic or heteroaromatic moiety. It will be understood by those skilled in the art that the moieties substituted on the hydrocarbon chain can themselves be substituted, if appropriate.

The term "styrene" refers to the following functional group:

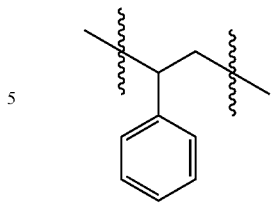

As used herein, the term "substituent," means H, cyano, oxo, nitro, acyl, acylamino, halogen, hydroxy, amino acid, amine, amide, carbamate, ester, ether, carboxylic acid, thio, thioalkyl, thioester, thioether, $C_{1-8}$ alkyl, $C_{1-8}$ alkoxy, $C_{1-8}$ alkenyl, $C_{1-8}$ aralkyl, 3- to 8-membered carbocyclic, 3- to 8-membered heterocyclic, 3- to 8-membered aryl, or 3- to 8-membered heteroaryl, sulfate, sulfonamide, sulfoxide, sulfonate, sulfone, alkylsulfonyl, and arylsulfonyl.

Unless specifically stated as "unsubstituted," references to chemical moieties herein are understood to include substituted variants. For example, reference to an "aryl" group or moiety implicitly includes both substituted and unsubstituted variants.

The term "sulfate" is art-recognized and refers to the group —OSO$_3$H, or a pharmaceutically acceptable salt thereof.

The term "sulfinyl" is art-recognized and refers to the group —S(O)—R$^7$ wherein R$^7$ represents a hydrocarbyl.

The term "sulfonyl" is refers to the group —S(O)$_2$—R$^7$, wherein R$^7$ represents a hydrocarbyl.

The term "thio" or "thiol", as used herein, refers to the —SH group.

The term "thioalkyl", as used herein, refers to an alkyl group substituted with a thiol group.

The term "thiono" refers to a substitution on a carbon atom, more specifically to a doubly bonded sulfur.

The term "urethane" refers to the following functional group:

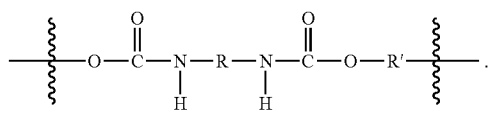

wherein R and R' are independently selected from aryls or alkyls.

The term "vinyl chloride" refers to the following functional group:

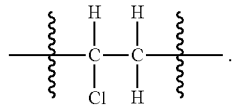 [SMILES: *CC(*)Cl]

It is understood that the disclosure of a compound herein encompasses all stereoisomers of that compound. As used herein, the term "stereoisomer" refers to a compound made up of the same atoms bonded by the same bonds but having different three-dimensional structures which are not interchangeable. The three-dimensional structures are called configurations. Stereoisomers include enantiomers, optical isomers, and diastereomers.

The terms "racemate" or "racemic mixture" refer to a mixture of equal parts of enantiomers. The term "chiral center" refers to a carbon atom to which four different groups are attached. The term "enantiomeric enrichment" as used herein refers to the increase in the amount of one enantiomer as compared to the other.

It is appreciated that compounds of the present invention having a chiral center may exist in and be isolated in optically active and racemic forms. Some compounds may exhibit polymorphism. It is to be understood that the present invention encompasses any racemic, optically-active, diastereomeric, polymorphic, or stereoisomeric form, or mixtures thereof, of a compound of the invention, which possess the useful properties described herein, it being well known in the art how to prepare optically active forms (for example, by resolution of the racemic form by recrystallization techniques, by synthesis from optically-active starting materials, by chiral synthesis, or by chromatographic separation using a chiral stationary phase).

Examples of methods to obtain optically active materials are known in the art, and include at least the following:

i) physical separation of crystals—a technique whereby macroscopic crystals of the individual enantiomers are manually separated. This technique can be used if crystals of the separate enantiomers exist, i.e., the material is a conglomerate, and the crystals are visually distinct;

ii) simultaneous crystallization—a technique whereby the individual enantiomers are separately crystallized from a solution of the racemate, possible only if the latter is a conglomerate in the solid state;

iii) enzymatic resolutions—a technique whereby partial or complete separation of a racemate by virtue of differing rates of reaction for the enantiomers with an enzyme;

iv) enzymatic asymmetric synthesis—a synthetic technique whereby at least one step of the synthesis uses an enzymatic reaction to obtain an enantiomerically pure or enriched synthetic precursor of the desired enantiomer;

v) chemical asymmetric synthesis—a synthetic technique whereby the desired enantiomer is synthesized from an achiral precursor under conditions that produce asymmetry (i.e., chirality) in the product, which may be achieved using chiral catalysts as disclosed in more detail herein or chiral auxiliaries;

vi) diastereomer separations—a technique whereby a racemic compound is reacted with an enantiomerically pure reagent (the chiral auxiliary) that converts the individual enantiomers to diastereomers. The resulting diastereomers are then separated by chromatography or crystallization by virtue of their now more distinct structural differences and the chiral auxiliary later removed to obtain the desired enantiomer;

vii) first- and second-order asymmetric transformations—a technique whereby diastereomers from the racemate equilibrate to yield a preponderance in solution of the diastereomer from the desired enantiomer or where preferential crystallization of the diastereomer from the desired enantiomer perturbs the equilibrium such that eventually in principle all the material is converted to the crystalline diastereomer from the desired enantiomer. The desired enantiomer is then released from the diastereomer;

viii) kinetic resolutions—this technique refers to the achievement of partial or complete resolution of a racemate (or of a further resolution of a partially resolved compound) by virtue of unequal reaction rates of the enantiomers with a chiral, non-racemic reagent or catalyst under kinetic conditions;

ix) enantiospecific synthesis from non-racemic precursors—a synthetic technique whereby the desired enantiomer is obtained from non-chiral starting materials and where the stereochemical integrity is not or is only minimally compromised over the course of the synthesis;

x) chiral liquid chromatography—a technique whereby the enantiomers of a racemate are separated in a liquid mobile phase by virtue of their differing interactions with a stationary phase. The stationary phase can be made of chiral material or the mobile phase can contain an additional chiral material to provoke the differing interactions;

xi) chiral gas chromatography—a technique whereby the racemate is volatilized and enantiomers are separated by virtue of their differing interactions in the gaseous mobile phase with a column containing a fixed non-racemic chiral adsorbent phase;

xii) extraction with chiral solvents—a technique whereby the enantiomers are separated by virtue of preferential dissolution of one enantiomer into a particular chiral solvent;

xiii) transport across chiral membranes—a technique whereby a racemate is placed in contact with a thin membrane barrier. The barrier typically separates two miscible fluids, one containing the racemate, and a driving force such as concentration or pressure differential causes preferential transport across the membrane barrier. Separation occurs as a result of the non-racemic chiral nature of the membrane which allows only one enantiomer of the racemate to pass through.

The stereoisomers may also be separated by usual techniques known to those skilled in the art including fractional crystallization of the bases or their salts or chromatographic techniques such as LC or flash chromatography. The (+) enantiomer can be separated from the (−) enantiomer using techniques and procedures well known in the art, such as that described by J. Jacques, et al., antiomers, Racemates, and Resolutions", John Wiley and Sons, Inc., 1981. For example, chiral chromatography with a suitable organic solvent, such as ethanol/acetonitrile and Chiralpak AD packing, 20 micron can also be utilized to effect separation of the enantiomers.

The following examples are provided to further illustrate the compounds, compositions, and processes of the present invention. These examples are illustrative only and are not intended to limit the scope of the invention in any way.

EXAMPLES

Example 1

Synthesis of Cyclopropenium Ions

Diaminochlorocyclopropenium Ions (Formula 4)

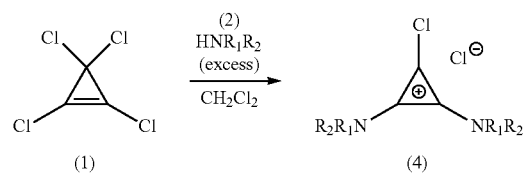

(eq. 1)

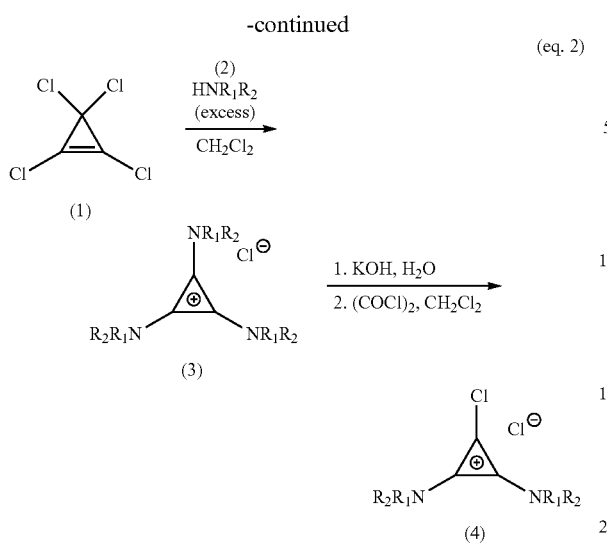

(eq. 2)

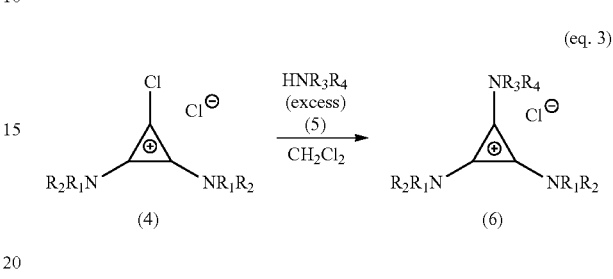

(eq. 3)

A diaminochlorocyclopropenium ion (a compound within the scope of Formula 4, where $R_1$ and $R_2$ are H) may be synthesized according to equation (1) or equation (2), depending on the size of the $R_1R_2$ groups being added to tetrachlorocyclopropene (Compound 1). Bulkier groups (such as branched groups) tend to add twice, as in equation 1, whereas smaller groups (such as linear or straight chain groups) tend to add three times, as in equation 2. See also Yoshida, 1973. In the Examples, unless specifically defined otherwise, the R groups are as defined previously in this application.

In general, an excess secondary amine of the formula $HNR_1R_2$ (Formula 2) is added to tetrachlorocyclopropene (compound 1) in methylene chloride. Formula 3 or Formula 4 is obtained after removal of the solvent. In general, removal of solvent is all that is required. If desired, column chromatography may be used after any step. The identity and purity of the compound may be confirmed by H-NMR, C-NMR and low-resolution mass spectrometry.

If the reaction proceeds according to equation (2), water soluble Formula 3 may be converted to Formula 4 by the addition of potassium hydroxide in water followed by reaction with oxalyl chloride. If Formula 3 is not soluble in water, then a water/methanol mixture is used, and the reaction mixture is heated to 60° C.-80° C. to solubilize Formula 3. The reaction with oxalyl chloride is done in dichloromethane solvent at room temperature.

Formula 4 in which $R_1=R_2=$Cyclohexyl.

A compound within the scope of Formula 4 in which $R_1=R_2=$cyclohexyl was synthesized as follows. To a solution of tetrachlorocyclopropene 1, an excess amount of dicyclohexylamine (Sigma Aldrich, St. Louis, Mo.) was added. The reaction mixture was stirred overnight at room temperature, followed by filtration and a 1 M HCl washing.

Formula 4 in which $R_1=R_2=$Isopropyl

A compound within the scope of Formula 4 in which $R_1=R_2=$isopropyl was made similarly to the cyclohexyl variant, with the exception that the work-up consists of only removal of the solvent. This process yields Formula 4 (where $R_1=R_2=$isopropyl) and a diisopropylamine hydrochloride salt in a 1:1 mixture. The diisopropylamine was purchased from Sigma Aldrich.

Formula 3 in which $R_1=R_2=$Methyl or $R_1=R_2=$—$(CH_2)_4$—

A compound within the scope of Formula 3 where $R_1=R_2=$Me or $R_1=R_2=$—$(CH_2)_4$— were prepared following Breslow's protocol (Wilcox and Breslow, 1980). Conversion (step 2) was performed in dichloromethane by addition of oxalyl chloride to cyclopropenone intermediate. Unless otherwise noted, all starting materials in the Examples were purchased from Sigma Aldrich.

Cyclopropenium Ions (Formula 6)

A diaminochlorocyclopropenium ion (a compound within the scope of Formula 4) is reacted with an excess of a secondary amine of the formula $HNR_3R_4$ (Formula 5) in methylene chloride. A compound within the scope of Formula 6 is obtained after removal of the solvent. If necessary, a water or 1 M HCl washing may be used to remove excess amine before removal of solvent.

Example 2

Synthesis of Cross-Linked Polymer 22

Synthesis of Compound 21

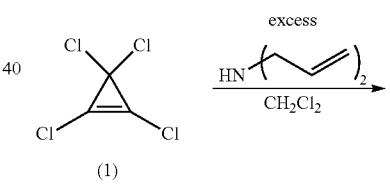

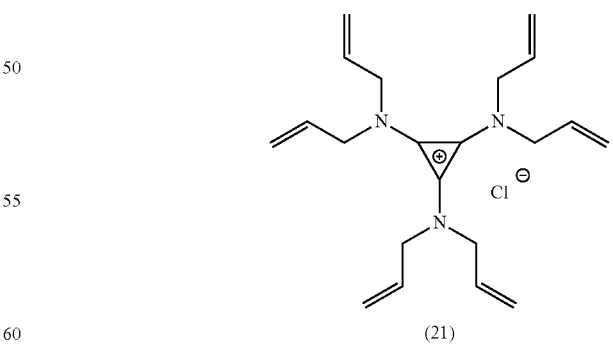

Tetrachlorocyclopropene (Compound 1) was reacted with excess diallylamine (Sigma Aldrich, catalog No. D9603, St. Louis, Mo.) in methylene chloride. After a water/1 M HCl washing and the removal of solvent, the cyclopropenium compound 21 was obtained.

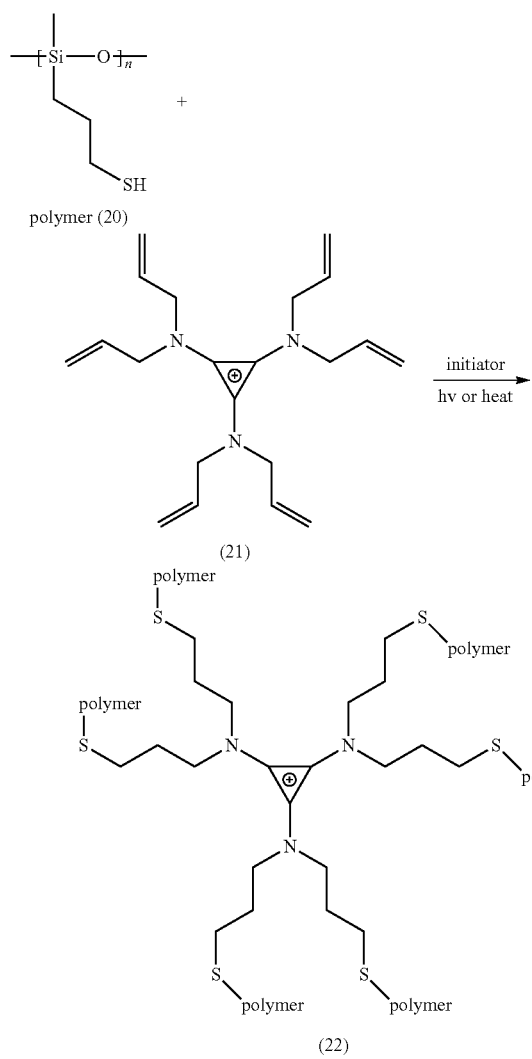

Cross-linked Polymer 22 was generated using the thiol-ene chemistry described in Campos et al., 2008a.

In particular, poly[(mercaptopropyl)methylsiloxane] (PMMS) (molecular weight of approximately 4000-7000 g/mol) (which is within the scope of polymer 20) was reacted with cyclopropenium ion 21 in the presence of less than 0.1 wt % 2,2-dimethoxy-2-phenylacetophenone (DMPA) as the initiator. Curing with ultraviolet (UV) light resulted in the cross-linked polymer 22. Different ratios of PMMS to cyclopropenium ion 21 may be used. Ratios of 1:1, 1:2, and 2:1 by mass were used. The resultant polymers are stiffer when a higher mass percentage of cyclopropenium ion 21 was used. All of the polymers, however, are flexible enough to be distorted by hand. An image of the cross-linked polymer is shown in FIG. 3.

Thermally Initiated Reactions

Alternatively, the reaction is initiated thermally, using any thermal radical initiator to form polymer 22. For example, azobisisobutyronitrile (AIBN) is a radical initiator that can be blended in the system (for example, 3-10 wt %) and the polymerization can take place at temperatures higher than 70° C. If a different initiator is used with either a higher or lower decomposition temperature, then the cross-linking temperature can be varied as desired. Cross-linking time can also be varied from 5 minutes to several hours, depending on the temperature and radical initiator of choice.

Example 3

Synthesis of Other Cross-Linked Polymers

Many other cross-linked polymers may be obtained by reacting, e.g., any of the thiol compounds with any of the ene compounds listed below. The initiator for the reaction(s) may be, e.g., either AIBN as the thermo initiator or DMPA.

Thiols

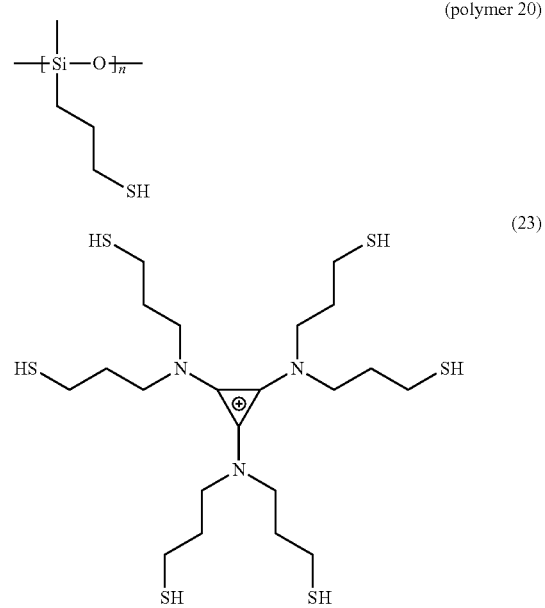

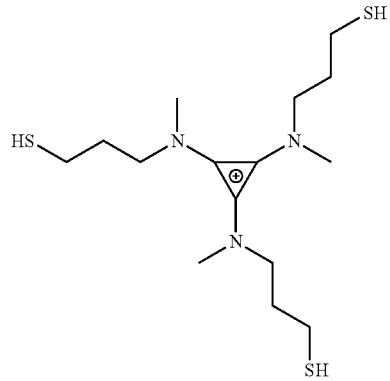

Enes

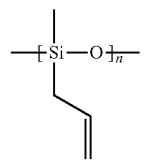

Synthesis of Compound 23

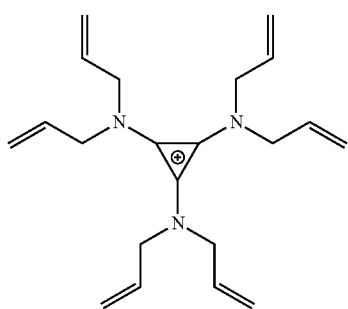
(21)

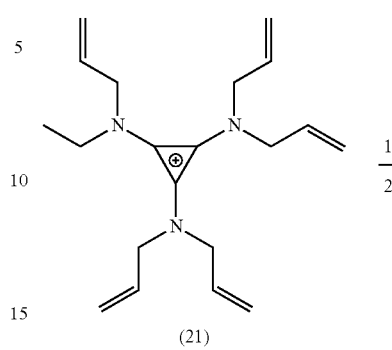
(21)

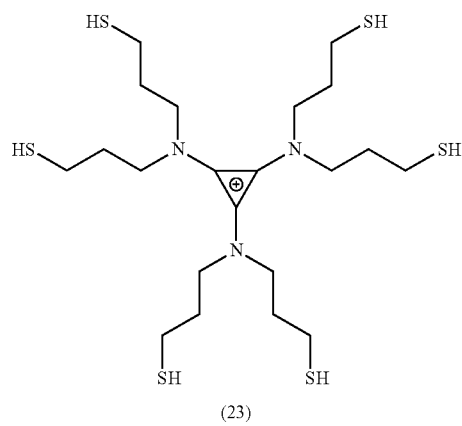
(23)

The double bonds in compound 21 are reacted with thioacetic acid to form the corresponding thioester, which is then hydrolyzed under acetic conditions to form compound 23.

Synthesis of Compound 24

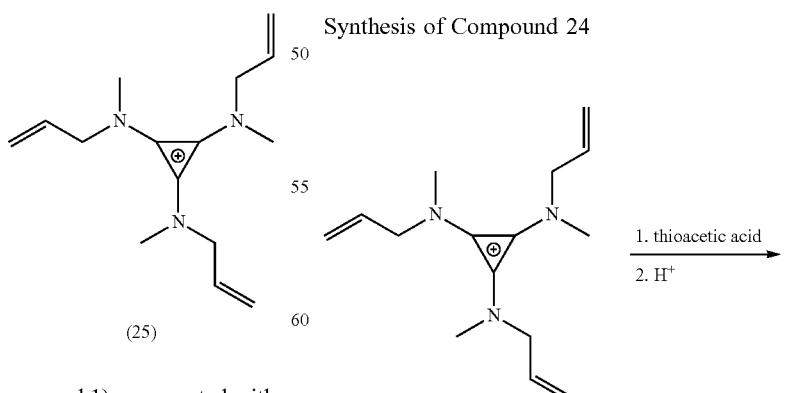
(25)

Synthesis of Compound 25

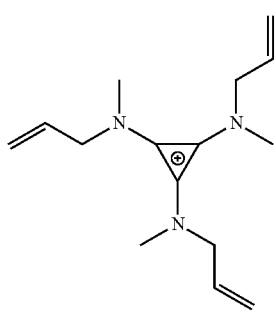

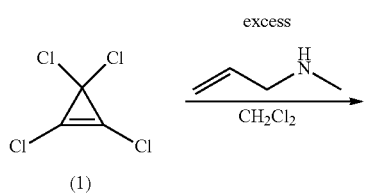
(1)

Tetrachlorocyclopropene (Compound 1) was reacted with excess N-allylmethylamine (Sigma Aldrich, catalog No. 317748) in methylene chloride. After a water/1M HCl wash and the removal of solvent, cyclopropenium compound 25 was obtained.

-continued

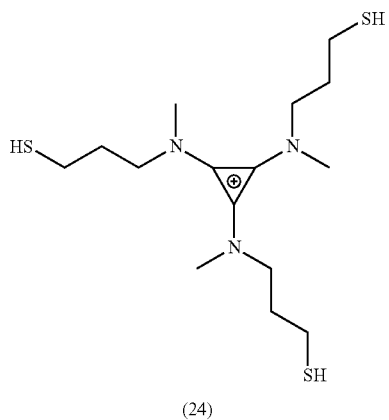

(24)

The double bonds in compound 25 are reacted with thioacetic acid to form the corresponding thioester, which is then hydrolyzed under acetic conditions to form compound 24.

Example 4

Synthesis of Linear Polymer Using "Grafting Though" Method

Linear polymers are made by the grafting through method using functional groups on the cyclopropenium group to form the polymer backbones (e.g., polymers based on styrene, (meth)acrylates, norbonenes). Random copolymers and block copolymers are also made.

Polymers with Polystyrene Backbones, Polymer 33

$R_1$, $R_2$:

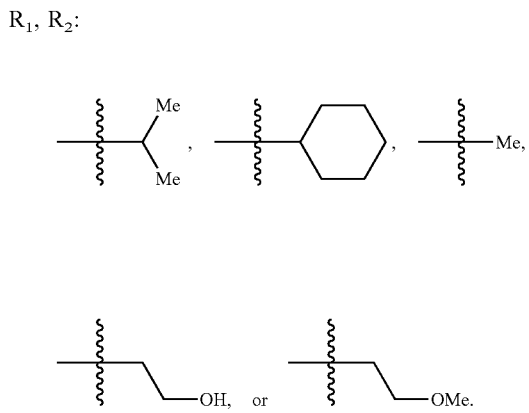

A compound within the scope of Formula 4 is reacted with excess 1-piperazineethanol (compound 30) (Sigma Aldrich catalog number H28807) in methylene chloride to form compound 31. In this example, $R_1$ and $R_2$ may be the same or different and are independently selected from, e.g., the groups listed above.

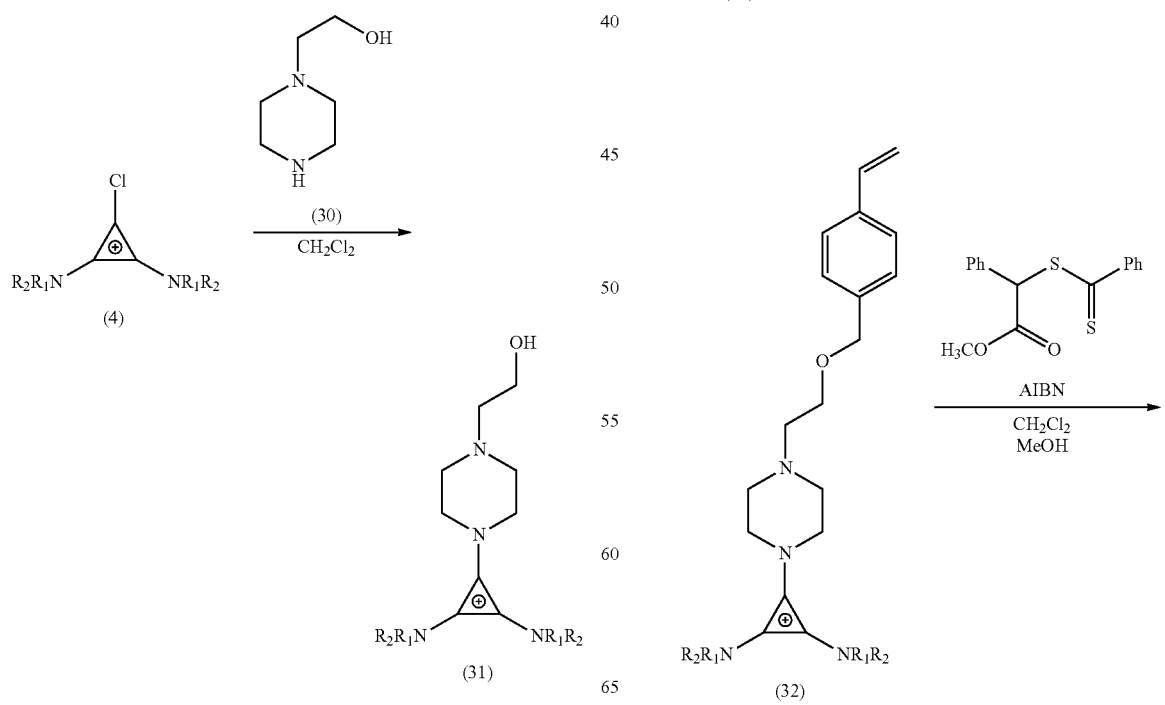

R₁, R₂:

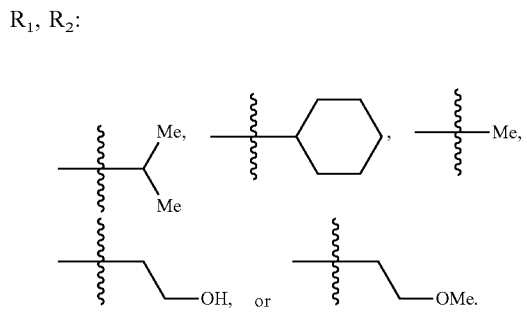

A compound within the scope of Formula 4 is reacted with excess 2-(Methylamino)ethanol (compound 34) (Sigma Aldrich catalog number 471445) in methylene chloride to form a compound within the scope of Formula 35. In this example, R₁ and R₂ may be the same or different and are independently selected from, e.g., the groups listed above.

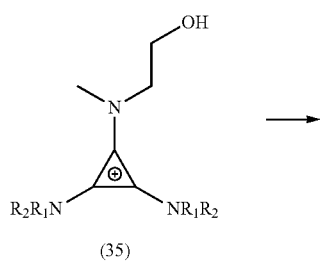

(35)

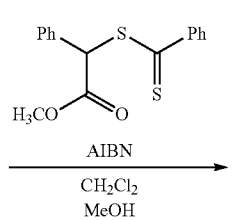

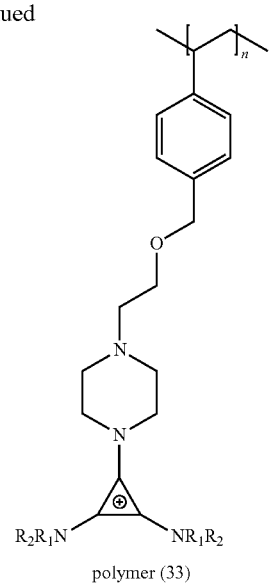

polymer (33)

A compound within the scope of Formula 32 is made by treatment of a compound within the scope of Formula 31 with sodium hydride, followed by addition of 4-vinylbenzylchloride in DMF or THF. The resulting product, a compound within the scope of Formula 32, is purified by column chromatography.

A polymer within the scope of Formula 33 may be formed in accordance with Campos et al., 2008b. Briefly, a catalytic amount of AIBN is added to a compound within the scope of Formula 32 with a reversible addition-fragmentation chain transfer (RAFT) agent,

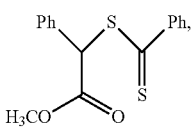

and heated. The contents are diluted with CH₂Cl₂ before precipitating into cold MeOH. The resulting polymer is dried in vacuo.

Polymers with Polystyrene Backbones, Formula 37

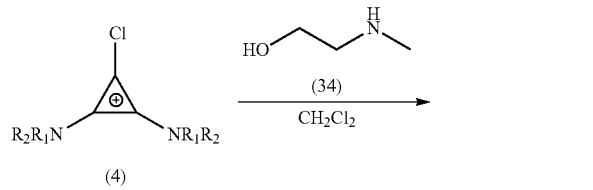

polymer (37)

A compound within the scope of Formula 36 is made by treating a compound within the scope of Formula 35 with sodium hydride, followed by addition of 4-vinylbenzylchloride in DMF or THF. The resulting product, which is within the scope of Formula 36, is purified by column chromatography.

A polymer within the scope of Formula 37 may be formed in accordance with Campos et al., 2008b. Briefly, a catalytic amount of AIBN is added to a compound within the scope of Formula 36 in combination with a reversible addition-fragmentation chain transfer (RAFT) agent,

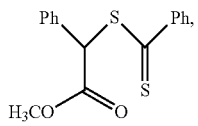

and heated. The contents are diluted with CH$_2$Cl$_2$ before precipitating into cold MeOH. The resulting polymer, which is within the scope of Formula 37, is dried in vacuo. Depending on the solubility, the polymer may be precipitated into hexanes or a water/MeOH mixture. Precipitation tests can be performed on a small scale before scaling up.

Polymers with Polymethacrylate Backbones, Formula 39

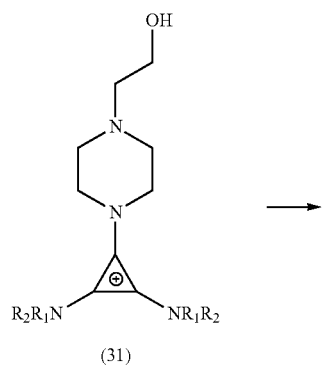

(31)

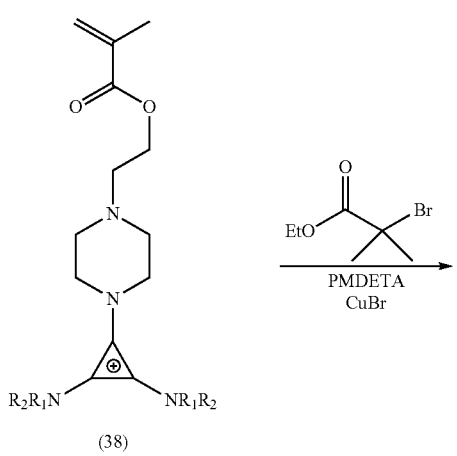

(38)

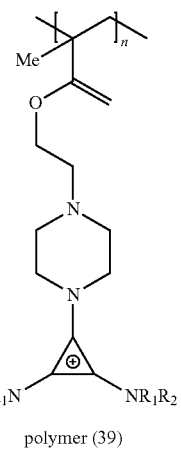

polymer (39)

A compound within the scope of Formula 31 is dissolved in dichloromethane, cooled to 00° C., then triethylamine and methacryloyl chloride are added in excess. The reaction is then allowed to proceed overnight; followed by a water washing and column chromatography. The resulting product is a compound within the scope of Formula 38.

A polymer within the scope of Formula 39 may be formed in accordance with Campos et al., 2008b. Briefly, a compound within the scope of Formula 38, ethyl-2-bromo isobutyrate, and N,N,N',N'',N'''-pentamethyldiethylenetriamine (PMDETA) are added to a flask and sparged with nitrogen. Copper(I) bromide is placed in a Schlenk flask with a stir bar and evacuated. The reagent mixture is heated to 75° C., with stirring. The solution is then diluted with CH$_2$Cl$_2$ and passed through neutral alumina to remove the excess copper. The solution is concentrated, and a polymer within the scope of Formula 39 is precipitated into hexanes and dried under vacuo as a final step. Additionally, precipitation may take place into methanol instead of hexanes, depending on the solubility of the polymer.

Polymers with Polymethacrylate Backbones, Formula 41

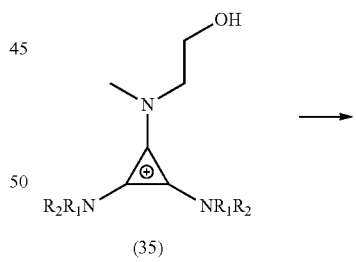

(35)

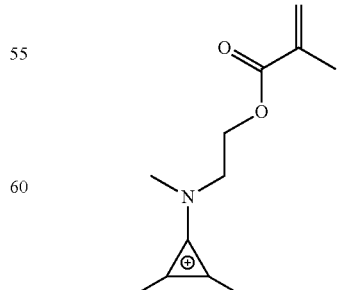

(40)

-continued

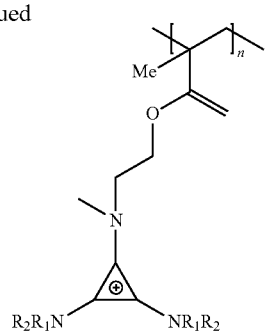

polymer (41)

A compound within the scope of Formula 35 is dissolved in dichloromethane, and the mixture is cooled to 0° C. Then triethylamine and methacryloyl chloride (Sigma Aldrich) are added in excess. The reaction is then allowed to proceed overnight. A water washing and column chromatography yield a compound within the scope of Formula 40.

A polymer within the scope of Formula 41 may be formed in accordance with Campos et al., 2008b. Briefly, a compound within the scope of Formula 40, ethyl-2-bromo isobutyrate, and N,N,N',N'',N''-pentamethyldiethylenetriamine (PMDETA) are added to a flask and sparged with nitrogen. Copper(I) bromide is placed in a Schlenk flask with a stir bar and evacuated. The reagent mixture is heated to 75° C., with stirring. The solution is then diluted with $CH_2Cl_2$ and passed through neutral alumina to remove the excess copper. The solution is concentrated, and the a polymer within the scope of Formula 41 is precipitated into hexanes.

Example 5

Synthesis of Linear Polymer Using "Grafting To" Method

The cyclopropenium group may also be grafted onto a pre-formed polymer using, e.g., click chemistry reactions, such as thiol-ene and azide/alkyne click reactions, as illustrated in FIG. 1. Suitable compounds for such click chemistry reactions include those shown below:

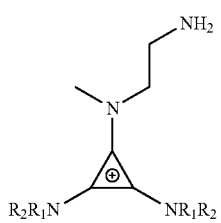
(42)

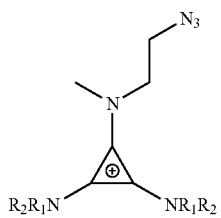
(43)

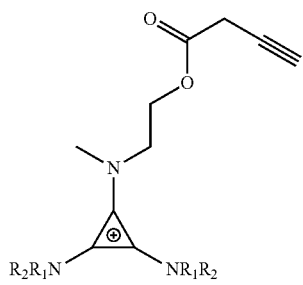
(44)

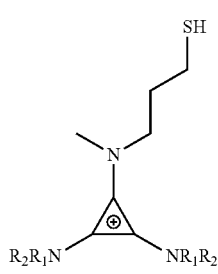
(45)

$R_1$, $R_2$:

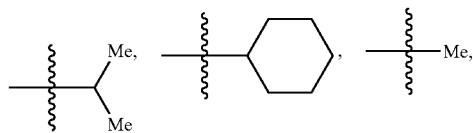

For example, a compound within the scope of Formula 42 is used in a reaction of a primary amine with an NHS-activated ester to make a corresponding amide. Compounds within the scope of Formulas 43 and 44 are used, e.g., in azide/alkyne click reactions, and a compound within the scope of Formula 45 is used in thiol-ene reactions, in accordance with the procedure disclosed in Campos et al., 2008b.

Each of the starting compounds within the scope of Formulas 42-45 is made according to the synthesis scheme of equation 1 or 2, followed by equation 3.

As an alternative, a compound within the scope of Formula 45 may be formed according to the following synthesis scheme:

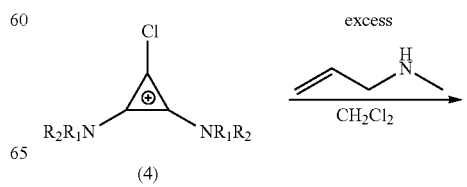

(4)

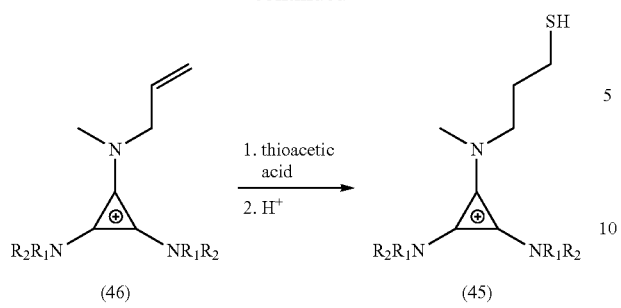

A compound within the scope of Formula 4 is reacted with excess N-allylmethylamine (Sigma Aldrich, catalog No. 317748) in methylene chloride. A cyclopropenium compound within the scope of Formula 46 is obtained after removal of solvent. The double bond in a compound within the scope of Formula 46 is reacted with thioacetic acid to form the corresponding thioester, which is then hydrolyzed under acidic conditions to form a compound within the scope of Formula 45.

Example 6

Synthesis of Cyclopropenium Dendrimers

Figure 2:
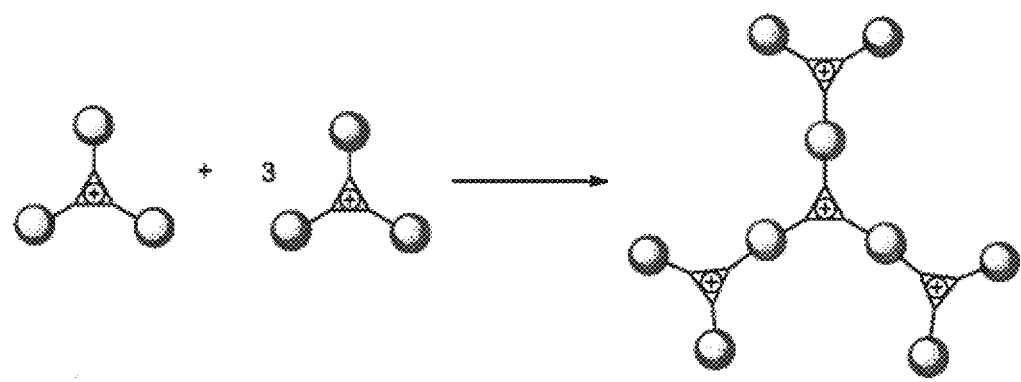
FIG. 2 shows a schematic representation of forming dendrimers from tri-functional monomers.

Dendrimers are synthesized using trifunctional monomers as shown in FIG. 2. Many different strategies may be used to generate dentrimers with a core cyclopropenium cation.

For example, an accelerated $AB_2/CD_2$ approach using both copper catalyzed azide alkyne cycloaddition (CuAAC) and a thiol-ene coupling reaction may be used to generate dendrimers, as disclosed in Antoni et al., 2010. Specifically, the following representative compounds are used for the strategy.

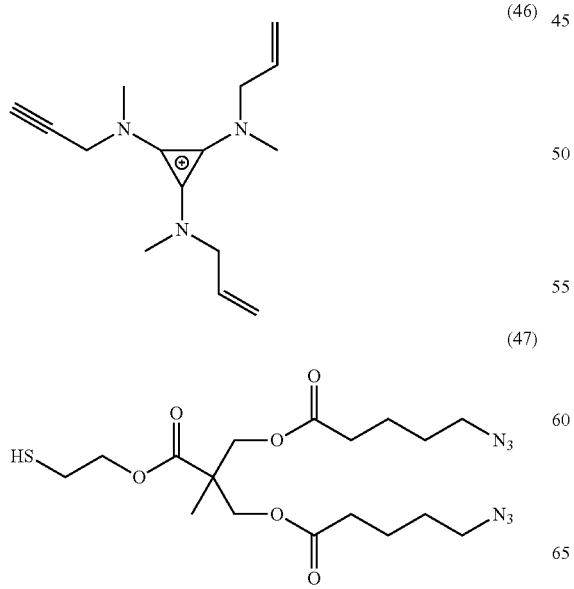

Compounds 46 and 47 will be used in one dendrimer synthesis, and compounds 46 and 48 will be used in another. The synthesis of compound 47 is disclosed in Antoni et al., 2010.

Synthesis of Compound 46

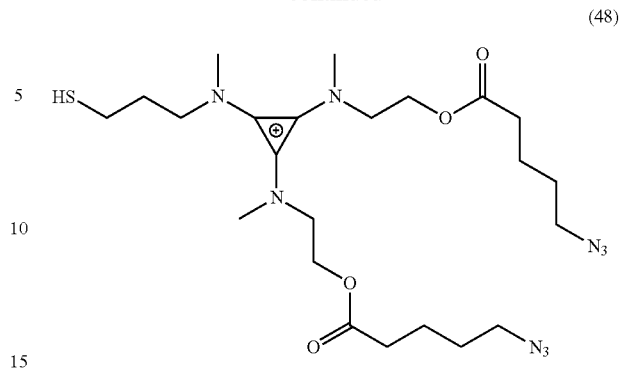

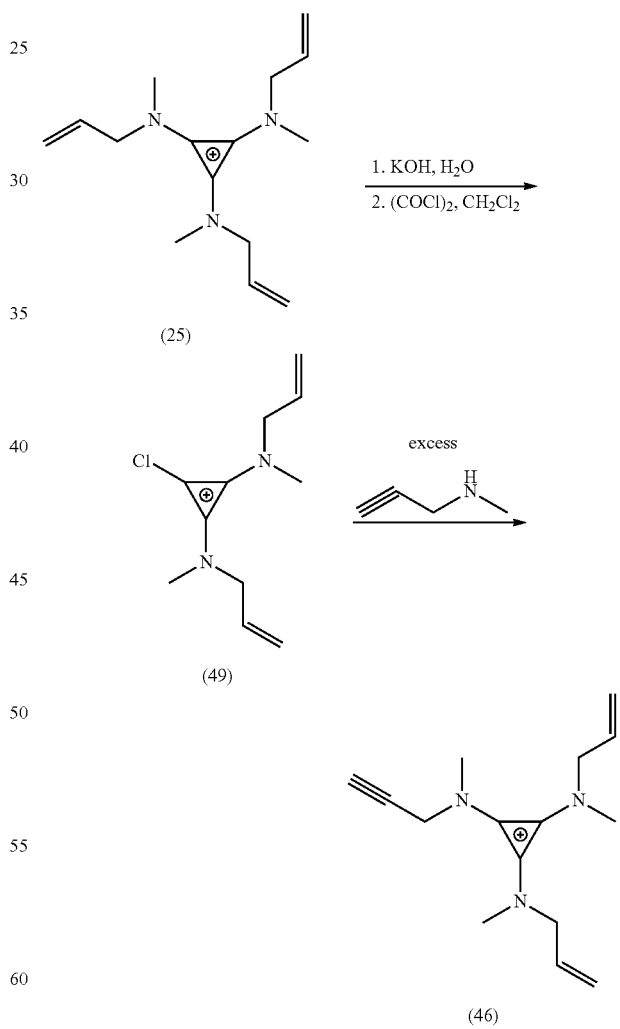

Compound 25 is converted to compound 49 by the addition of potassium hydroxide in water followed by reaction with oxalyl chloride. Compound 49 is then reacted with excess methyl propargyl amine to yield compound 46.

Synthesis of Compound 48

Tetrachlorocyclopropene (Compound 1) is reacted with excess 2-(methylamino)ethanol (compound 34) (Sigma Aldrich catalog number 471445) in accordance with equations 1 or 2 above to form compound 50.

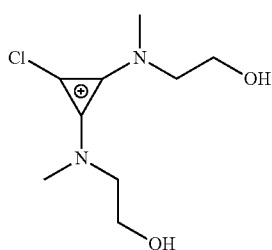

(50)

Compound 50 is then reacted with excess N-allylmethylamine (Sigma Aldrich, catalog No. 317748) in methylene chloride. The double bonds in the resulting product are reacted with thioacetic acid to form the corresponding thioester, which is then hydrolyzed under acetic conditions to form the thiol group in compound 48. Esterification with the azide functional monomer yields compound 48.

First Generation Dendrimer: Thiol-Ene Reaction

A first generation dendrimer may be obtained via a thiol-ene reaction between compounds 46 and 47 or compounds 46 and 48. The reaction is conducted in the presence of tris(allyloxy)triazine (TAT), as well as the radical initiator, 2,2-dimethoxy-2-phenylacetophenone (DMPA). The reaction solution is sparged with argon prior to irradiation with 365 nm UV light followed by simple filtration through a plug of silica to remove excess compound 47 or 48.

Second Generation Dendrimer: CuAAC Reaction

Purified first generation dendrimer is then reacted with 1.1 equivalents of 47 or 48 in THF/H$_2$O with CuSO$_4$ and sodium ascorbate (NaAsc). The CuSO$_4$/NaAsc system (Rostovtsev et al., 2002) is chosen because of its proven robust nature and monitoring of the CuAAC reaction using $^1$H NMR and FT-IR spectroscopy revealed full conversion of the peripheral azides. Concomitant with the loss of the CH$_2$N$_3$ resonance at 3.3 ppm, new peaks in the region of 5.1-5.9 ppm corresponding to the terminal alkenes of the fully converted second generation dendrimer may be observed in the $^1$H NMR spectrum. Additionally, FT-IR will be able to show complete disappearance of the azide stretch at 2091 cm$^{-1}$ and reappearance of the terminal alkene vibrational transition at 923 cm$^{-1}$, thus confirming the quantitative nature of the second generation growth step.

Higher Generation Dendrimers

Higher generation dendrimers may be formed by performing additional cycles of the thiol/ene reaction (by utilizing, e.g., the process for making of the first generation dendrimer) and the CuAAC reaction (by utilizing, e.g., the process for making of the second generation dendrimer). Optionally, additional purification steps, for example, by filtration through a silica plug, simple precipitation, or a combination of extraction and precipitation, may be performed.

Example 7

Alternative Methods of Synthesizing Cyclopropenium-Containing Polymers

A further novel route according to the present invention to synthesize cyclopropenium containing polymers has been developed. In this method, a random copolymer of styrene and chloromethylstyrene (or a homopolymer of chloromethylstyrene) is reacted with either methylamine or isopropylamine to introduce an amine functional handle into the polymer. The resulting amine functionalized polymer is then reacted with dichlorocyclopropene in a substitution reaction to yield a tris(dialkylamino)cyclopropenium containing polymer. The reaction scheme for converting polymers containing polychloromethylstyrene to poly(N-alkylamino) methylstyrene, followed by substitution of the dichlorocyclopropene is as follows:

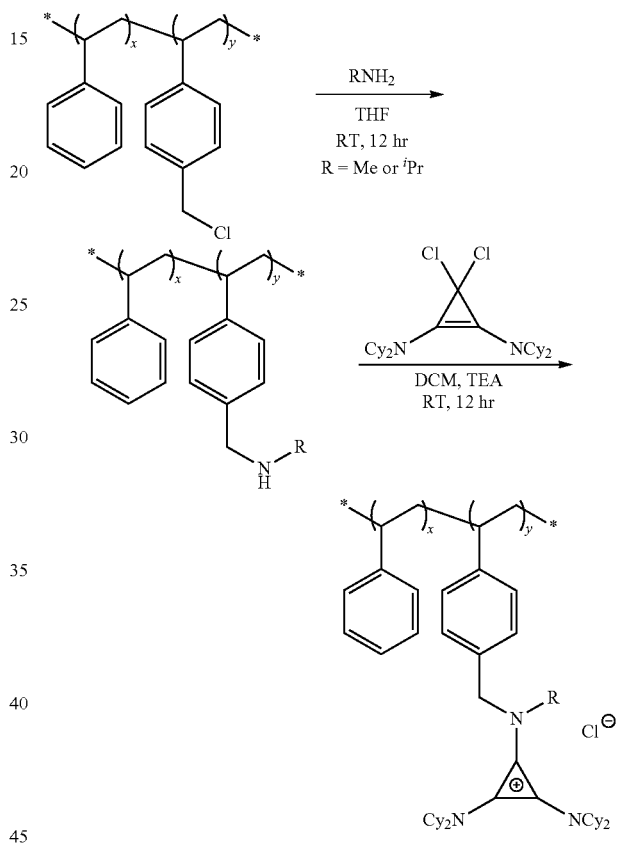

In the scheme above, x and y are independently selected from integers greater than or equal to zero, such as from 0-1,000, including 0-500, 0-250, 0-100, 0-50, 0-25, 0-10, and 0-5.

Furthermore, this methodology may be applied to diblock copolymers to create cyclopropenium containing diblocks for the first time. The following scheme shows how diblock copolymers may be made using this method:

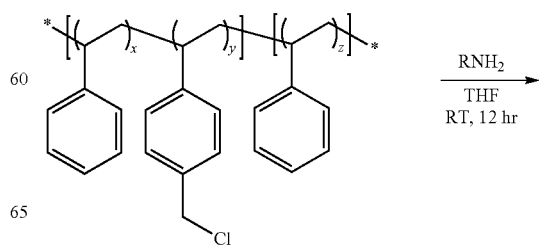

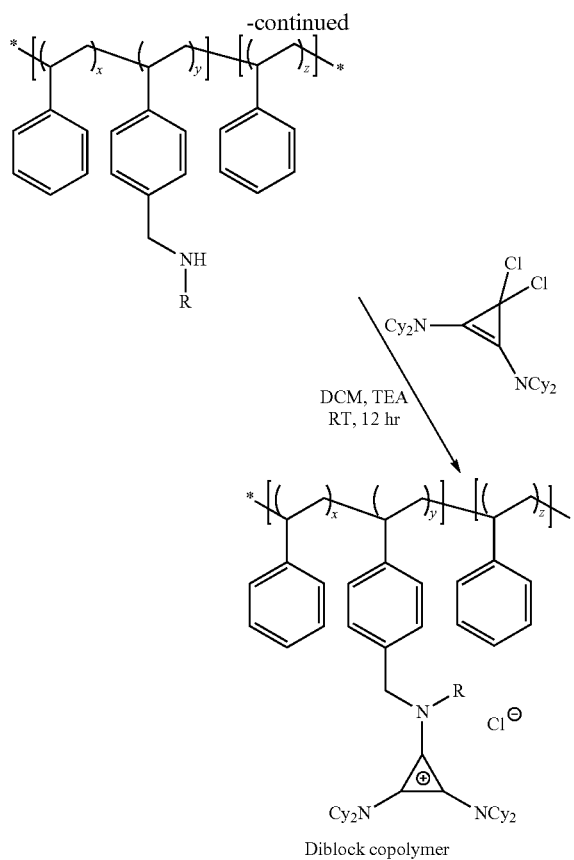

In the scheme above, x, y, and z are independently selected from integers greater than or equal to zero, such as from 0-1,000, including 0-500, 0-250, 0-100, 0-50, 0-25, 0-10, and 0-5. For example, x, y, and z may be independently selected from 0, 1, 2, 3, 4, 5, 6, 7, 8, 9, and 10. R is any group that suitable for participating in the process, including substituted or unsubstituted alkyl, such as $C_{1-6}$ alkyl, preferably methyl or isopropyl groups.

Diblock copolymers can self-assemble into nanoscale patterns, and thus, nanopatterned cyclopropenium-containing surfaces may be made.

Example 8

Alternative Methods of Synthesizing Cyclopropenium Monomers

Figure 4:
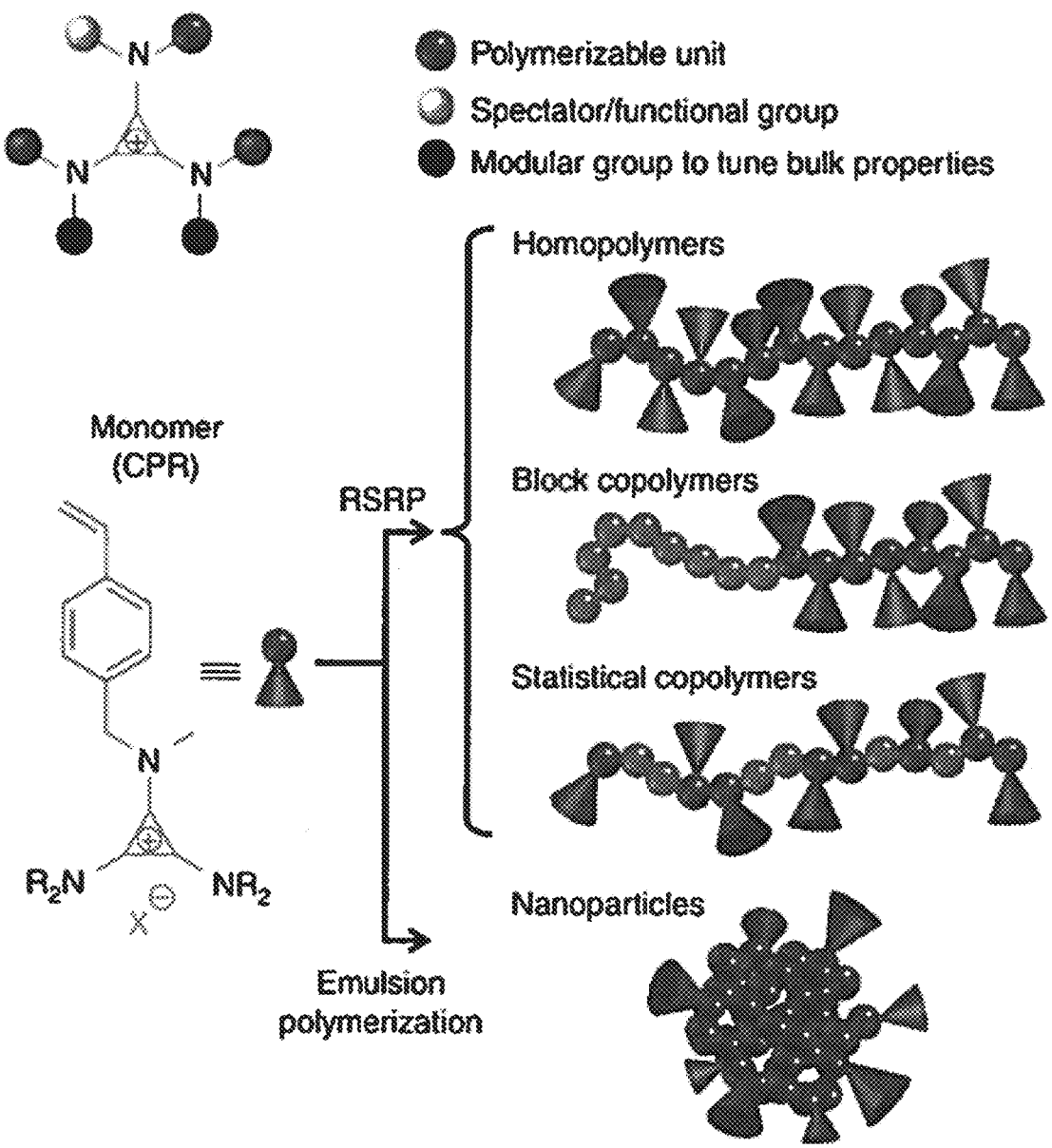
FIG. 4 shows schematic structures of CP ion building blocks. (a) Structure of the CP ion, including the dialkylamino groups that can be used to stabilize and vary the application of this diverse building block. (b) Types of polyelectrolytes that can be synthesized from CP monomers by reversible-deactivation radical polymerization (RDRP) strategies and emulsion polymerization.

Exploration of the CP functional group in the context of cationic polyelectrolytes was originally inspired by its ionic liquid properties (Curnow et al. 2011) and the straightforward elaboration of the CP ion with various functional groups. Thus far, however, there are no reports on the incorporation of this thermodynamically stable carbocation into macromolecules; CP derivatives have only appeared in polymers as transient species (Weidner et al. 1995, Peart et al. 2010 (Weidner et al. 1995, Peart et al. 2010). Derivatives of the CP ion are made from inexpensive reagents and can be easily prepared on a multi-gram scale under ambient conditions (Curnow et al. 2011). As robust chemistry is requisite for large-scale production of materials, we devised a viable synthetic strategy en route to the polymerisable CP ion monomers. The general approach to synthesize CP ion-containing monomers is based on the facile preparation of asymmetric amino-substituted CP ions (for example, CPR, FIG. 4) (Curnow et al. 2012). This procedure allows us to intimately change functionality while maintaining cationic properties and thermal stability. Notably, synthetic routes to aminocyclopropenium derivatives are modular and highly scalable (Bandar et al. 2013a), with efficiency levels approaching those attained via click chemistry (Kolb et al. 2001).

Figure 5:
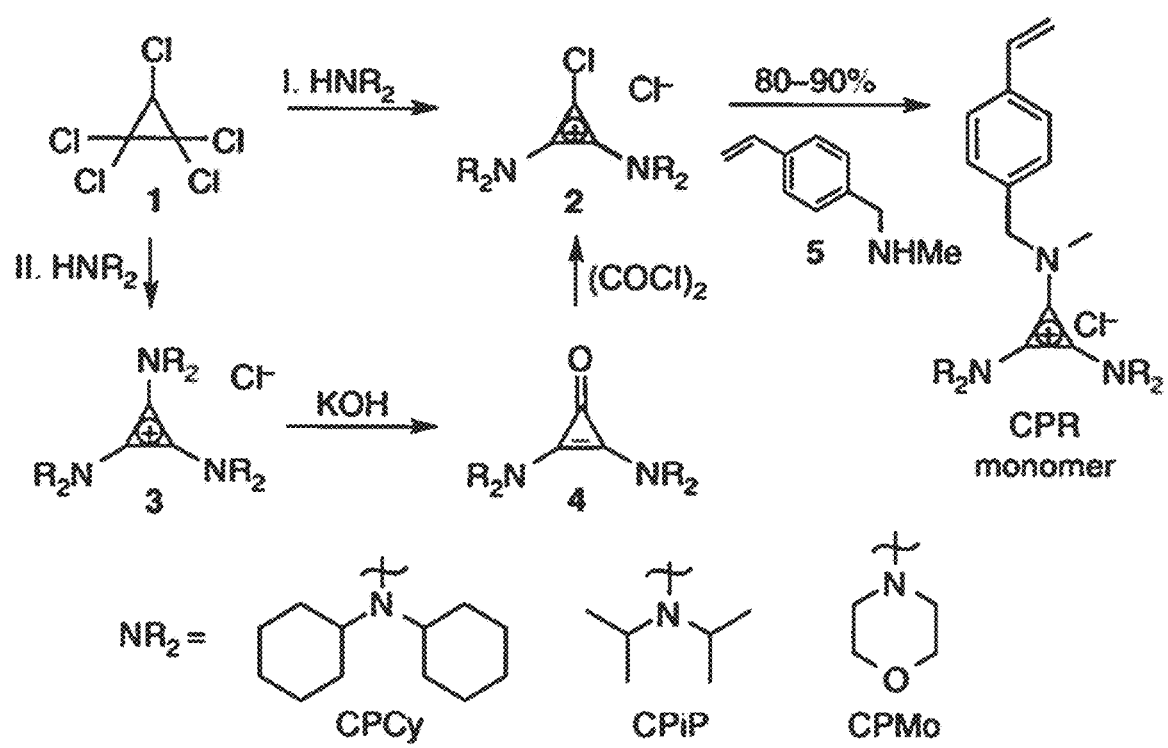
FIG. 5 shows a representative synthesis of CP monomers for RAFT polymerisations according to the present invention. The monomers CPCy and CPiP were synthesized by addition of dicyclohexylamine (92%) and diisopropylamine (85%) to 1, followed by substitution of styrenic-type amine 5 under basic conditions (86% and 88%, respectively). CPMo was similarly synthesized. After addition of morpholine to 1, subsequent hydrolysis and treatment with oxalyl chloride (42%, 3 steps), 5 was substituted to yield CPMo (59%).

Referring to FIG. 5, the preparation of the CPR monomers begins with penta-chlorocyclopropane (1), which is commercially available or inexpensively synthesized in hundred-gram quantities (Tobey et al. 1966). Reaction of 1 with a secondary amine leads to near-quantitative yields of a corresponding CP cation (2 or 3). Thus, amines with high steric hindrance (dicyclohexylamine, Cy and diisopropylamine, iP) add twice to 1, preventing addition of a third bulky amine and leading directly to 2. Conversely, less sterically hindered amines, such as morpholine (Mo), add thrice to 1, resulting in a tris-amino CP (3). The latter is readily hydrolyzed to its corresponding cyclopropenone in hot, aqueous base, which is subsequently chlorinated to obtain 2. To underscore the accessibility of these materials, we note that the monomers are obtained by simple purification techniques. Using this process, we prepared multi-gram quantities of 2 incorporating three different secondary amines, as depicted in FIG. 5 (bottom). Importantly, the chemistry in FIG. 5 is highly amenable to a wide range of nucleophilic secondary amines incorporating a variety of functional groups, including elements of asymmetry. Dicyclohexylamine, diisopropylamine and morpholine were specifically chosen for examination, given that they differ significantly in their degrees of hydrophilicity and steric hindrance.

The synthesis of the CPR monomers from the precursor (2) was readily achieved in 10-20 g quantities. The chlorinated 1-position of 2 is highly susceptible to addition of a secondary amine bearing a polymerisable unit, such as compound 5 (FIG. 5). A styrene-based polymerisable group was chosen as it is a well-behaved building block in polymer chemistry, and its hydrophobicity relative to the CP ion moiety could stabilize an emulsion of the type used in nanoparticle synthesis. Other polymerisable moieties should yield functional monomers as well.

Example 9

Polymer Synthesis and Characterization

Figure 6:
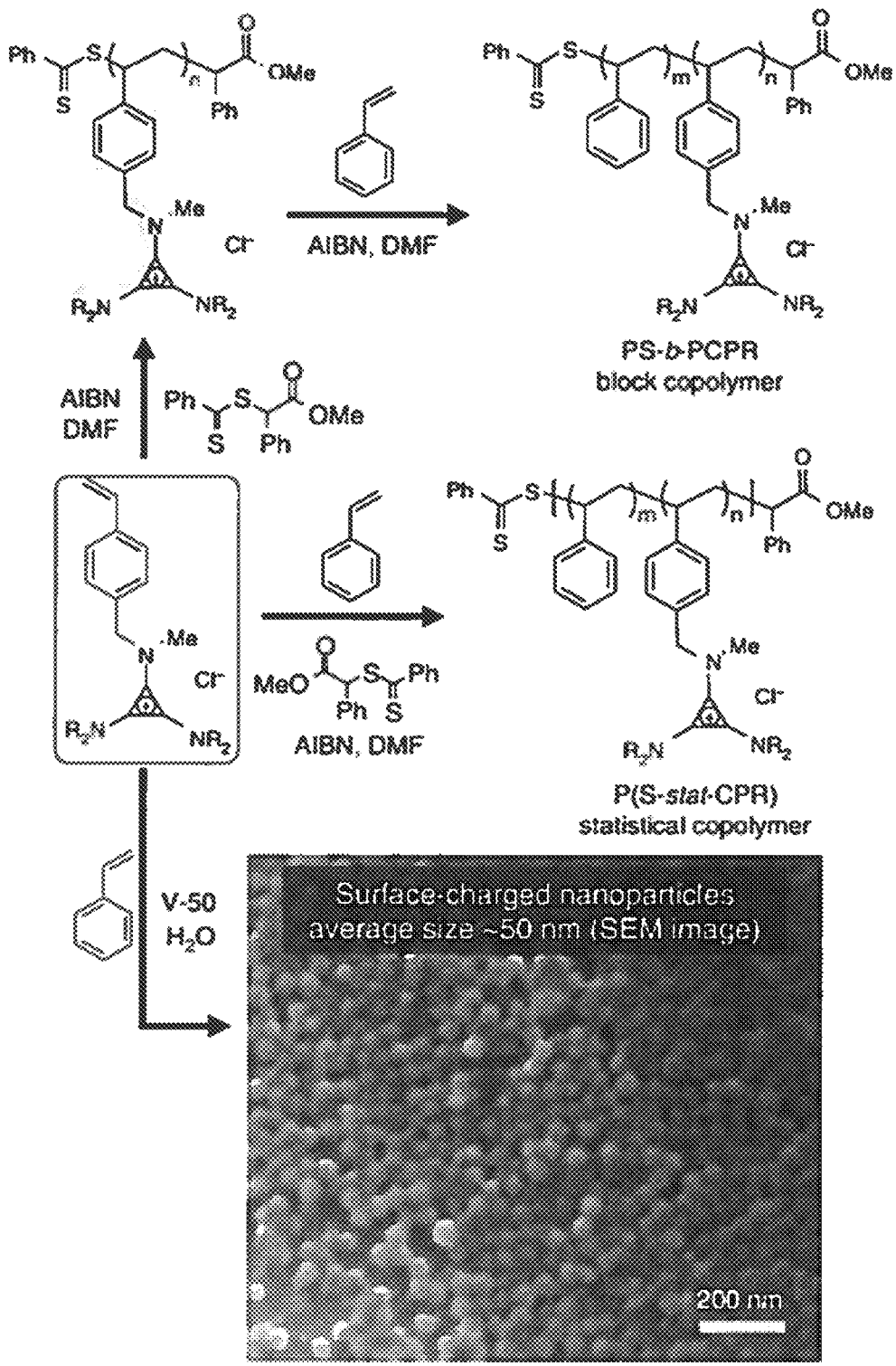
FIG. 6 shows a representative synthesis of CP-containing polymers according to the present invention. CPR is polymerized by RAFT yielding both homopolymers, PCPR, and statistical copolymers, P(S-stat-CPR). PCPR is reacted further to form block copolymers PS-b-PCPR of varying styrene content. Nanoparticles are synthesized by surfactant-free emulsion polymerization with styrene using the water-soluble thermal initiator V-50.
Figure 7:
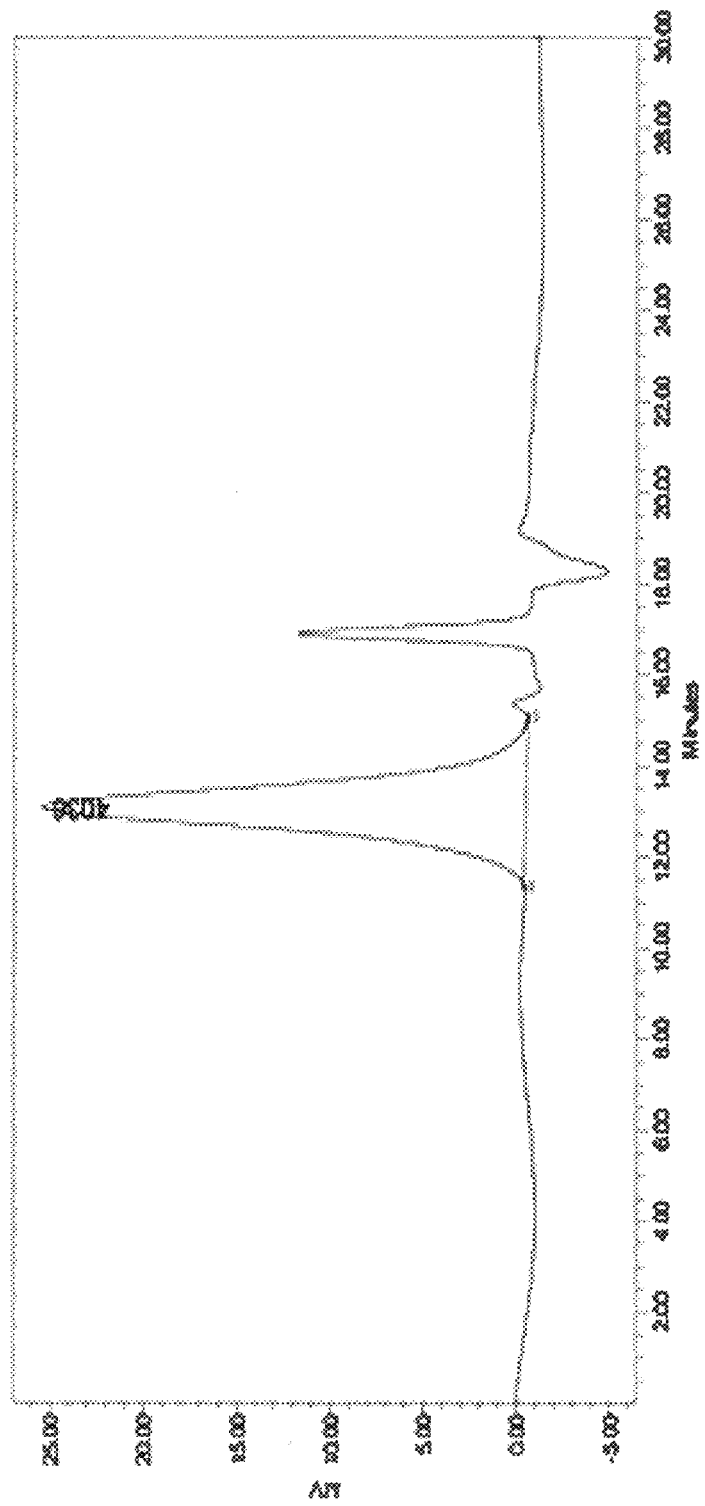
FIG. 7 shows a size exclusion chromatography (SEC) trace of PCPMo. The dispersity (Đ) was found to be 1.3 (see Table 2).

The three chosen monomers (CPCy, CPiP and CPMo, FIG. 5) were polymerized by RAFT in multigram quantities yielding linear polymers (PCPCy, PCPiP and PCPMo, respectively, FIG. 6). PCPCy was purified through trituration into 1,4-dioxane from $CH_2Cl_2$ with 88% recovered yield. PCPiP was precipitated from acetone or $CH_2Cl_2$ into cold ethyl acetate with 70% recovered yield. Due to their solubility in water, both PCPiP and PCPMo can be purified by dialysis. Purification of PCPMo resulted in a 51% recovered yield. Each of these polymers was isolated as a powder, and PCPiP and PCPMo were observed to be extremely hygroscopic. Through end-group analysis of the $^1$H nuclear magnetic resonance (NMR) spectra, we calculated the degree of polymerization (DP) and molecular mass of each of the homopolymers (Table 1). Due to the cationic nature of the CP groups, polymers (and copolymers) cannot be characterized using size exclusion chromatography eluted with organic solvents, as the polymers adhere to the column. An attempt was made to characterise the dispersity (Đ) of the hydrophilic homopolymers (PCPiP and PCPMo) on an acetate-buffered aqueous size exclusion chromatography; however, only PCPMo successfully eluted owing to its greater hydrophilicity (FIG. 7, Table 2). The $\bar{\ }$ of PCPMo was determined to be 1.3, but we note that this value may not accurately reflect the DP control, given that the polyelectrolyte may still be interacting with the column as it is eluted. We note that the synthetic accessibility of these various CP-based polymers is straightforward and highly efficient, rivalling that of ammonium, phosphonium and imidazolium polymers (Hemp et al. 2013, Yuan et al. 2011, Wang et al. 2007, Texter et al. 2012).

As expected, a significant relationship was observed between the nature of the amino substituent and the physical properties of the resultant homopolymer. It was observed that the decomposition temperature ($T_{dec}$), glass transition temperature ($T_g$) and solubility of the homopolymers varied as a function of substituent (Table 1). Through characterization by thermo-gravimetric analysis we found that the $T_{dec}$ of the homopolymers increased as the amino substituents became less sterically hindered. Of particular note, PCPMo decomposed at 310° C., which is comparable to the $T_{dec}$ of imidazolium-based polymers (Sudre et al. 2013). Differential scanning calorimetry was performed to identify the $T_g$ for the homopolymers, as ion-conducting membranes are frequently melt-processed. Both PCPCy and PCPiP have no observable $T_g$ before decomposition, but PCPMo exhibited a $T_g$ of 160° C. Previous reports have revealed a connection between the nature of the counterion and the accessible temperature window; replacement of the chloride with an alternative, typically bulkier counterion is expected to increase the $T_{dec}$ while decreasing the T (Curnow et al. 2011, Sudre et al. 2013, Weber et al. 2011). Importantly, however, the data clearly demonstrate a similar relationship between alkyl chain identity and observed $T_{dec}$ and $T_g$; thus, by modifying the CP substituents, one can significantly broaden the temperature window in which these materials are processable, without the need to adjust the counterion. In addition, solubility of PCPR homopolymers is highly dependent on amino substituents, again reflecting the influence of building block composition on macromolecular properties. Characterization of the homopolymers, including thermal data and solubility information, is summarized in Table 1.

Statistical copolymers were readily synthesized by RAFT, using styrene and CPR monomers, P(S-stat-CPR). When styrene was copolymerized with each monomer in a 1:1 mole ratio, we observed some disparities in the percent incorporation of functional CP monomers in the resulting copolymer. For CPCy, CPiP and CPMo, the degree of incorporation was 50%, 48%, and 45%, respectively.

Figure 8:
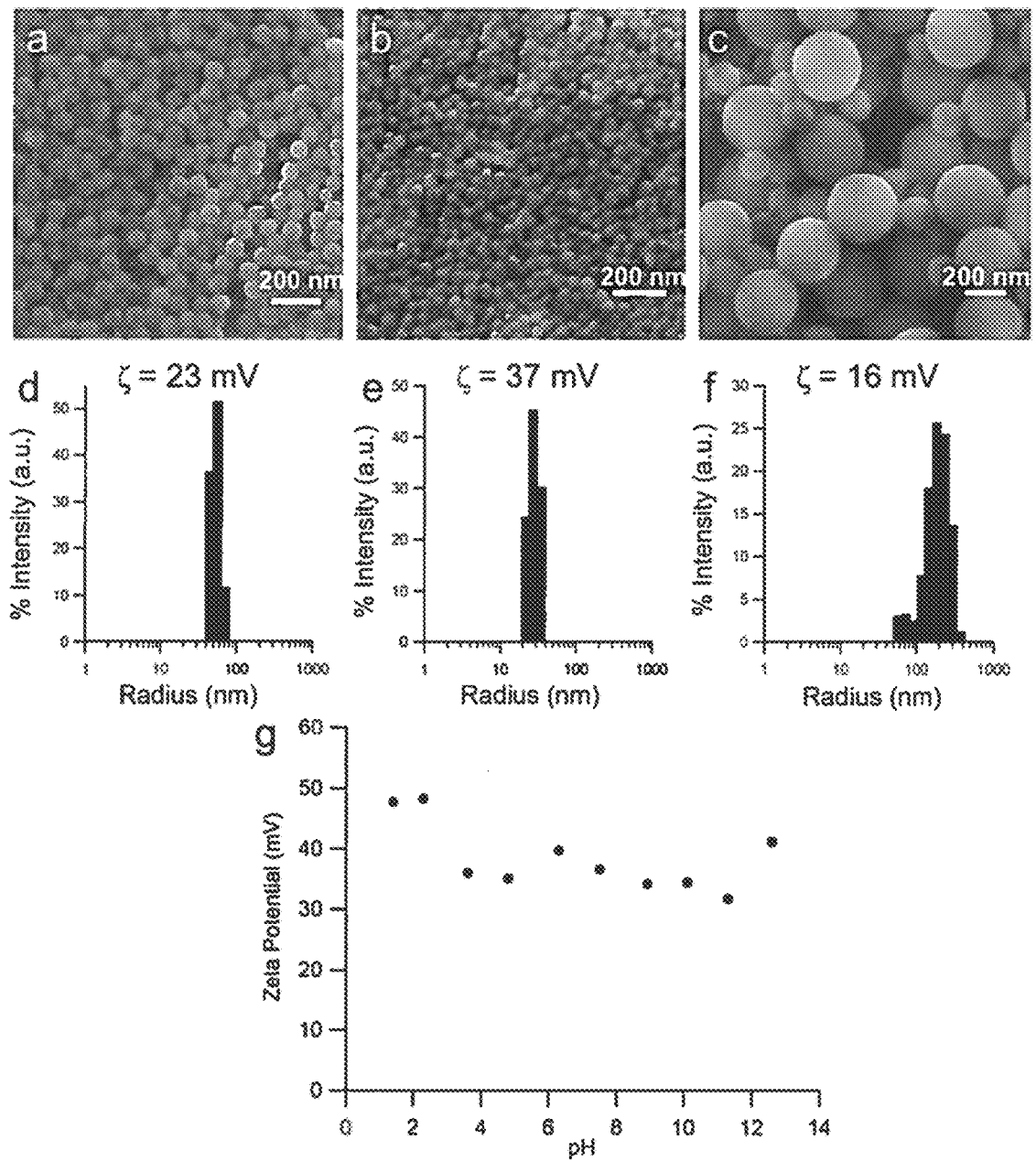
FIG. 8 shows particles synthesized by surfactant-free emulsion polymerization. Scanning electron microscopy (SEM) images and dynamic light scattering (DLS) histograms, respectively, for 1 wt. % CPiP (a, d), 5 wt. % CPiP (b, e) and 0 wt. % CPiP (PS only) (c, f). Plot of zeta potential at a range of pH values for 5 wt. % CPiP (g).

Considering the ability to copolymerize styrene and CPR monomers, cationic nanoparticles based on the CPiP monomer were synthesized via surfactant-free emulsion polymerization. Many traditional strategies rely on the use of surfactants or additional solvents (Ramos et al. 2013) to obtain sub-100 nm cationic particles. By simply mixing styrene and CPiP at various weight percent values (1, 2.5, 5, 10 and 20% of CPiP) and using a thermally activated radical initiator (V-50), we were able to obtain particles ranging from 30 to 90 nm (as characterized by dynamic light scattering, FIG. 8). Higher loadings of CPiP compared with styrene resulted in smaller, albeit more disperse, particles. FIG. 6 shows the scanning electron microscope image of nanoparticles made from 5% CPiP/95% styrene. The average diameter obtained by dynamic light scattering was found to be 50 nm. Furthermore, the particles that form stable dispersions as the zeta potential of the 5% CPiP nanoparticles was found to remain above 30 mV over the range of >10 pH units (FIG. 8). As a control, particles synthesized with styrene only (without any surfactants or CPR monomers) were much larger and exhibited a bimodal size distribution (FIG. 8). These data demonstrate that the CPiP monomer effectively stabilizes oil-in-water droplets, and that the charge is present on the particle surface. A more detailed study of this behavior will follow, including the incorporation of other CPR monomers into cationic nanoparticles. In general, the ability to make charged nanoparticles in a surfactant-free, large-scale process could have far-reaching potential towards interfacial additives and biological applications (Rothberg et al. 2011, Nederberg et al. 2011).

While the CPR monomers were successfully copolymerized to make statistical polymers and nanoparticles, the library of CPR-based macromolecules was augmented with block copolyelectrolytes (BCPEs). Block copolymers PS-b-PCPR(CP mol %) were synthesized by growing styrene onto PCPR macro-chain transfer agents (macro-CTA). By varying the DP of the polystyrene block, we effectively controlled the different mole fractions of the CP functional block. We note that block copolymers PS-b-PCPR could also be obtained by the reverse process of growing the functional monomer CPR onto polystyrene macro-CTAs.

Referring to Table 1, as the size and hydrophobicity of the alkyl chains decreased from PCPCy to PCPMo, conversion of the monomers became noticeably lower and $T_{dec}$ was found to increase. PCPMo was found to have a $T_g$ of 160° C. Solubilities also depended on the hydrophilicity of the alkyl chains.

TABLE 1

Characterization of PCPR homopolymers.

| Sample | MM/kg mol$^{-1}$ | DP | $T_{dec}$ | $T_g{}^a$ | Solubilities[b] | | | | |
|---|---|---|---|---|---|---|---|---|---|
| | | | | | CHCl$_3$ | CH$_2$Cl$_2$ | ROH[c] | H$_2$O | THF |
| PCPCy | 35 | 60 | 160° C. | N/A | ✓ | ✓ | ✓ | ✗ | ✗ |
| PCPiP | 17 | 40 | 225° C. | N/A | ✓ | ✓ | ✓ | ✓ | ✗ |
| PCPMo | 29 | 75 | 310° C. | 160° C. | ✗ | ✗ | ✓ | ✓ | ✗ |

[a]Both PCPCy and PCPiP decomposed before reaching any recordable $T_g$.
[b]All homopolymers are soluble in DMF and DMSO and insoluble in hexanes, ethyl acetate, and diethyl ether.
[c]ROH = methanol and ethanol.
Only PCPMo was not soluble in isopropanol.
Note:
✓ means soluble and ✗ is insoluble.

TABLE 2

SEC data for PCPMo (see FIG. 7).

| MM (Daltons) | Mn (Daltons) | MP (Daltons) | Dispersity (Đ) | Peak Name | RT | Area | % Area | Height |
|---|---|---|---|---|---|---|---|---|
| 4587 | 3422 | 4036 | 1.340446 | Broad | 13.094 | 1762186 | 100.00 | 25897 |

MM = mass average molecular mass.
Mn = number average molecular mass.
MP = molecular mass at the peak maximum.
RT = retention time.

Example 10

Morphology of BCPEs

After synthesizing block copolymers of various compositions, we characterized the morphology of bulk films comprising various CPR-building blocks. Recent studies suggest that nanostructured BCPEs have broad implications in materials chemistry, specifically for fuel cells and batteries, if they undergo microphase segregation. For example, Ye et al. recently reported that BCPEs with a lamellar morphology conduct ions more effectively than cationic homopolymers, as water and ions confined within nanochannels may accelerate transport (Ye et al. 2013). Computational studies from Olvera de la Cruz and coworkers suggest this effect may be enhanced if the conducting path is a continuous, percolating structure (Sing et al. 2014); a microphase segregated morphology of charged and neutral blocks observed in ion-containing block copolymers (Park et al. 2007). With this in mind, block copolymer samples were characterized by small-angle X-ray scattering (SAXS) and TEM to understand microphase segregation in PCPR-containing BCPEs.

Figure 9:
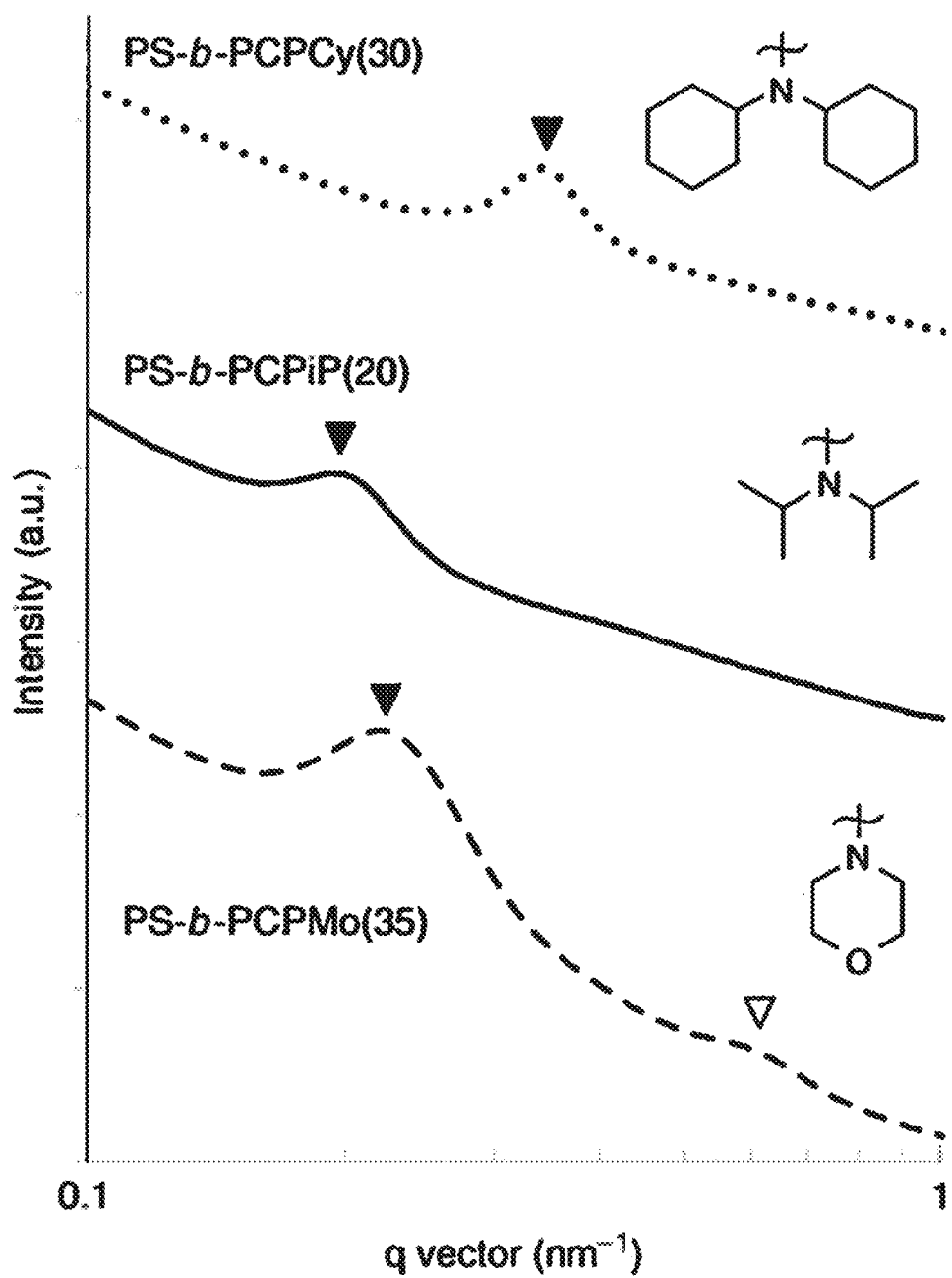
FIG. 9 shows small angle X-ray scattering (SAXS) profiles of microphase separated diblock copolymers according to the present invention collected at 25° C. Scattering intensity is plotted as a function of the magnitude of the scattering vector, q. Filled triangles represent the primary scattering peaks and the open triangles represent the higher-order scattering peaks.
Figure 10:
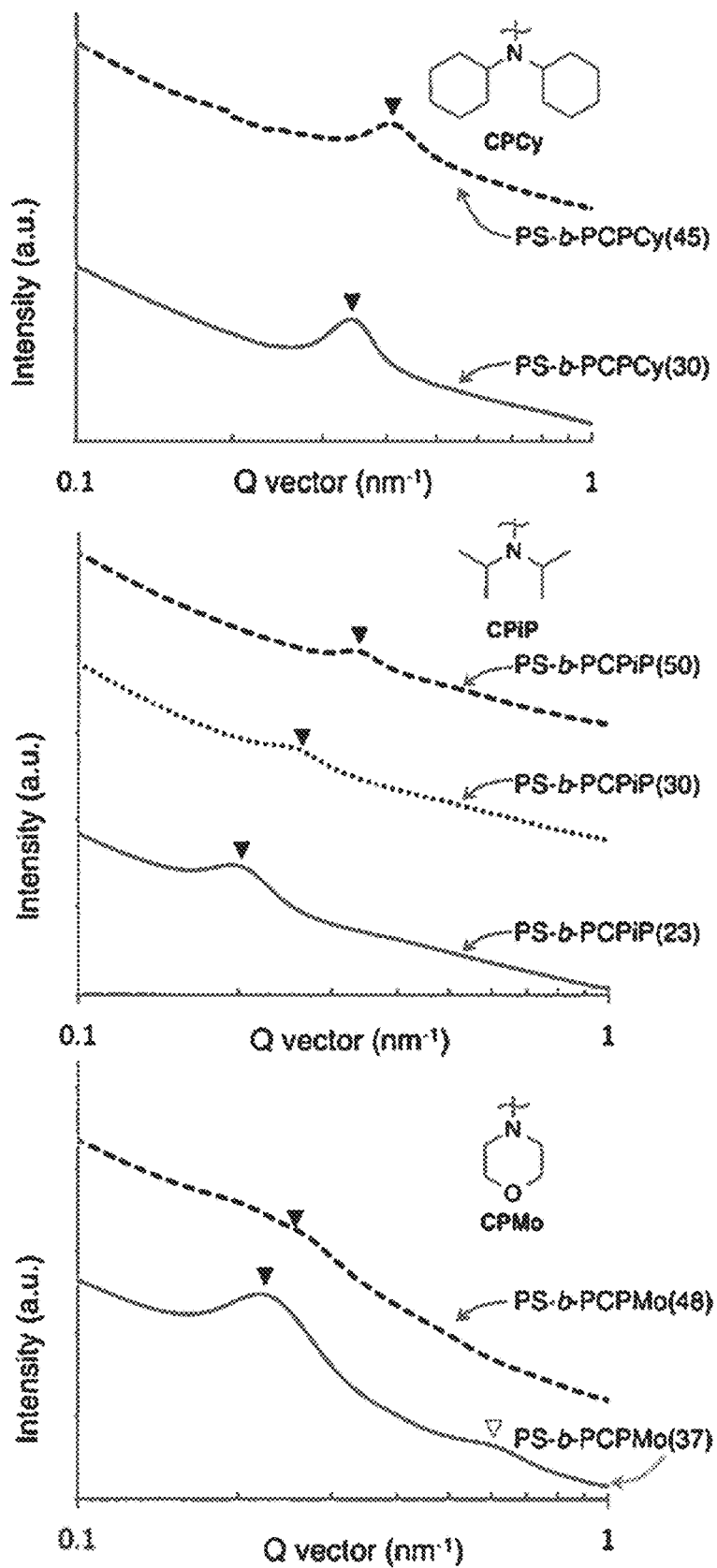
FIG. 10 shows representative SAXS profiles of microphase segregated diblock copolymers according to the present invention collected at 25° C. Scattering intensity is plotted as a function of the magnitude of the scattering vector, q. Filled triangles represent the primary scattering peaks, and the open triangles represent the higher order scattering peaks.

In FIG. 9 and FIG. 10, we show SAXS (Alexander et al. 2010) profiles of three representative diblock copolymers. The primary scattering peaks seen in each sample (indicated by filled triangles) is attributed to microphase separation. The scattering profile of PS-b-PCPMo(35) contains a higher-order peak at q=3q*. This suggests the presence of a symmetric lamellar phase. The scattering profiles of the other polymers contain only one peak, which indicates a lack of long-range order. The domain spacing, d, of the microphase separated diblock copolymers is calculated by the equation d=2π/q*. The domain spacing values corresponding to each diblock copolymer are given in Table 3. As expected, d-spacing increases with molecular mass and molar fraction of styrene. Next, the potential application of CP-based polyelectrolytes in electrochemical devices was probed (Chen et al. 2010, Sing et al. 2014).

TABLE 3

Characterization of PS-b-PCPR (CP mol %) block copolymers

| Sample Name | MM/kg mol$^{-1}$ | CP % by DP | CP % by MM | SAXS domain spacing (nm) |
|---|---|---|---|---|
| PS-b-PCPCy(45) | 40 | 45% | 80% | 15 |
| PS-b-PCPCy(30) | 50 | 30% | 70% | 18 |
| PS-b-PCPiP(50) | 20 | 50% | 80% | 18 |
| PS-b-PCPiP(30) | 27 | 30% | 60% | 24 |
| PS-b-PCPiP(20) | 30 | 20% | 50% | 31 |
| PS-b-PCPMo(50) | 38 | 50% | 80% | 26 |
| PS-b-PCPMo(35) | 42 | 35% | 70% | 28 |

CP, cyclopropenium;
DP, degree of polymerization;
NMR; nuclear magnetic resonance;
SAXS, small-angle X-ray scattering
Block copolymers were synthesized by the addition of styrene to the three homopolymers, and domain spacing was calculated by SAXS
Molecular mass (MM) was determined by $^1$H NMR spectroscopy.

Figure 11:
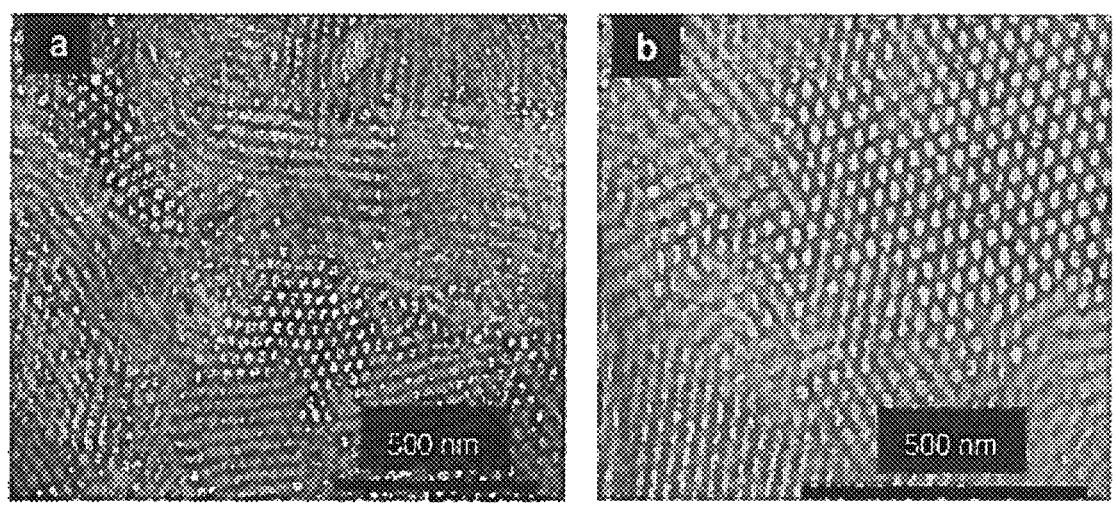
FIG. 11 shows the morphology and ionic conductivity of bulk PS-b-PCPiP films. (a and b) Two representative TEM images of PS-b-PCPiP(20) reveal a morphology of hexagonally packed cylinders (d-spacing=29 nm; the light color corresponds to PS). (c) Ionic conductivity as a function of inverse temperature, from 25 to 65° C., for (d) PS-b-PCPiP (20) (ion-exchange capacity, IEC=1.3, at 90% RH).
Figure 11:
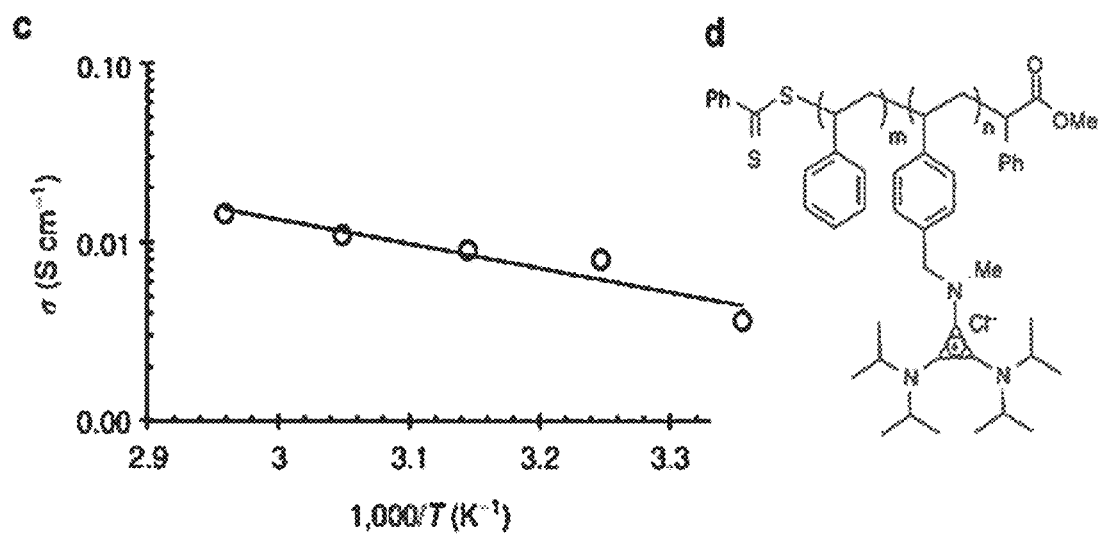
Figure 12:
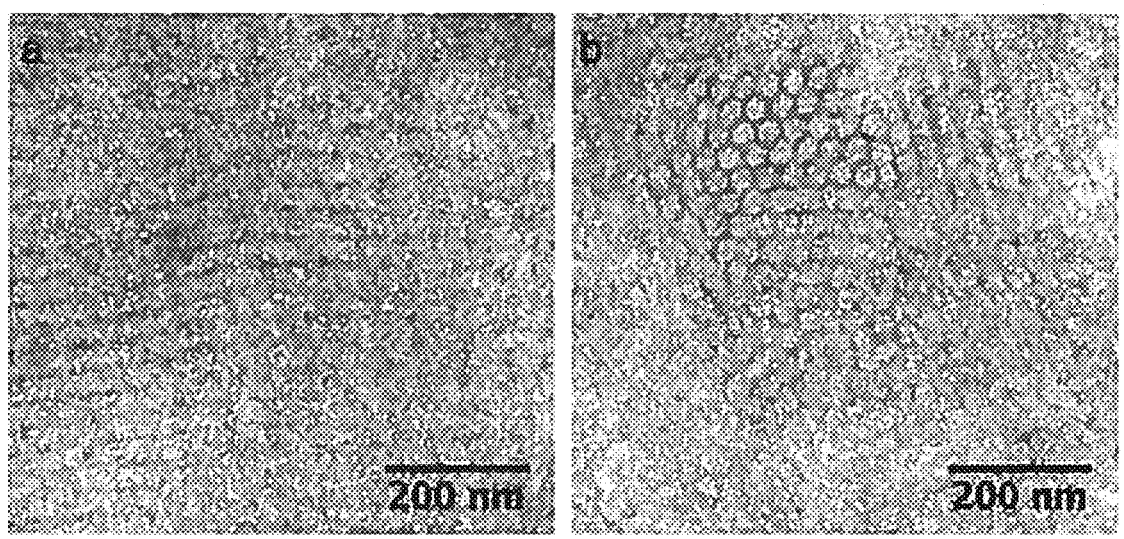
FIG. 12 shows transmission electron microscopy (TEM) images of PS-b-PCPiP(20) without exposure to RuO$_4$ vapor. (a.) Cross-section of the cylinders. (b.) Hexagonally packed cylinders orientated orthogonal to the section.
Figure 13:
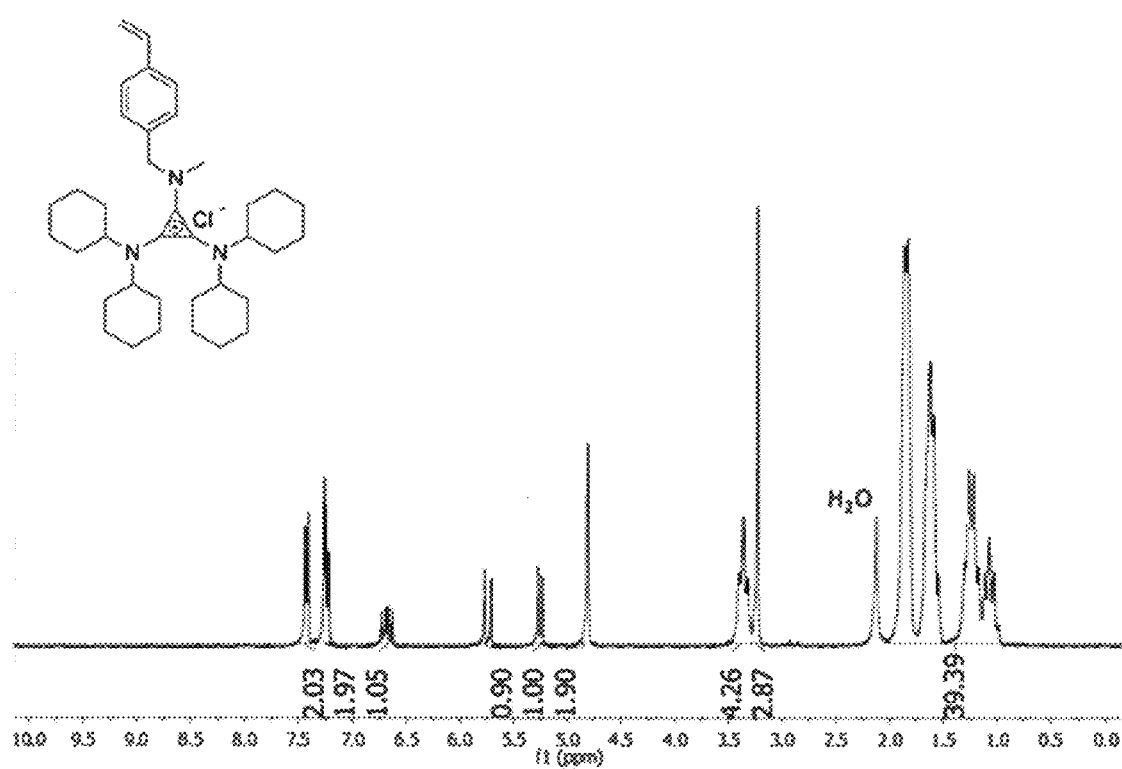
FIG. 13 shows a representative $^1$H-NMR spectrum of N-methyl-1-(2,3-bis(dicyclohexylamino)cyclopropenium)-4-vinylbenzylamine chloride (CPCy).
Figure 14:
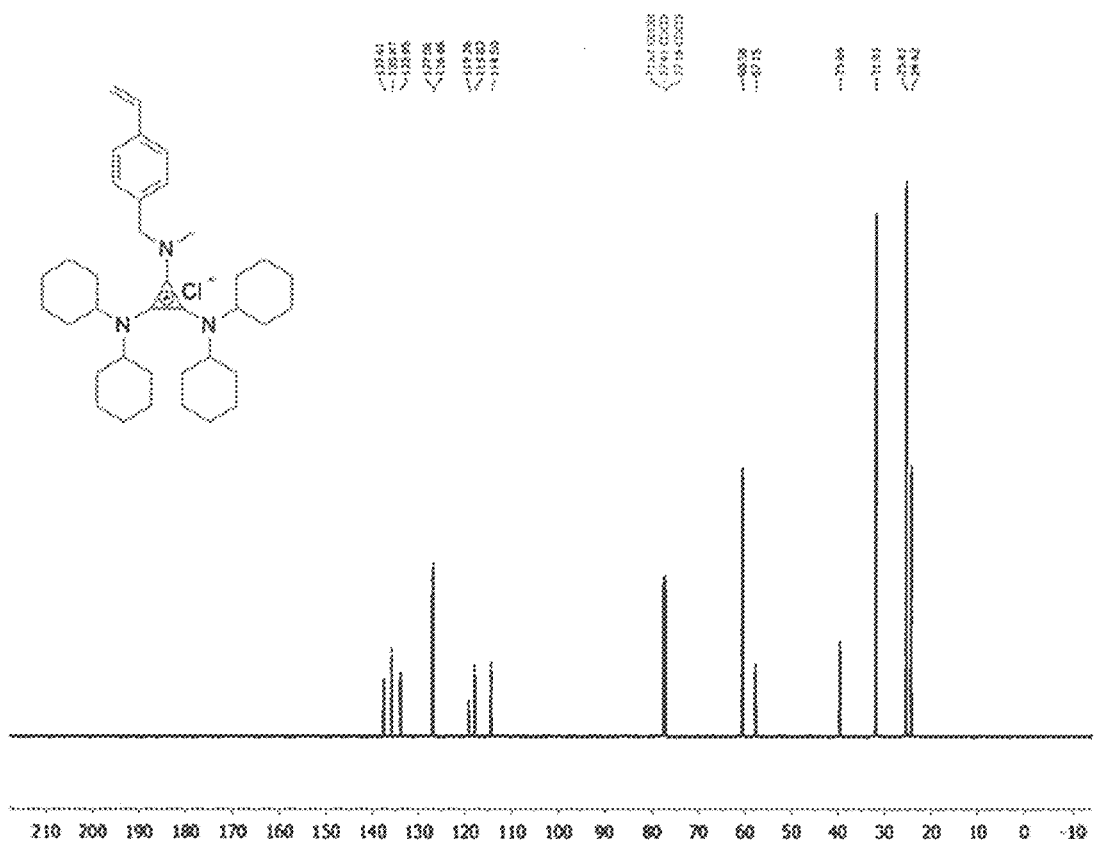
FIG. 14 shows a representative $^{13}$C NMR spectrum of N-methyl-1-(2,3-bis(dicyclohexylamino)cyclopropenium)-4-vinylbenzylamine chloride (CPCy).
Figure 15:
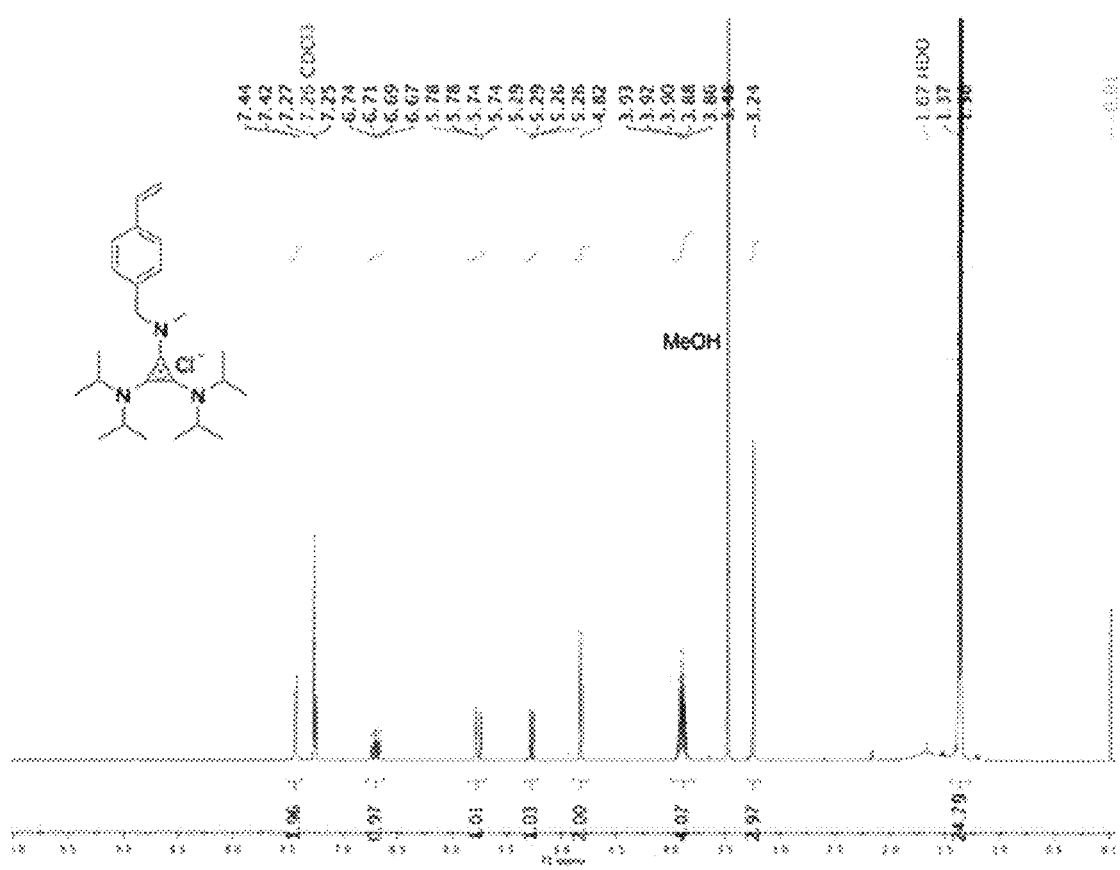
FIG. 15 shows a representative $^1$H NMR spectrum of N-methyl-1-(2,3-bis(diisopropylamino)cyclopropenium)-4-vinylbenzylamine chloride (CPiP).
Figure 16:
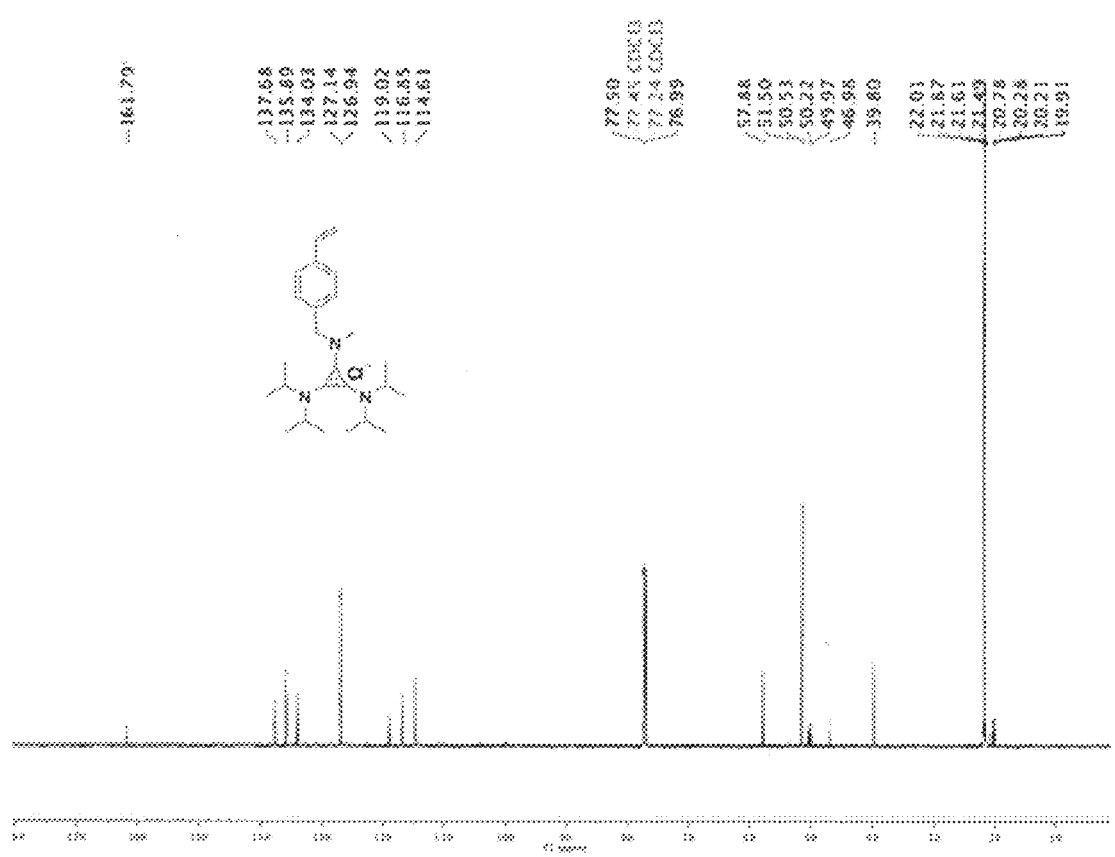
FIG. 16 shows a representative $^{13}$C NMR spectrum of N-methyl-1-(2,3-bis(diisopropylamino)cyclopropenium)-4-vinylbenzylamine chloride (CPiP).
Figure 17:
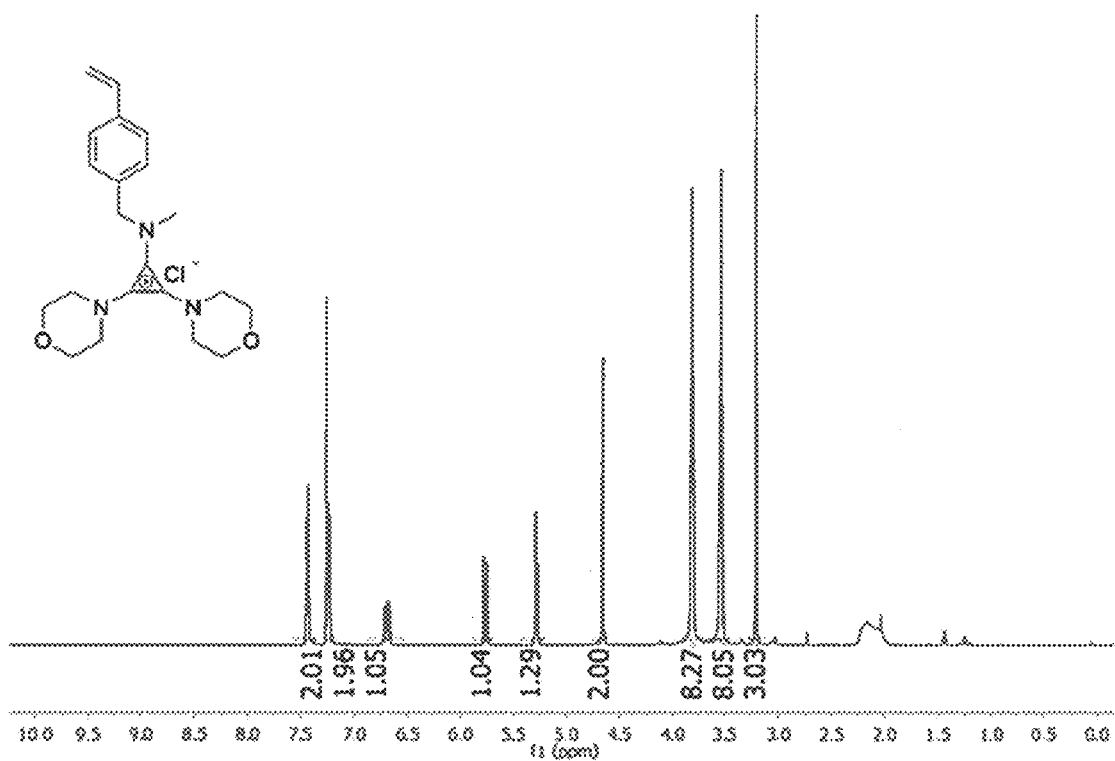
FIG. 17 shows a representative $^1$H NMR spectrum of N-methyl-1-(2,3-bis(morpholino)cyclopropenium)-4-vinylbenzylamine chloride (CPMo).
Figure 18:
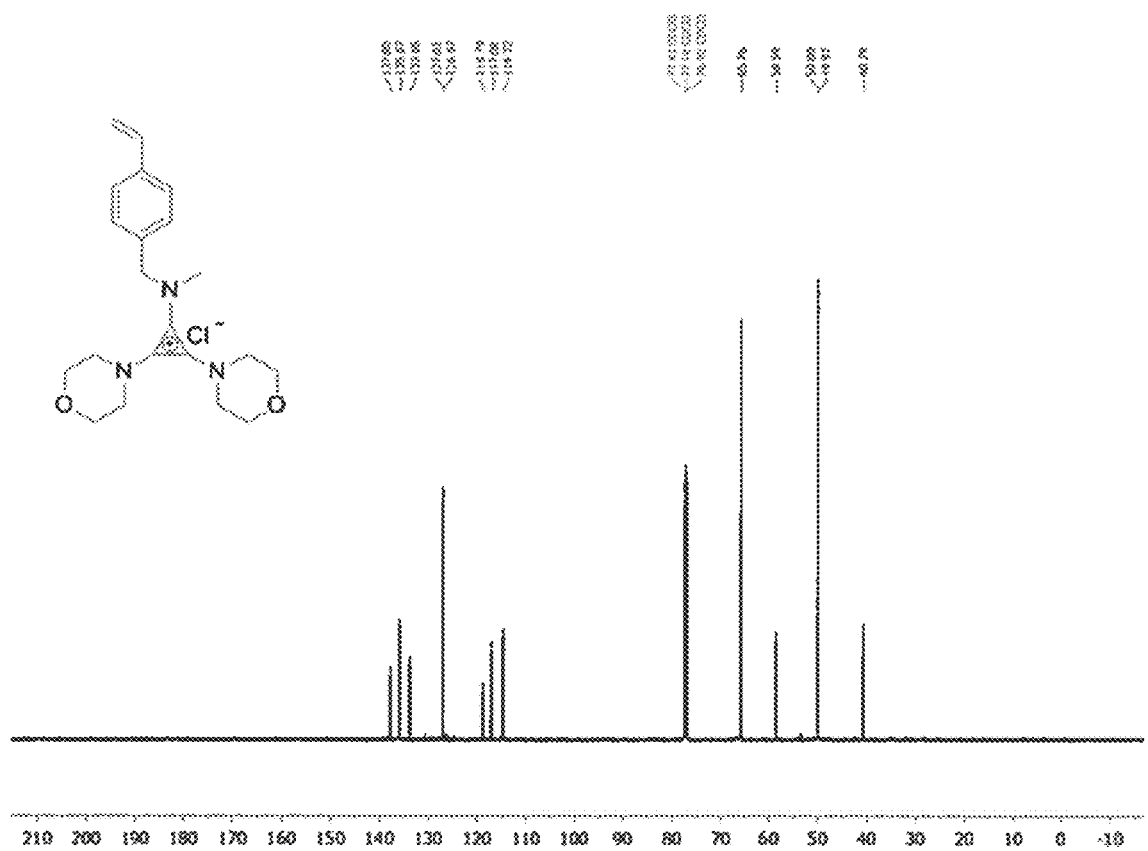
FIG. 18 shows a representative $^{13}$C NMR spectrum of N-methyl-1-(2,3-bis(morpholino)cyclopropenium)-4-vinylbenzylamine chloride (CPMo).

Ion conductivity experiments were performed on PS-b-PCPiP(20) using electrochemical impedance spectroscopy. As conductivity is closely related to morphology, SAXS experiments were complemented with transmission electron microscopy (TEM). A PS-b-PCPiP(20) sample (drop cast, no annealing) was microtomed and imaged by TEM (FIG. 11a,b). Even without staining, microphase segregation (cylindrical morphology) was clearly observed (FIG. 12). Staining with RuO$_4$ vapor for 2 min preferentially stains the cationic block and helps to visualize the internal structure. The electron micrographs obtained (FIG. 11a,b) show hexagonally packed cylinders in different orientations. The domain spacing by TEM was 29 nm, which is consistent with the domain spacing determined by SAXS (31 nm; see Table 3). The lighter color of the cylinders with respect to the matrix in FIG. 11a,b indicates that PS cylinders are embedded in a PCPiP matrix. The stained PCPiP block scatters more electrons, and therefore appears darker by TEM (see FIG. 12). The non-functionalized PS cylinders in FIG. 11a,b occupy a very large fraction of the image because the mole fraction of the functional block in this polymer is only 20%. The continuous nature of the conducting phase matrix observed in charged diblock copolymers is expected to facilitate ion transport (Alexander et al. 2010), and is consistent with the ideal percolating structure found by computational modeling (Sing et al. 2014).

The in-plane conductivity, σ, of PS-b-PCPiP(20) equilibrated in humid air with 90% relative humidity (RH) was measured as a function of increasing temperature from 25 to 65° C. (FIG. 11c). To ensure equilibration, samples were initially annealed for 1 week at 90% RH at 25° C. and for 48 h at each subsequent temperature of interest. The straight line in FIG. 11c is the least-squares fit through the equilibrated conductivity data at each temperature value.

In principle, the change in conductivity with temperature, shown in FIG. 11c, could either be due to changes in the mobility of chloride ions or to a change in ion concentration in the membrane. The fact that ion concentration in the membranes is constant indicates that the slope of the line provides an estimate of the activation energy for transport of chloride ions through the membrane (Arrhenius law). The estimated activation energy for this system is 25 kJ mol$^{-1}$. This value is comparable to that reported previously for the imidazolium-containing diblock copolymer analogue in water, poly(styrene-b-4-vinylbenzyltri-methyl imidazolium chloride) (PS-b-PIm(35)), 27 kJ mol$^{-1}$ (Sudre et al. 2013). However, at room temperature, the conductivity of the PS-b-PCPiP (20) polymer (ion-exchange capacity, IEC=1.3 meq g$^{-1}$) is rather high, 0.004 S cm$^{-1}$, considering the low water uptake, $\lambda_w$=7, of this membrane ($\lambda_w$ is the number of water molecules per chloride ion in the membrane). This value of $\lambda_w$ is four times lower than the value obtained for PS-b-PIm(35) immersed in water, for the same conductivity $\lambda_w$=30, σ=0.004 S cm$^{-1}$), and higher IEC (2.1 meq g$^{-1}$) (Sudre et al. 2013). These results indicate that the CP-based polyelectrolytes of the present invention conduct ions more effectively than the optimized membranes from imidazolium-containing polymers, with a minimum amount of water present. Further tuning of the functional groups, backbone structure and morphology is expected to result in polyelectrolytes with exceptionally high ion conductivities (Schmidt-Rohr et al. 2008, Choi et al. 2013, Hoarfrost et al. 2012, Ye et al. 2012).

In conclusion, a new family of electron-rich cationic polyelectrolytes based on the CP ion building block was discovered. The robust, efficient and orthogonal chemistry to synthesize the monomers provides facile access to a variety of polymers by RAFT and to well-defined cationic nanoparticles by surfactant-free emulsion polymerization. The nanoparticles exhibit high charge density on the surface and stability over a wide range of pH values. The family of linear polymers is characterized by widely variable physical properties, which are highly dependent on the amino substituents flanking the aromatic cation. Through TEM and SAXS measurements, we observed microphase segregation in bulk samples of the BCPE. In diblock copolymers, the domain spacing increased with increasing styrene content (the length of the functional block was fixed). Compared with imidazolium analogues, CP-based BCPEs show superior properties as ion conductive materials, and further optimization should lead to improved performance. Future studies will be aimed at probing the structure-property relationships of these materials by expanding our PCPR library through adjustment of the polymer backbone, modular functional groups, block copolymer composition and CP counterion. Moreover, other CPR monomers will be incorporated into nanoparticles via the one-pot emulsion polymerization to assess their efficacy in various biomedical applications and membrane technologies. With such modularity, this new class of CP-based polyelectrolytes offers a wealth of functionality that translates to significant potential across a broad array of applications.

Example 11

Material and Methods for Examples 8-10

Materials and Reactions

All materials were purchased from Sigma Aldrich and were used without further purification except as noted below. Methylene chloride (CH$_2$Cl$_2$), tetrahydrofuran (THF), and N,N-dimethylformamide (DMF) were dried using a J.C. Meyer solvent purification system. Styrene was filtered through basic alumina to remove radical inhibitor before use in polymerizations. Deuterated solvents for NMR were purchased from Cambridge Isotope Laboratories, Inc. Eluents for column chromatography were HPLC grade and purchased from Fisher Scientific.

All reactions were performed open to the atmosphere, unless otherwise noted. Organic solutions were concentrated by use of a Buchi rotary evaporator. All polymerizations were carried out with temperature control under vacuum in flame-sealed ampoules. Chemical shifts are given in ppm relative to the signal from residual non-deuterated solvent. $^1$H-NMR and $^{13}$C-NMR spectra were recorded in CDCl$_3$ (except where noted) on Bruker DRX-300, DRX-400 or DRX-500 spectrometers. Data for $^1$H NMR are reported as follows: chemical shift (δ ppm), multiplicity (s=singlet, br s=broad singlet, d=doublet, t=triplet, dd=doublet of doublets, dt=doublet of triplets, q=quartet, hept=heptet, m=multiplet), coupling constant (Hz), integration, and assignment. Data for $^{13}$C are reported in terms of chemical shift. High-resolution mass spectra were obtained from the Columbia University Mass Spectrometry Facility on a JEOL JMSHX110 HF mass spectrometer using FAB+ ionization mode. Low-resolution mass spectrometry (LRMS) was performed on a JEOL JMS-LCmate liquid chromatography spectrometer system using APCI+ ionization technique.

Thin layer chromatography (TLC) was performed using Teledyne Silica gel 60 F254 plates and viewed under UV light. Flash column chromatography was performed using Teledyne Ultra Pure Silica Gel (230-400 mesh) on a Teledyne Isco Combiflash Rf.

Size Exclusion Chromatography (SEC)

PCPMo was characterized to quantify its molecular mass dispersity (Đ) on a Waters Alliance 2695 separation module equipped with a PL-aquagel-OH 8 micron Mixed-M column (300×7.5 mm), a Waters 2998 Photodiode Array Detector, and a Waters 2414 Refractrometer Detector. Sodium acetate buffer (0.3 M) with 20 vol % methanol was used as the eluent at a flow rate of 0.7 mL min$^{-1}$. Poly(ethylene glycol) standards were used for calibration.

Thermogravimetric Analysis (TGA)

Thermogravimetric analysis was performed on a Perkin-Elmer Pyris 1 TGA from ambient temperature to 600° C. at a rate of 10° C. min$^{-1}$. Polymer samples were dried under high vacuum overnight prior to measurement, and decomposition temperatures were recorded at 5% mass loss.

Differential Scanning Calorimetry (DSC)

Differential Scanning Calorimetry (DSC) was performed on a TA Instruments DSC Q2000 fitted with a RCS90 refrigerated cooling system to determine the glass transition temperatures. DSC measurements were taken at a sampling rate of 10° C. min$^{-1}$ in the temperature range of 0° C. to 200° C.

Dynamic Light Scattering (DLS)

Particle size, polydispersity, and electrophoretic mobility were measured using a Möbiuζ dynamic light scattering instrument and Dynamics software from Wyatt Technology (Santa Barbara, Calif.). Particle size and polydispersity were calculated via the Regularization fit of the correlation function of the Quasi-elastic Light Scattering (QELS) data. Each measurement contained 10 acquisitions and at least 3 measurements were performed. The reported radii or diameters are the average of those measurements. Zeta potential was calculated according to the Smoluchowski approximation and reported values are the averaged result of 5 acquisitions from each of the 31 detectors in the Massively Parallel Phase Amplitude Light Scattering (MP-PALS) detector array. Measurements were run in MilliQ water at neutral pH unless otherwise noted. Samples were passed through a 1.6 μm glass filter (Whatman) prior to measurement to remove only large aggregates and dust.

Scanning Electron Microscopy (SEM)

Scanning electron microscopy (SEM) was performed on a JEOL7001 FLV at 3.0 to 10.0 keV. Particles were deposited on a silica wafer from solution, and imaged without sputter coating. Particle sizes measured by SEM were determined using ImageJ software by manually counting at least 50 particles.

Quantification of Water Uptake

Water uptake of the polymer membrane was measured in a humidity-controlled environmental chamber (Espec). A small piece of water-equilibrated membrane was placed in a quartz pan which was hooked on the end of a quartz spring (Deerslayer) in the humidity chamber. The membrane was equilibrated at room temperature at 90% relative humidity for 48 hr. The mass of the hydrated film was obtained by measuring spring length through a port on the wall of the humidity chamber by a cathetometer equipped with an optical zoom telescope located outside the chamber. Care was taken to minimize the time when the port was opened (typically 10 s). The spring was calibrated with standard masses at experimental temperature and relative humidity in the chamber before use (spring constant was about 0.5 mN mm$^{-1}$). Dry mass of humid air-equilibrated membrane was measured following the same procedure as described above. The degree of hydration, $\lambda_w$, defined as the moles of water per mole of cationic groups in the membrane, is calculated using equation (1):

$$\lambda_W = \frac{[H_2O]}{[CP]} = \frac{\text{hydrated film weight} - \text{dry film weight}}{\text{dry film weight}} \times \frac{M_{CP} + (x_{CP}^{-1} - 1)M_S}{M_W} \quad (1)$$

where the molar mass of water and of the styrene (S) and cyclopropenium (CP) monomers are $M_W$=18.02 g mol$^{-1}$, $M_S$=104.15 g mol$^{-1}$ and $M_{CP}$=419 g mol$^{-1}$.

Small-Angle X-Ray Scattering

Thick polymer samples (1 nun) were prepared by pressing the powder into a teflon washer. Synchrotron SAXS measurements were performed using the 7.3.3 beamline at the Advanced Light Source (ALS, Lawrence Berkeley National Laboratory). The wavelength 2λ of the incident X-ray beam was 0.124 nm (Δλ/λ=10$^{-4}$) and a sample-to-detector distance of 4 m. The resulting two-dimensional scattering data were averaged azimuthally to obtain intensity versus magnitude of the scattering wave vector q (q=4π sin(θ/2)/λ, where θ is the scattering angle). All of the scattering profiles were azimuthally symmetric. The scattering data were corrected for the detector dark current and the scattering from air and Kapton windows. In-plane chloride conductivity of hydrated membranes with dimensions 2 cm×1 cm×450 μm was measured by AC impedance spectroscopy using platinum electrodes in the standard four probe configuration using a BekkTech sample clamp.

Electrochemical Impedance Spectroscopy

Polymer films of PS-b-PCPiP(20) were prepared by drop casting a 100 mg ml$^{-1}$ solution of polymer onto a clean Teflon substrate. In-plane chloride conductivity of a hydrated membrane composed of PS-b-PCP1P(20) (calculated molecular mass=31 KDa, DP=174) with dimensions 2 cm×1 cm×450 μm was measured by AC impedance spectroscopy using platinum electrodes in the standard four probe configuration using a BekkTech sample clamp. Conductivities were collected under humidified conditions, and temperature and RH were controlled by an environmental chamber (Qualitest). Data were collected using 10 mV amplitude over a frequency range of 1 Hz-10 MHz. Separate experiments were conducted to ensure that the response of the sample was linear in this window. Samples were annealed at the temperature of interest for 24-48 h until the measured impedance did not change. Conductivity, σ, is given by equation (1):

$$\sigma = w/rS$$

where S is the cross-sectional area of sample film, r is the intercept of the Nyquist semi-circle on the real axis (Ω) and w is the distance between the inner platinum electrodes.

Transmission Electron Microscopy

Films of PS-b-PCP1P(20) (calculated molecular mass=33.4 KDa, DP=200) were prepared by drop casting a 100 mg ml$^{-1}$ solution of polymer onto a clean Teflon substrate. After allowing to dry for 24 h, the film was sectioned with Leica UltraCut 6 ultramicrotome at −40° C., nominal thickness 70 nm using a Diatome Cryo 35° diamond knife. Sections were placed on 300 mesh copper grids with homemade lacey carbon film on top. The sections were stained with RuO$_4$ vapor for 2 min, which preferentially stained the PCPiP block. Sections were imaged with FEI Tecnai F20 TEM operated at 200 kV. Images were analysed using ImageJ 1.48v software.

Example 12

Alternative Synthesis Pathways

Synthesis of N-methyl-1-(2,3-bis(dicyclohexylamino)cyclopropenium)-4-vinylbenzylamine chloride (CPCy)

To a dry round bottom flask of 2,3-bis(di-cyclohexylamino)-1-chlorocyclopropenium chloride (22.1 g, 47.3 mmol, 1.0 equiv) under argon was added CH$_2$Cl$_2$ (150 ml) and triethylamine (6.54 ml, 47.3 mmol, 1.0 equiv). N-Methyl-4-vinylbenzylamine (7.74 g, 47.3 mmol and 1.0 equiv) was then slowly added to the solution and the reaction was stirred overnight. CH$_2$Cl$_2$ (700 ml) was added and the mixture was washed with 1 M HCl (3×200 ml) and brine (1×200 ml), dried with anhydrous sodium sulfate and concentrated in vacuo to yield a crude solid. The crude product was purified with silica gel chromatography (EtOAc then 5% iPrOH in CH$_2$Cl$_2$) to yield an off-white solid (23.5 g, 40.6 mmol, 86% yield). Monomers were characterized by $^1$H and $^{13}$C NMR (see FIGS. 13-18), and all new compounds were characterized by NMR and mass spectrometry.

Sample Synthesis of PCPR: Synthesis of PCPCy

Figure 19:
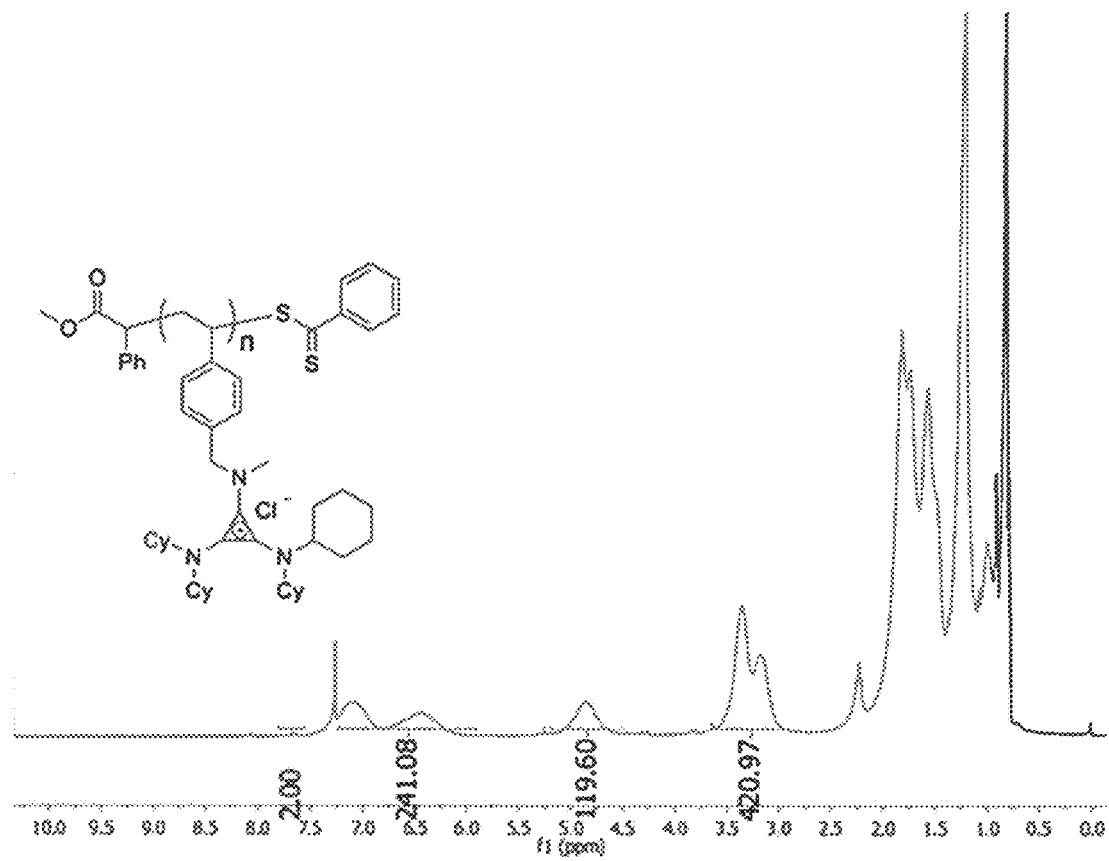
FIG. 19 shows a representative $^1$H NMR spectrum of PCPCy.
Figure 20:
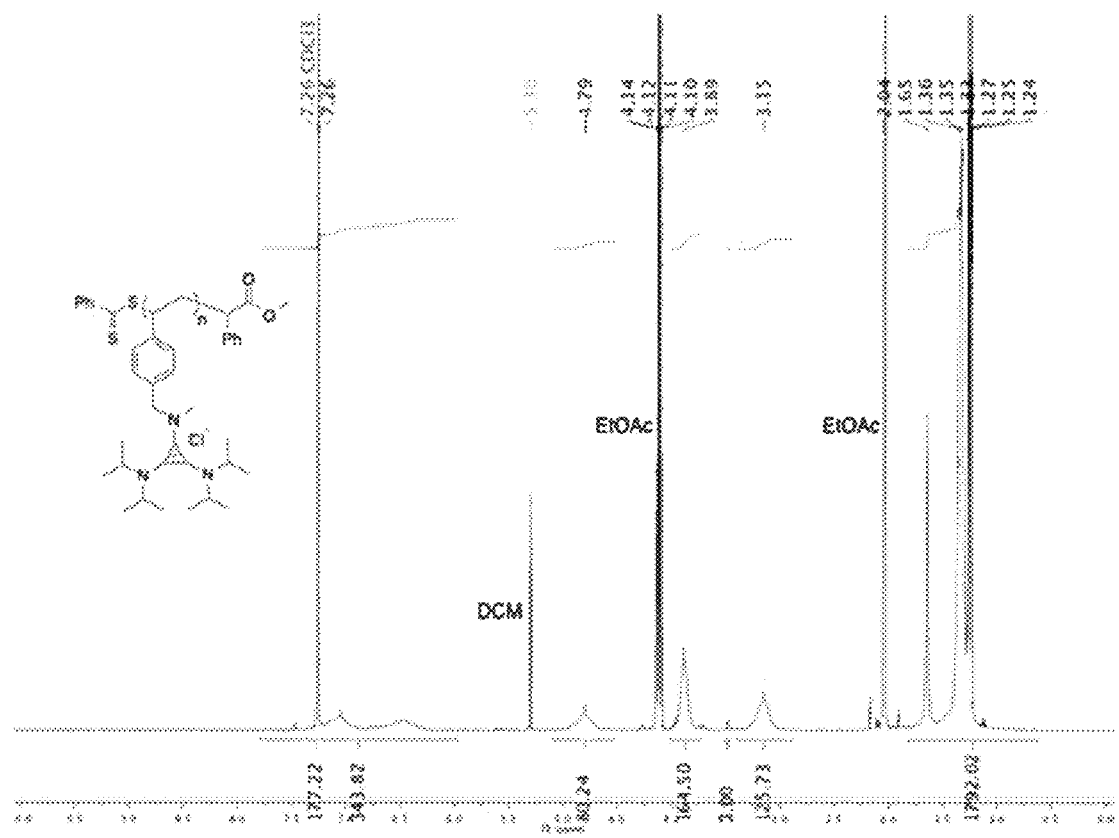
FIG. 20 shows a representative $^1$H NMR spectrum of PCPiP.
Figure 21:
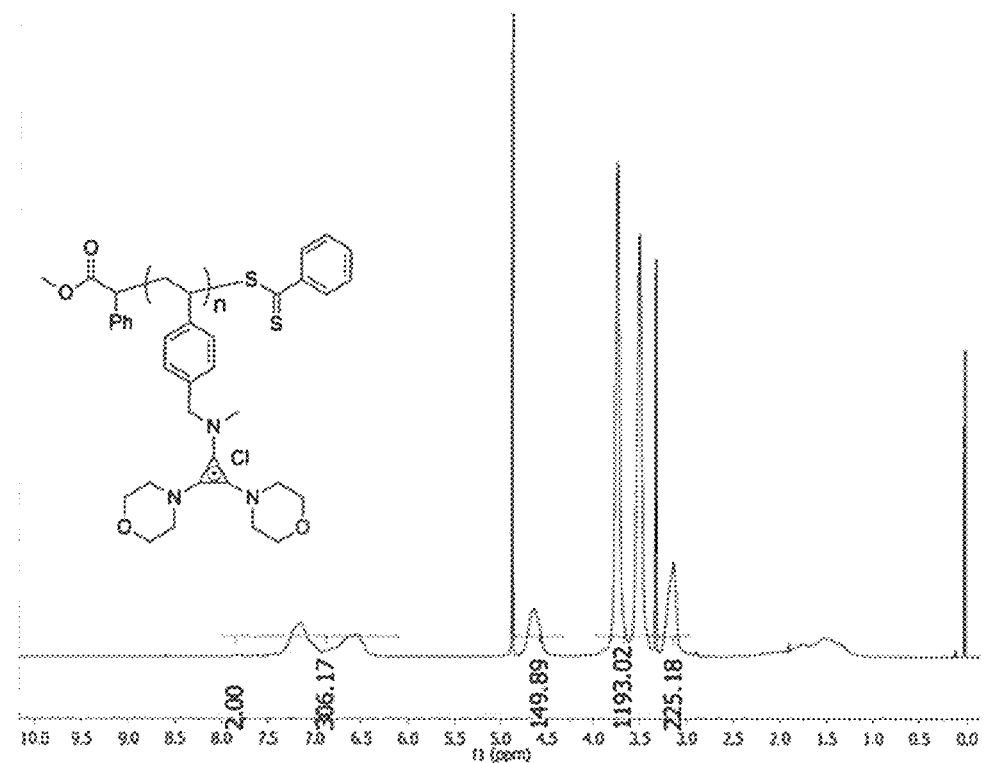
FIG. 21 shows a representative $^1$H NMR spectrum of PCPMo.

To a dry 20 ml scintillation vial, CPCy (6.0 g, 10.4 mmol, 60.0 equiv), methyl 2-(phenylcarbonothioylthio)-2-phenylacetate (52.3 mg, 1.73 mmol, 1.0 equiv), AIBN (4.3 mg, 0.26 mmol, 0.15 equiv) and DMF (6.0 ml) were added and vortexed to form a homogenous solution. This solution was transferred to a flame-dried ampule. After 4 freeze-pump-thaw cycles, the ampule was sealed under vacuum. The polymerization was run for 12 h at 80° C. with vigorous stirring. The reaction mixture was precipitated from CH$_2$Cl$_2$ into 1,4-dioxane three times to remove monomer. The polymer was then precipitated an additional three times into hexanes to remove residual 1,4-dioxane. Drying in vacuo yielded the pure polymer as a pink powder (5.3 g, 86% yield). Homopolymers were characterized by $^1$H NMR (see FIGS. 19-21).

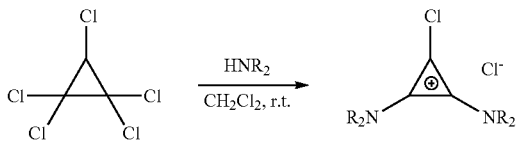

Synthesis of 2,3-bis(dicyclohexylamino)-1-chlorocyclopropenium chloride

Dicyclohexylamine (168 mL, 804.8 mmol, 6.0 equiv) was slowly added to a solution of pentachlorocyclopropane (Tobey et al. 1966) (30.0 g, 140.0 mmol, 1.0 equiv) in CH$_2$Cl$_2$ (1500 mL) in a 3 L round bottom flask. A white precipitate formed as the reaction mixture was stirred for a further 48 hr at room temperature. The solution was washed with 1M HCl (3×500 mL), dried with anhydrous sodium sulfate, and concentrated in vacuo to yield an off-white solid. This solid was triturated with hot ethyl acetate to give the title product (60 g, 130 mmol, 92%). $^1$H NMR (500 MHz, CDCl$_3$) b 3.75 (m, 2H, NCyH), 3.40 (m, 2H, NCyH), 1.10-2.20 (m, 40H, CyH). $^{13}$C NMR (125 MHz, CDCl$_3$) δ 131.6, 93.1, 65.2, 56.3, 32.1, 30.2, 24.9, 24.7, 24.0, 23.8. HRMS (FAB+) m/z=431.3418 calcd for C$_{27}$H$_{44}$N$_2$Cl [M]$^+$ 431.32.

Synthesis of 2,3-bis(diisopropylamino)-1-chlorocyclopropenium chloride

Pentachlorocyclopropane (5.20 g, 22.8 mmol, 1.0 equiv) was added to 230 mL of CH$_2$Cl$_2$ in a 500 mL dry round bottom flask equipped with a stir bar. To this solution, diisopropylamine (18.48 g, 182.6 mmol, 8.0 equiv) was slowly added and allowed to stir under argon at room temperature overnight. Solvent was removed from the reaction mixture leaving a crude, brown sandy-looking mixture of the desired product in quantitative yield and 3-4 equivalents of the corresponding ammonium salt. This crude mixture was used in subsequent steps without further purification. $^1$H NMR (400 MHz, CDCl$_3$) δ 4.28 (hept, J=6.7 Hz, 2H, C$_3$(NCH(CH$_3$)$_2$CH(CH$_3$)$_2$)$_2$), 3.89 (hept, J=6.8 Hz, 2H, C$_3$(NCH(CH$_3$)$_2$CH(CH$_3$)$_2$)$_2$), 1.45 (m, 24H, C$_3$(N(CH(CH$_3$)$_2$)$_2$)$_2$). $^{13}$C NMR (125 MHz, CDCl$_3$) δ 132.0, 117.8, 93.3, 58.1, 48.6, 47.1, 22.6, 21.8, 20.9, 18.9.

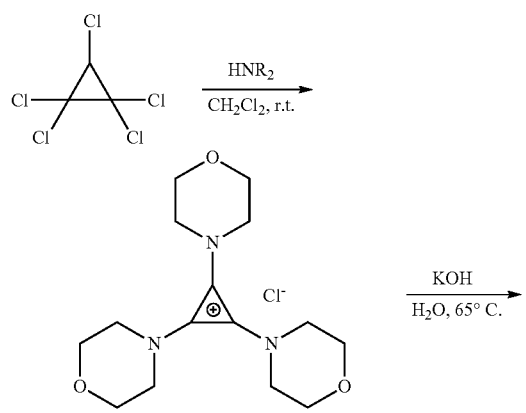

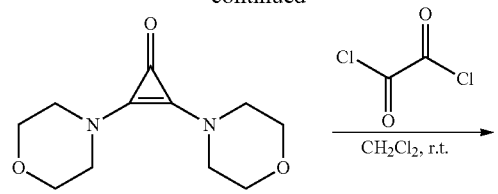

Synthesis of 2,3-bis(morpholino)-1-cyclopropenone

Morpholine (58.0 g, 665.7 mmol, 7.1 equiv) was slowly added to a solution of pentachlorocyclopropane (20.0 g, 93.3 mmol, 1.0 equiv) in CH$_2$Cl$_2$ (250 mL) in a 500 mL round bottom flask. The solution turned orange, and a white precipitate formed as the reaction mixture was stirred overnight at room temperature. The white solid was filtered off and the filtrate was concentrated in vacuo to a crude red solid. Water (100 mL) was used to dissolve this solid. A room temperature solution of potassium hydroxide (20 g, 356.4 mmol) in water (30 mL) was added to the solution, which was heated to 65° C. for one hr. The reaction solution was allowed to cool and water was then removed by rotary evaporation. The resulting solid was washed with CH$_2$Cl$_2$ (500 mL) and any remaining solid was filtered off. The organic solution was dried with anhydrous sodium sulfate and concentrated in vacuo to yield a crude orange solid. The crude material was purified by silica gel chromatography (10% MeOH in EtOAc) to yield the title product as an off-white solid (8.9 g, 39.7 mmol, 42% two-step yield). Note: the temperature of the rotovap was kept at 30° C. or cooler, and extended exposure to methanol will decompose the title product. $^1$H NMR (400 MHz, CDCl$_3$) δ 3.73 (m, 8H, NCH$_2$CH$_2$O), 3.34 (m, 8H, NCH$_2$CH$_2$O). $^{13}$C NMR (125 MHz, CDCl$_3$) δ 134.8, 120.3, 66.1, 49.3. HRMS (FAB+) m/z=225.1243 calcd for C$_{11}$H$_{17}$N$_2$O$_3$ [M]$^+$ 225.12.

Synthesis of 2,3-bis(morpholino)-1-chlorocyclopropenium chloride

Oxalyl chloride (6.86 mL, 79.4 mmol, 2.0 equiv) was slowly added to a 0° C. solution of 2,3-bis(morpholino)-1-cyclopropenone (8.9 g, 39.7 mmol, 1.0 equiv) in CH$_2$Cl$_2$ (250 mL) under argon. The solution was warmed to room temperature and left to react for one hr. The product was dried in vacuo to yield a sufficiently pure black solid in quantitative yield (11.0 g, 39.7 mmol). $^1$H NMR (400 MHz, CDCl$_3$) δ 4.05 (m, 4H, N(HCH—CHH)$_2$O), 3.90 (dt, J=20.2, 4.5 Hz, 8H, N(HCH—CHH)$_2$O) 3.66 (m, 4H, N(HCH—CHH)$_2$O).

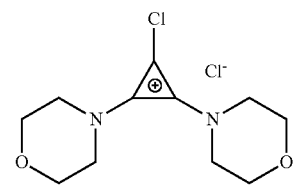

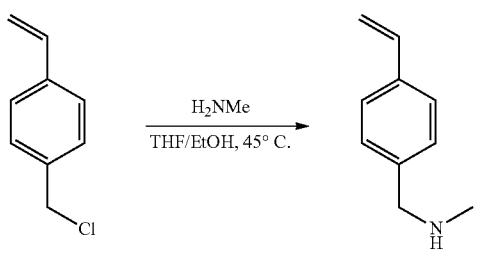

Synthesis of N-methyl-4-vinylbenzylamine

Vinylbenzyl chloride (7.5 g, 49.3 mmol, 1 equiv) was added to a 1 L round bottom flask equipped with a stir bar. Methylamine solution (8.0M in ethanol, 101.1 mL, 15 equiv) was added to the sealed flask, and an outlet was used to relieve pressure. THF (330 mL) was added to dilute the reaction mixture such that the concentration of vinylbenzyl chloride was 0.10M. The flask was filled with argon and sealed with a septum secured with copper wire. The contents of the reaction flask were allowed to stir at 45° C. for 24 hr. Solvent was subsequently removed by rotary evaporation, and the crude product was dissolved in 250 mL of $CH_2Cl_2$ and transferred to a 1 L separatory funnel. This solution was washed 3× with 1.0M NaOH, 1× with DI water, and 1× with brine, and dried over magnesium sulfate. Removal of solvent by rotary evaporation yielded the title product as yellow oil. $^1$H NMR was used to determine purity. (6.82 g, 46.4 mmol, 94% yield, 90% purity). The oil was stored at 0° C. and was used without further purification. $^1$H NMR (400 MHz, $CDCl_3$) δ 7.33 (m, 4H, ArH), 6.71 (dd, J=17.6, 10.9 Hz, 1H, $H_2C$=CHAr), 5.73 (dd, J=17.6, 1.0 Hz, 1H, $H_2C$=CHAr), 5.21 (dd, J=10.9, 2.3 Hz, 1H, $H_2C$=CHAr), 3.73 (s, 2H, $ArCH_2N$), 2.45 (s, 3H, $NCH_3$).

Procedures for Synthesis of CPR Monomers

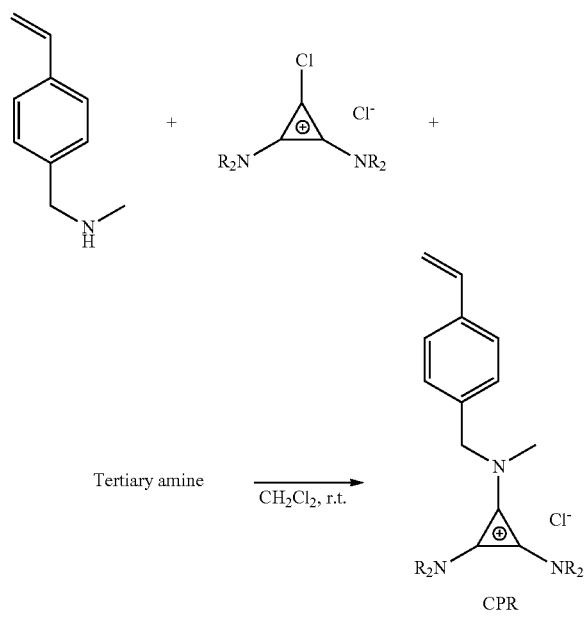

Characterization of N-methyl-1-(2,3-bis(dicyclohexylamino)cyclopropenium)-4-vinylbenzylamine chloride (CPCy)

$^1$H NMR (500 MHz, $CDCl_3$) δ 7.33 (m, 4H, ArH), 6.69 (dd, J=17.7, 10.9 Hz, 1H, $H_2C$=CHAr), 5.74 (d, J=17.6 Hz, 1H, $H_2C$=CHAr), 5.25 (d, J=11.0 Hz, 1H, $H_2C$=CHAr), 4.80 (s, 2H, $ArCH_2N$), 3.35 (m, 4H, NCyH), 3.22 (s, 3H, $NCH_3$), 1.00-1.90 (m, 40H, CyH). $^{13}$C NMR (125 MHz, $CDCl_3$) δ 137.4, 135.6, 133.6, 126.8, 126.6, 119.0, 117.8, 114.3, 60.3, 57.5, 39.4, 31.7, 25.2, 24.2. HRMS (FAB+) m/z=542.4333 calcd for $C_{37}H_{56}N_3[M]^+$ 542.45.

Synthesis of N-methyl-1-(2,3-bis(diisopropylamino) cyclopropenium)-4-vinylbenzylamine chloride (CPiP)

In a 1 L round bottom flask equipped with stir bar, 2,3-bis(diisopropylamino)-1-chlorocyclopropenium chloride (26.23 g crude mixture, 38.0 mmol CP salt, 1.0 equiv) and triethylamine (11.5 g, 114.0 mmol, 3.0 equiv) were dissolved in 420 mL of $CH_2Cl_2$ and put under an atmosphere of argon. N-Methyl-4-vinylbenzylamine (5.59 g, 38.0 mmol, 1.0 equiv) was slowly added to the solution, which was stirred for 15 hr. The reaction mixture was poured into a 1 L separatory funnel and washed with 1M HCl (3×200 mL), then DI water (1×200 mL), followed by brine (1×200 mL). The organic layer was collected and dried over magnesium sulfate. Rotary evaporation yielded 20.0 g of a dark brown viscous liquid. This crude product was purified by silica gel chromatography, eluted first with 100% EtOAc, followed by a mixture of 5% increasing to 20% MeOH in $CH_2Cl_2$. Collection of pure fractions, followed by removal of solvent by rotary evaporation yielded an amber oil (13.97 g, 33.3 mmol, 88% yield) $^1$H NMR (400 MHz, $CDCl_3$) δ 7.44 (m, 2H, ArH), 7.25 (m, 2H, ArH), 6.69 (dd, J=17.6, 10.9 Hz, 1H, $H_2C$=CHAr), 5.78 (dd, J=17.6, 0.8 Hz, 1H, $H_2C$=CHAr), 5.29 (dd, J=10.9, 0.8 Hz, 1H $H_2C$=CHAr), 4.82 (s, 2H, $ArCH_2N$), 3.90 (hept, 4H, $C_3NCH(Me)_2$), 3.24 (s, 3H, $NCH_3$), 1.00-1.90 (m, 24H, $NCH(CH_3)_2$). $^{13}$C NMR (125 MHz, $CDCl_3$) δ 137.7, 135.9, 134.0, 127.1, 126.9, 119.0, 116.9, 114.6, 57.9, 51.5, 39.8, 22.01. HRMS (FAB+) m/z=382.3241 calcd for $C_{25}H_{40}N_3[M]^+$ 382.32.

Synthesis of N-methyl-1-(2,3-Bis(morpholino)cyclopropenium)-4-vinylbenzylamine chloride (CPMo)

To a dry round bottom flask of 2,3-bis(morpholino)-1-chlorocyclopropenium chloride (11.08 g, 39.7 mmol, 1.0 equiv) under argon was added $CH_2Cl_2$ (150 mL) and N,N-diethylmethylamine (5.3 mL, 43.7 mmol, 1.1 equiv). N-Methyl-4-vinylbenzylamine (5.3 g, 35.7 mmol, 0.9 equiv) was then slowly added to solution, and the reaction was left overnight. The crude product was concentrated in vacuo and dissolved in 250 mL of $CHCl_3$:iPrOH (2:1). The solution was extracted with water (2×100 mL), dried with anhydrous sodium sulfate, and concentrated in vacuo to yield a crude solid. A portion of the product is lost in the aqueous wash. The crude product was purified with silica gel chromatography (20% MeOH in $CH_2Cl_2$) to yield a dark solid (10.0 g, 25.6 mmol, 59% yield). $^1$H NMR (500 MHz, $CDCl_3$) δ 7.44 (m, 2H, ArH), 7.24 (m, 2H, ArH), 6.70 (dd, J=17.7, 11.0 Hz, 1H, $H_2C$=CHAr), 5.76 (dd, J=17.9, 1.7 Hz, 2H, $H_2C$=CHAr), 5.28 (dd, J=10.9, 1.5 Hz, 2H, $H_2C$=CHAr), 4.65 (s, 2H, $ArCH_2N$), 3.81 (m, 8H, $NCH_2CH_2O$), 3.54 (m, 8H, $NCH_2CH_2O$), 3.21 (s, 3H, $NCH_3$). $^{13}$C NMR (125 MHz, CDCl$_3$) δ 137.8, 135.9, 133.8, 127.0, 127.0, 118.8, 117.1, 114.7, 65.8, 58.6, 50.0, 40.8. HRMS (FAB+) m/z=354.2171 calcd for C$_{21}$H$_{28}$N$_3$O$_2$ [M]$^+$ 354.22.

Procedures for RAFT Homopolymerizations of PCPR

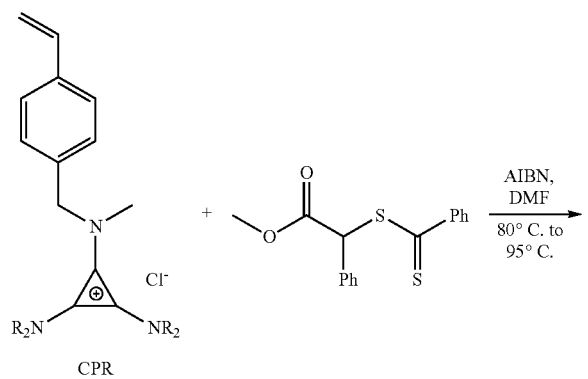

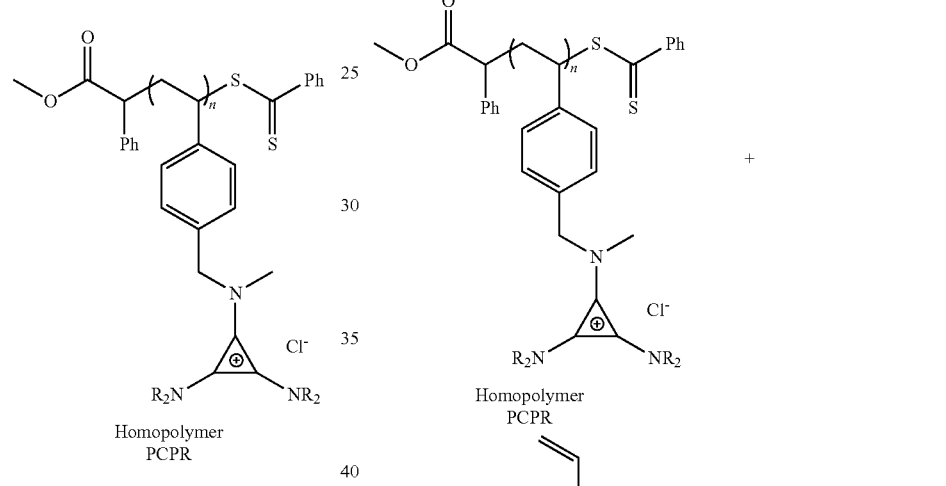

Characterization of PCPCy
$^1$H NMR (500 MHz, CDCl$_3$) δ 7.76-7.60 (b, 2H, —SC(ArH)S—), 7.51-6.00 (b, 240H, ArH), 5.17-4.58 (b, 120H, ArCH$_2$N), 3.61-2.94 (b, 420H, NCyH, NCH$_3$), 2.05-0.75 (b, 2580H, CyH, ArCHCH$_2$).

Synthesis of PCPiP. CPiP (3.5 g, 83.1 mmol, 50.0 equiv), MCPDB (50.2 mg, 1.66 mmol, 1.0 equiv), AIBN (0.54 mg, 0.033 mmol, 0.20 equiv), and N,N-dimethylformamide (DMF) (0.60 mL) were added to a flame seal ampoule and vortexed to form a homogenous solution. A stir bar was added to the ampoule, and after 4 freeze-pump-thaw cycles to remove oxygen, the ampoule was sealed under vacuum. The polymerization was run for 2 hr 15 min at 100° C. The reaction mixture was precipitated from CH$_2$Cl$_2$ into −78° C. ethyl acetate 5 times to remove monomer. Drying in vacuo yielded the polymer as a pink powder (2.45 g, 70% yield). Alternatively, the reaction mixture could be transferred to a 3.5 k MWCO Spectrum labs dialysis bag to dialyze for 24 hr in 1 L of water. $^1$H NMR (500 MHz, CDCl$_3$) δ 7.06-6.45 (b, 166H, ArH), 4.98-4.65 (b, 80H, ArCH$_2$N), 3.98-3.79 (b, 165H, C$_3$NCH (iPr)$_2$), 3.48 (s, 3H, OCH$_3$), 1.67-1.27 (b, 1700H, iPrH, ArCHCH$_2$).

Synthesis of PCPMo
To a dry 20 mL scintillation vial, CPMo (7.0 g, 17.9 mmol, 700 equiv), MCPDB (54 mg, 0.179 mmol, 1.0 equiv), AIBN (4.4 mg, 0.0269 mmol, 0.15 equiv), and DMF (7.0 mL) were added and vortexed to form a homogenous solution. This solution was transferred to a flame-dried ampoule. After 4 freeze-pump-thaw cycles, the ampoule was sealed under vacuum. The polymerization was run for 12 hr at 85° C. The reaction mixture was then transferred into a 3.5 k MWCO Spectrum labs dialysis bag and left to dialyze for 24 hr in 1 L of water. The water was changed five times in this time. The resulting polymer solution was freeze-dried to yield the pure polymer as a brown solid (3.6 g, 51% yield). $^1$H NMR (500 MHz, CD$_3$OD) b 7.90-7.74 (b, 2H, —SC(ArH)S—), 7.67-6.26 (b, 300H, ArH), 4.77-4.46 (b, 150H, ArCH$_2$N), 3.87-3.62 (b, 600H, NCH$_2$CH$_2$O), 3.62-3.38 (b, 600H, NCH$_2$CH$_2$O), 3.29-3.03 (b, 225H, NCH$_3$), 2.55-1.04 (b, 225H, ArCHCH$_2$).

Procedures for RAFT Block Polymerization of PS-b-PCPR

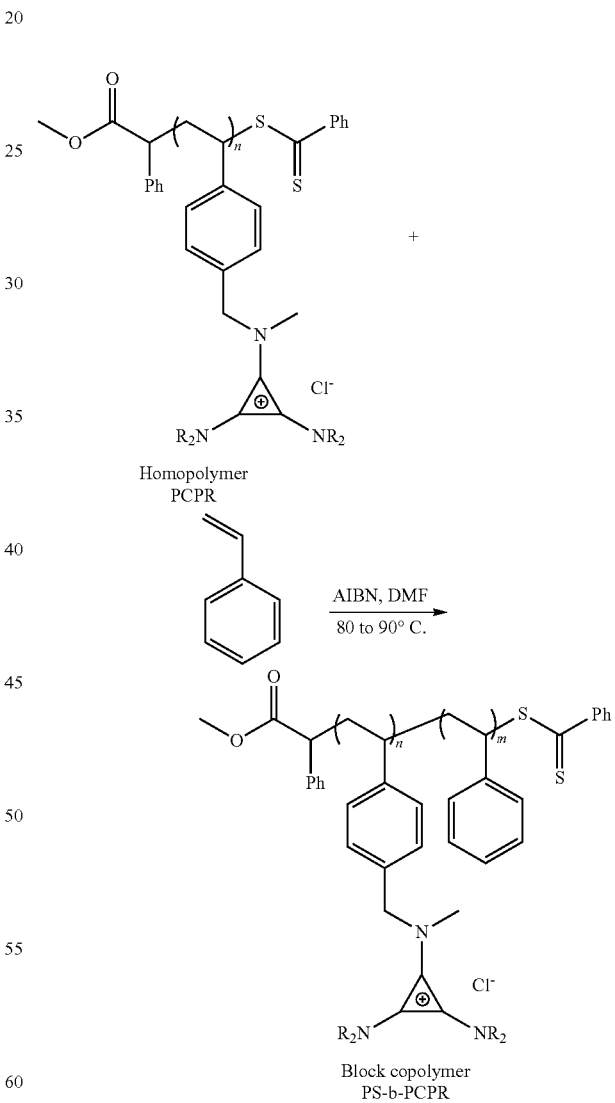

Synthesis of PS-b-PCPCy(45)
To a dry 20 mL scintillation vial, PCPCy (1.0 g, 0.029 mmol, 1.0 equiv), AIBN (7.0 mg, 4.3 mmol, 0.15 equiv), styrene (0.722 g, 6.93 mmol, 4 equiv), and DMF (1.75 mL) were added and vortexed to form a homogenous solution.

This solution was transferred to a flame-dried ampoule. After 4 freeze-pump-thaw cycles, the ampoule was sealed under vacuum. The polymerization was run for 12 hr at 80° C. The reaction mixture was precipitated from $CH_2Cl_2$ into hexanes 3 times. Drying in vacuo yielded the pure polymer as a pink powder (0.850 g, 70% yield). $^1$H NMR (500 MHz, $CDCl_3$) δ 7.90-7.78 (b, 2H, —SC(ArH)S—), 7.51-6.04 (b, 600H, ArH), 5.23-4.58 (b, 120H, $ArCH_2N$), 3.73-2.96 (b, 420H, NCyH, $NCH_3$), 2.05-0.75 (b, 2800H, CyH, $ArCHCH_2$).

Synthesis of PS-b-PCPCy(30)

To a dry 20 mL scintillation vial, PCPCy (1.0 g, 0.029 mmol, 1.0 equiv), AIBN (7.0 mg, 4.3 mmol, 0.15 equiv), styrene (1.08 g, 10.4 mmol, 6 equiv), and DMF (1.75 mL) were added and vortexed to form a homogenous solution. This solution was transferred to a flame-dried ampoule. After 4 freeze-pump-thaw cycles, the ampoule was sealed under vacuum. The polymerization was run for 12 hr at 80° C. The reaction mixture was precipitated from $CH_2Cl_2$ into hexanes 3 times. Drying in vacuo yielded the pure polymer as a pink powder (0.850 g, 60% yield). $^1$H NMR (500 MHz, $CDCl_3$) δ 7.90-7.78 (b, 2H, —SC(ArH)S—), 7.51-6.04 (b, 940H, ArH), 5.23-4.58 (b, 120H, $ArCH_2N$), 3.73-2.96 (b, 420H, NCyH, $NCH_3$), 2.05-0.75 (b, 3180H, CyH, $ArCHCH_2$).

Synthesis of PS-b-PCPiP(50)

To a dry flame-seal ampoule with stir bar, PCPiP (226.5 mg, 0.012 mmol, 1.0 equiv), AIBN (0.44 mg, 0.0027 mmol, 0.2 equiv), styrene (0.277 g, 2.66 mmol, 200 equiv), and DMF (0.130 mL) were added and vortexed to form a homogenous solution. After 4 freeze-pump-thaw cycles, the ampoule was sealed under vacuum. The polymerization was stirred vigorously for 8 hr at 100° C. The reaction mixture was precipitated from $CH_2Cl_2$ into −78° C. ethyl acetate 3 times. Drying in vacuo yielded the pure polymer as a pale pink powder (0.240 g, 88% yield). $^1$H NMR (500 MHz, $CDCl_3$) b 7.07-6.46 (b, 314H, ArH), 5.11-4.59 (b, 80H, $ArCH_2N$), 4.11-3.74 (b, 172H, $C_3NCH(iPr)_2$), 3.93-2.97 (b, 122H, $NCH_3$), 2.30-0.98 (b, 1600H, iPrH, $ArCHCH_2$).

Synthesis of PS-b-PCPiP(30)

To a dry flame-seal ampoule with stir bar, PCPiP (271 mg, 0.014 mmol, 1.0 equiv), AIBN (0.52 mg, 0.0032 mmol, 0.2 equiv), styrene (0.414 g, 3.99 mmol, 250 equiv), and DMF (0.240 mL) were added and vortexed to form a homogenous solution. After 4 freeze-pump-thaw cycles, the ampoule was sealed under vacuum. The polymerization was stirred vigorously for 24 hr at 100° C. The reaction mixture was precipitated from $CH_2Cl_2$ into −78° C. ethyl acetate 3 times. Drying in vacuo yielded the pure polymer as a pale pink powder (0.310 g, 65% yield). $^1$H NMR (500 MHz, $CDCl_3$) b 7.26-6.27 (b, 510H, ArH), 4.90-4.59 (b, 80H, $ArCH_2N$), 4.01-3.71 (b, 167H, $C_3NCH(iPr)_2$), 3.34-2.95 (b, 118H, $NCH_3$), 2.10-1.10 (b, 1690H, iPrH, $ArCHCH_2$).

Synthesis of PS-b-PCPiP(20)

To a dry flame-seal ampoule with stir bar, PCPiP (230 mg, 0.012 mmol, 1.0 equiv), AIBN (0.2 mg, 0.0012 mmol, 0.1 equiv), styrene (1.37 g, 13.2 mmol, 1000 equiv), and DMF (0.460 mL) were added and vortexed to form a homogenous solution. After 4 freeze-pump-thaw cycles, the ampoule was sealed under vacuum. The polymerization was stirred vigorously for 30 hr at 95° C. Such a large excess of styrene was used so the polymer would not precipitate out of solution during the reaction. The reaction mixture was precipitated from $CH_2Cl_2$ into a −78° C. solution of 25% ethyl acetate in hexanes 3 times. Drying in vacuo yielded the pure polymer as a pale pink powder (0.270 g, 62% yield). $^1$H NMR (400 MHz, $CDCl_3$) δ 7.26-6.24 (b, 900H, ArH), 4.95-4.59 (b, 80H, $ArCH_2N$), 4.01-3.77 (b, 176H, $C_3NCH(iPr)_2$), 3.27-3.01 (b, 126H, $NCH_3$), 2.02-0.94 (b, 1590H, iPrH, $ArCHCH_2$).

Synthesis of PS-b-PCPMo(50)

To a dry 20 mL scintillation vial, PCPMo (0.700 g, 0.024 mmol, 1.0 equiv), AIBN (0.59 mg, 0.0036 mmol, 0.15 equiv), styrene (0.75 g, 7.2 mmol, 4 equiv), and DMF (2.5 mL) were added and vortexed to form a homogenous solution. The large volume of DMF was necessary to totally dissolve PCPMo. This solution was transferred to a flame-dried ampoule. After 4 freeze-pump-thaw cycles, the ampoule was sealed under vacuum. The polymerization was run for 12 hr at 85° C. The reaction mixture was precipitated from $CH_2Cl_2$ into diethyl ether 2 times. Drying in vacuo yielded the pure polymer as a pink powder (0.820 g, 90% yield). $^1$H NMR (500 MHz, $(CD_3)_2SO$) δ 7.86-7.71 (b, 2H, —SC(ArH)S—), 7.47-6.09 (b, 760H, ArH), 4.90-4.28 (b, 150H, $ArCH_2N$), 3.85-3.54 (b, 600H, $NCH_2CH_2O$), 3.54-3.30 (b, 600H, $NCH_2CH_2O$), 3.22-2.86 (b, 225H, $NCH_3$), 2.15-1.12 (b, 500H, $ArCHCH_2$).

Synthesis of PS-b-PCPMo(35)

To a dry 20 mL scintillation vial, PCPMo (0.900 g, 0.031 mmol, 1.0 equiv), AIBN (0.76 mg, 0.0046 mmol, 0.15 equiv), styrene (2.3 g, 22.2 mmol, 10 equiv), and DMF (8.0 mL) were added and vortexed to form a homogenous solution. The large volume of DMF was necessary to totally dissolve PCPMo. This solution was transferred to a flame-dried ampoule. After 4 freeze-pump-thaw cycles, the ampoule was sealed under vacuum. The polymerization was run for 12 hr at 85° C. The reaction mixture was precipitated from $CH_2Cl_2$ into diethyl ether 2 times. Drying in vacuo yielded the pure polymer as a pink powder (1.19 g, 88% yield). $^1$H NMR (500 MHz, $(CD_3)_2SO$) δ 7.86-7.71 (b, 2H, —SC(ArH)S—), 7.58-6.05 (b, 1000H, ArH), 5.01-4.28 (b, 150H, $ArCH_2N$), 3.85-3.53 (b, 600H, $NCH_2CH_2O$), 3.53-3.24 (b, 600H, $NCH_2CH_2O$), 3.21-2.57 (b, 225H, $NCH_3$), 2.23-1.08 (b, 640H, $ArCHCH_2$).

Synthesis of PS-b-PCPMo(30)

To a dry 20 mL scintillation vial, PCPMo (0.900 g, 0.031 mmol, 1.0 equiv), AIBN (0.76 mg, 0.0046 mmol, 0.15 equiv), styrene (4.0 g, 38.9 mmol, 17 equiv), and DMF (11.25 mL) were added and vortexed to form a homogenous solution. The large volume of DMF was necessary to totally dissolve PCPMo. This solution was transferred to a flame-dried ampoule. After 4 freeze-pump-thaw cycles, the ampoule was sealed under vacuum. The polymerization was run for 12 hr at 85° C. The reaction mixture was precipitated from $CH_2Cl_2$ into diethyl ether 2 times. Drying in vacuo yielded the pure polymer as a pink powder (1.19 g, 82% yield). $^1$H NMR (500 MHz, $(CD_3)_2SO$) δ 7.86-7.71 (b, 2H, —SC(ArH)S—), 7.47-6.03 (b, 1175H, ArH), 4.92-4.30 (b, 150H, $ArCH_2N$), 3.81-3.54 (b, 600H, $NCH_2CH_2O$), 3.54-3.34 (b, 600H, $NCH_2CH_2O$), 3.21-2.92 (b, 225H, $NCH_3$), 2.21-0.92 (b, 750H, $ArCHCH_2$).

Procedures for RAFT random copolymerization of P(S-r-CPR)

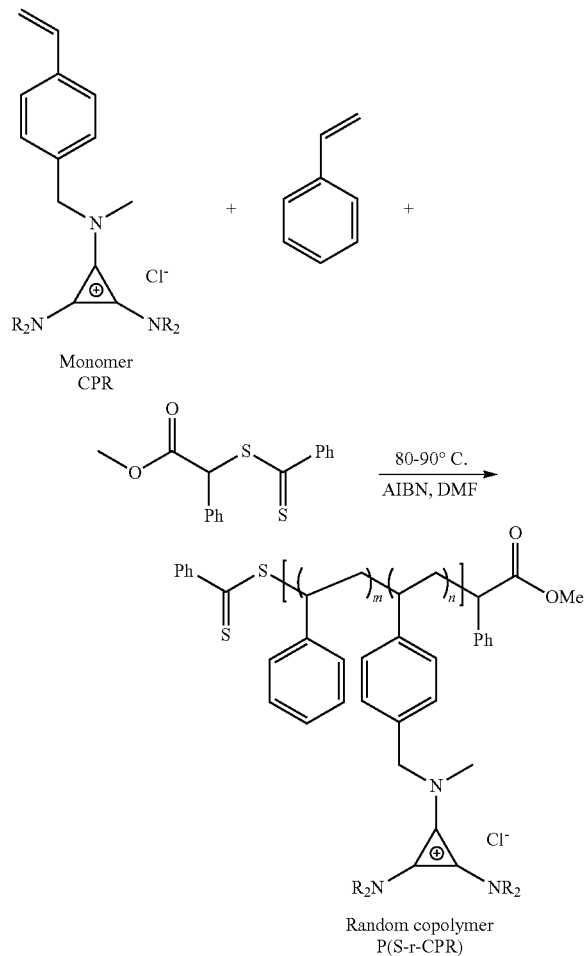

Monomer
CPR

Random copolymer
P(S-r-CPR)

Synthesis of P(S-r-CPCy)

To a dry 20 mL scintillation vial, CPCy (1.00 g, 1.73 mmol, 50.0 equiv), styrene (0.180 g, 1.73 mmol, 50.0 equiv), MCPDB (10.5 mg, 0.0346 mmol, 1.0 equiv), AIBN (0.852 mg, 0.00519 mmol, 0.15 equiv), and DMF (0.500 mL) were added and vortexed to form a homogenous solution. This solution was transferred to a flame-dried ampoule. After 4 freeze-pump-thaw cycles, the ampoule was sealed under vacuum. The polymerization was run for 12 hr at 80° C. The reaction mixture was precipitated three times into ethyl acetate and once in hexanes. Drying in vacuo yielded the pure polymer as a pink powder (790 mg, 67% yield). Integration of the $^1$H NMR showed approximately 35 units of CPCy and 35 units of styrene (50% CPCy incorporation). $^1$H NMR (500 MHz, CDCl$_3$) δ 7.89-7.69 (b, 2H, —SC(ArH)S—), 7.39-6.04 (b, 600H, ArH), 5.09-4.42 (b, 120H, ArCH$_2$N), 3.60-2.89 (b, 420H, NCyH, NCH$_3$), 2.09-0.77 (b, 2800H, CyH, ArCHCH$_2$).

Synthesis of P(S-r-CPiP)

To a dry, flame-seal ampoule with stir bar, CPiP (1.8 g, 4.24 mmol, 50 equiv), styrene (0.446 g, 4.29 mmol, 50 equiv), AIBN (1.4 mg, 0.0086 mmol, 0.1 equiv), 2-cyanopropan-2-yl benzodithioate (19 mg, 0.086, 1.0 equiv) and DMF (0.233 mL) were added and vortexed to form a homogenous solution. After 4 freeze-pump-thaw cycles, the ampoule was sealed under vacuum. The polymerization was stirred vigorously for 17 hr at 95° C. The reaction mixture was precipitated from CH$_2$Cl$_2$ into a −78° C. solution of 25% ethyl acetate in hexanes 3 times. Drying in vacuo yielded a pale pink powder composed of approximately 13 units of CPiP and 15 units of styrene (0.270 g, 62% yield, 47% incorporation of CPiP). $^1$H NMR (400 MHz, CDCl$_3$) δ 7.26-6.24 (b, 920H, ArH), 4.95-4.59 (b, 90H, ArCH$_2$N), 4.01-3.77 (b, 200H, C$_3$NCH(iPr)$_2$), 3.27-3.01 (b, 136H, NCH$_3$), 2.02-0.94 (b, 1750H, iPrH, ArCHCH$_2$).

Synthesis of P(S-r-CPMo)

To a dry 20 mL scintillation vial, CPMo (0.500 g, 1.28 mmol, 50.0 equiv), styrene (0.134 g, 1.28 mmol, 50.0 equiv), MCPDB (7.74 mg, 0.0256 mmol, 1.0 equiv), AIBN (0.632 mg, 0.00385 mmol, 0.15 equiv), and DMF (0.500 mL) were added and vortexed to form a homogenous solution. This solution was transferred to a flame-dried ampoule. After 4 freeze-pump-thaw cycles, the ampoule was sealed under vacuum. The polymerization was run for 12 hr at 90° C. The reaction mixture was precipitated once into −78° C. ethyl acetate to remove styrene. The precipitate was dissolved in water and transferred to a 1.0 k MWCO Spectrum Labs dialysis bag and left to dialyze for 24 hr in 1 L of water. The water was changed 5 times during this time. The resulting polymer was freeze-dried to yield pure polymer as a brown solid (0.190 g, 30% yield). Integration of the $^1$H NMR showed about 25 units of CPMo and 30 units of styrene (45% CPMo incorporation). $^1$H NMR (500 MHz, (CD$_3$)$_2$SO) δ 7.86-7.70 (b, 2H, —SC(ArH)S—), 7.56-6.18 (b, 1175H, ArH), 4.90-4.23 (b, 150H, ArCH$_2$N), 3.93-3.53 (b, 600H, NCH$_2$CH$_2$O), 3.53-3.17 (b, 600H, NCH$_2$CH$_2$O), 3.17-2.85 (b, 225H, NCH$_3$), 2.40-1.05 (b, 225H, ArCHCH$_2$).

Synthesis of Surfactant-Free Emulsion Particles

Particles were synthesized by following a general procedure that was scaled accordingly using 1-20 wt. % CPiP (relative to styrene), styrene, 2,2'-azobis(2-methylpropionamidine) dihydrochloride (V-50), and water. The final solution was scaled to 10 grams, with 10 wt. % monomer content. First, CPiP was dissolved in styrene and initiator was dissolved separately in 1 mL of water. The remaining volume of water was added to the monomer solution, and the V-50 solution was finally added to the monomer suspension. The mixture was vortexed for 30 seconds. The solution was added to a two-neck flask fitted with a condenser and stirbar, and was sparged with N$_2$ for 10 minutes. The solution was stirred at 70° C. for 6-16 hours.

DOCUMENTS

Albert, Julie N L, and Thomas H. Epps III. "Self-assembly of block copolymer thin films." *Materials Today* 13.6 (2010): 24-33.

Alexander, H. et al. A SAXS/WAXS/GISAXS beamline with multilayer monochromator. *J. Phys. Conf. Ser* 247, 012007 (2010).

Antoni et al., "Pushing the Limits for Thiol-Ene and CuAAC Reactions: Synthesis of a 6th Generation Dendrimer in a Single Day." *Macromolecules*, Vol. 43, pages 6625-6631 (2010).

Bandar, J. S. & Lambert, T. H. Enantioselective bronsted base catalysis with chiral cyclopropenimines. *J. Am. Chem. Soc.* 134, 5552-5555 (2012).

Bandar, J. S. & Lambert, T. H. Aminocyclopropenium ions: synthesis, properties, and applications. *Synthesis* 45, 2485-2498 (2013a).

Bandar, J. S. & Lambert, T. H. Cyclopropenimine-catalyzed enantioselective mannich reactions of tert-butyl glycinates with n-boc-imines. *J. Am. Chem. Soc.* 135, 11799-11802 (2013b).

Blackman, Melissa L. and Royzen, Maksim and Fox, Joseph M. (2008). "Tetrazine Ligation: Fast Bioconjugation Based on Inverse-Electron-Demand Diels-Alder Reactivity". Journal of the American Chemical Society 130 (41): 13518-13519

Bock et al., Eur. J. Org. Chem., 2006, 1, 51.

Boren, Brant C.; Narayan, Sridhar; Rasmussen, Lars K.; Zhang, Li; Zhao, Haitao; Lin, Zhenyang; Jia, Guochen; Fokin, Valery V. (2008). "Ruthenium-Catalyzed Azide-Alkyne Cycloaddition: Scope and Mechanism". Journal of the American Chemical Society 130 (28): 8923-8930. DOI:10.1021/ja0749993. PMID 18570425.

Breslow, R. Synthesis of the s-triphenylcyclopropenyl cation. *J. Am. Chem. Soc.* 79, 5318-5318 (1957).

Bruns, H. et al. Synthesis and coordination properties of nitrogen(i)-based ligands. *Angew. Chem. Int. Ed.* 49, 3680-3683 (2010).

Cabasso, I., "Membranes", in *Encyclopedia of Polymer Science and Engineering*, Vol. 9, pp. 509-579, John Wiley & Sons, Inc., New York (1987).

Campos et al., "Development of Thermal and Photochemical Strategies for Thio-Ene Click Polymer Functionalization", *Macromolecules*, Vol. 41, pages 7063-7070 (2008a).

Campos et al., "Highly Versatile and Robust Materials for Soft Imprint Lithography Based on Thiol-ene Click Chemistry", *Advanced Materials*, Vol. 20, pages 3728-3733 (2008b).

Chiefari, J. et al. Living free-radical polymerization by reversible addition-fragmentation chain transfer the RAFT process. *Macromolecules* 31, 55595562 (1998).

Chen, Y. et al. Enhancement of anhydrous proton transport by supramolecular nanochannels in comb polymers. *Nat. Chem.* 2, 503-508 (2010).

Choi, J.-H., Ye, Y., Elabd, Y. A. & Winey, K. I. Network structure and strong microphase separation for high ion conductivity in polymerized ionic liquid block copolymers. *Macromolecules* 46, 5290-5300 (2013).

Curnow, O. J., MacFarlane, D. R. & Waist, K. J. Triaminocyclopropenium salts as ionic liquids. *Chem. Commun.* 47, 10248-10250 (2011).

Curnow, O. J., Holmes, M. T., Ratten, L C., Waist, K. J. & Yunis, R. A facile route to functionalised, protic and chiral ionic liquids based on the triaminocyclopropenium cation. *RSC Adv.* 2, 10794-10797 (2012).

De Smedt, S., Demeester, J. & Hennink, W. Cationic polymer based gene delivery systems. *Pharm. Res.* 17, 113-126 (2000).

Decher, G. *Science*, vol. 277, pages 1232-1237 (1997).

Devaraj, Neal K. and Weissleder, Ralph and Hilderbrand, Scott A. (2008). "Tetrazine Based Cycloadditions: Application to Pretargeted Live Cell Labeling". Bioconjugate Chemistry 19 (12): 2297-2299.

Elimelech, M. & Phillip, W. A. The future of seawater desalination: energy, technology, and the environment. *Science* 333, 712-717 (2011).

Fairbanks et al., (2009) "Photoinitiated polymerization of PEG-diacrylate with lithium phenyl-2,4,6-trimethylbenzoylphosphinate: polymerization rate and cytocompatibility" Biomaterials. 30(35): 6702-6707.

Gao, R., Wang, D., Heflin, J. R. & Long, T. E. Imidazolium sulfonate-containing pentablock copolymer-ionic liquid membranes for electroactive actuators. *J. Mater. Chem.* 22, 13473-13476 (2012).

Gillies, E. R., et al., "Dendrimers and dendritic polymers in drug delivery, Drug Discovery Today, Vol. 10, pages 35-43 (2005).

Gin, D. L & Noble, R. D. Designing the next generation of chemical separation membranes. *Science* 332, 674-676 (2011).

Hallinan, D. T. & Balsara, N. P. Polymer electrolytes. *Annu. Rev. Mater. Res.* 43, 503-525 (2013).

Hawker, C. J., Bosman, A. W. & Harth, E. New polymer synthesis by nitroxide mediated living radical polymerizations. *Chem. Rev.* 101, 3661-3688 (2001).

Hemp, S. T. et al. Comparing ammonium and phosphonium polymerized ionic liquids: thermal analysis, conductivity, and morphology. *Macromol. Chem. Phys.* 214, 2099-2107 (2013).

Hickner, M. A., Herring, A. M. & Coughlin, E. B. Anion exchange membranes: current status and moving forward. *J. Polym. Sci. B Polym. Phys.* 51, 1727-1735 (2013).

Himo, T. Lovell, R. Hilgraf, V. V. Rostovtsev, L. Noodleman, K. B. Sharpless, V. V. Fokin (2005). "Copper(I)-Catalyzed Synthesis of Azoles, DFT Study Predicts Unprecedented Reactivity and Intermediates". Journal of the American Chemical Society 127: 210-216.

Hoarfrost, M. L, Tyagi, M. S., Segalman, R. A. & Reimer, J. A. Effect of confinement on proton transport mechanisms in block copolymer/ionic liquid membranes. *Macromolecules* 45, 3112-3120 (2012).

Hoyle, Charles E. and Bowman, Christopher N. (2010). "Thiol-Ene Click Chemistry". Angewandte Chemie International Edition 49 (9): 1540-1573.

Hückel, E. Grundziige der Theorie ungesattiger and aromatischer Verbindungen. *Z. Physik* 70, 77-85 (1938).

Huddleston, J. G. et al. Characterization and comparison of hydrophilic and hydrophobic room temperature ionic liquids incorporating the imidazolium cation. *Green Chem.* 3, 156-164 (2001).

Hunt, J. N. et al. Tunable, High modulus hydrogels driven by ionic coacervation. *Adv. Mater.* 23, 2327-2331 (2011).

Jangu, C. & Long, T. E. Phosphonium cation-containing polymers: from ionic liquids to polyelectrolytes. *Polymer* 55, 3298-3304 (2014).

Kenawy et al., "The Chemistry and Applications of Antimicrobial Polymers: A State-of-the-Art Review" *Biomacromolecules*, Vol. 8, pages 1359-1384 (2007).

Kerber, R. C. & Hsu, C. M. Substituent effects on cyclopropenium ions. *J. Am. Chem. Soc.* 95, 3239-3245 (1973).

Kesting, R., *Synthetic Polymeric Membranes: A Structural Perspective*, Wiley-Interscience, New York (1985).

Kolb, H. C.; Finn, M. G.; Sharpless, K. B. Angew. Chem. Int. Ed. 2001, 40, 2004-2021

Kolb, H. C.; Sharpless, K. B. Drug Disc. Today 2003, 8, 1128-1137; Lewis, W. G.; et al. Angew. Chem. Int. Ed. 2002, 41, 1053-1057

Krogman et al., *Nature Mater*, Vol. 8, pages 512-518 (2009).

Lee, L. V.; et al. J. Am. Chem. Soc. 2003, 125, 9588-9589.

Leibfarth, F. A. et al. A facile route to ketene-functionalized polymers for general materials applications. *Nat. Chem.* 2, 207-212 (2010).

Lodge, T. P. A unique platform for materials design. *Science* 321, 50-51 (2008).

Mai, Yiyong, and Adi Eisenberg. "Self-assembly of block copolymers." *Chemical Society Reviews* 41.18 (2012): 5969-5985.

Matyjaszewsld, K & Xia, J. Atom transfer radical polymerization. *Chem. Rev.* 101, 2921-2990 (2001).

McNulty, J.; Keskar, K; Vemula, R. (2011). "The First Well-Defined Silver(I)-Complex-Catalyzed Cycloaddition of Azides onto Terminal Alkynes at Room Temperature". Chemistry—A European Journal 17 (52): 14727-14730.

Moses, J. E. et al. (2007). "The growing applications of click chemistry". Chem. Soc. Rev. 36 (36): 1249-1262.

Nederberg, F. et al. Biodegradable nanostructures with selective lysis of microbial membranes. *Nat. Chem.* 3, 409-414 (2011).

Pan, J., Chen, C., Zhuang, L & Lu, J. Designing advanced alkaline polymer electrolytes for fuel cell applications. *Acc. Chem. Res.* 45, 473-481 (2011).

Park, M. J. et al. Increased water retention in polymer electrolyte membranes at elevated temperatures assisted by capillary condensation. *Nano Lett.* 7, 3547-3552 (2007).

Peart, P. A. & Tovar, J. D. Poly(cyclopropenone)s: formal inclusion of the smallest Hückel aromatic into it-conjugated polymers. *J. Org. Chem.* 75, 5689-5696 (2010).

Porter (1990) "Thin Film Composite Reverse Osmosis Membranes" *Handbook of Industrial Membrane Technology.* 307-348 (1990).

Qiu, B., Lin, B., Qiu, L. & Yan, F. Alkaline imidazolium- and quaternary ammonium-functionalized anion exchange membranes for alkaline fuel cell applications. *J. Mater. Chem.* 22, 1040-1045 (2012).

Ramos, J., Forcada, J. & Hidalgo-Alvarez, R. Cationic polymer nanoparticles and nanogels: from synthesis to biotechnological applications. *Chem. Rev.* 114, 367-428 (2013).

Rostovtsev et al., Angew. Chem. Int. Ed. 41, 2596-2599 (2002).

Rothberg, J. M. et al. An integrated semiconductor device enabling non-optical genome sequencing. *Nature* 475, 348-352 (2011).

Samal, S. K. et al. Cationic polymers and their therapeutic potential. *Chem. Soc. Rev.* 41, 7147-7194 (2012).

Schmidt-Rohr, K. & Chen, Q. Parallel cylindrical water nanochannels in Nafion fuel-cell membranes. *Nat. Mater.* 7, 75-83 (2008).

Sing, C. E., Zwanikken, J. W. & Olvera de la Cruz, M. Electrostatic control of block copolymer morphology. *Nat. Mater.* 13, 694-698 (2014).

Song et al., "Aqueous Synthesis Of Silver Nanoparticle Embedded Cationic Polymer Nanofibers And Their Antibacterial Activity" *Applied Materials And Interfaces*, vol. 4, pages 460-465 (2012).

Steele, B. C. H. & Heinzel, A. Materials for fuel-cell technologies. *Nature* 414, 345-352 (2001).

Stockmann, Henning; Neves, Andre; Stairs, Shaun; Brindle, Kevin; Leeper, Finian (2011). "Exploring isonitrile-based click chemistry for ligation with biomolecules". Organic & Biomolecular Chemistry.

Strathmann, H., "Synthetic Membranes and Their Preparation" in *Handbook of Industrial Membrane Technology*, M. Porter, ed., pp. 1-60, Noyes Publications, Park Ridge, N.J. (1990).

Sudre, G., Inceoglu, S., Cotanda, P. & Balsara, N. P. Influence of bound ion on the morphology and conductivity of anion-conducting block copolymers. *Macromolecules* 46, 1519-1527 (2013).

Takenaka, Mikihito, and Hirokazu Hasegawa. "Directed self-assembly of block copolymers." *Current Opinion in Chemical Engineering* (2012).

Texter, J. Anion responsive imidazolium-based polymers. *Macromol. Rapid Commun.* 33, 1996-2014 (2012).

Tobey, S. W. & West, R. Pentachlorocyclopropane. *J. Am. Chem. Soc.* 88, 2478-2481 (1966).

Tornoe, C. W.; Christensen, C.; Meldal, M. (2002). "Peptidotriazoles on Solid Phase: [1,2,3]-Triazoles by Regiospecific Copper(I)-Catalyzed 1,3-Dipolar Cycloadditions of Terminal Alkynes to Azides". Journal of Organic Chemistry 67 (9): 3057-3064.

Tornoe, C. W.; et al. J. Org. Chem. 2002, 67, 3057-3062

Vendra et al., "Polymer Thin Films for Biomedical Applications", *Nanomaterials for the Life Scicences Vol. 5: Nanostructured Thin Films and Surfaces*, Vol. 5, pages 1-54 (2010).

Wang, Q.; et al. J. Am. Chem. Soc. 2003, 125, 3192-3193.

Wang, R. & Lowe, A. B. RAFT polymerization of styrenic-based phosphonium monomers and a new family of well-defined statistical and block polyampholytes. *J. Polym. Sci. A Polym. Chem.* 45, 2468-2483 (2007).

Weber, R. L. et al. Thermal and ion transport properties of hydrophilic and hydrophobic polymerized styrenic imidazolium ionic liquids. *J. Polym. Sci. B Polym. Phys* 49, 1287-1296 (2011).

Weidner, C. H. & Long, T. E. Synthesis and characterization of 3-aryl-2-(polystyryl)cyclopropenones via cyclopropenium ion substitution on polystyrene. *J. Polym. Chem. A Polym. Chem.* 33, 1-6 (1995).

Wilcox and Breslow, Tetrahedron Letters, A convenient synthesis of bis-dialkylaminoacetylenes, 21, 3241-3242 (1980).

Wilde, M. M. D. & Gravel, M. Bis(amino)cyclopropenylidenes as organocatalysts for acyl anion and extended umpolung reactions. *Angew. Chem. Int. Ed.* 52, 12651-12654 (2013).

Ye, Y., Choi, J.-H., Winey, K. L & Elabd, Y. A. Polymerized ionic liquid block and random copolymers: effect of weak microphase separation on ion transport. *Macromolecules* 45, 7027-7035 (2012).

Ye, Y., Sharick, S., Davis, E. M., Winey, K. L & Elabd, Y. A. High hydroxide conductivity in polymerized ionic liquid block copolymers. *ACS Macro Lett.* 2, 575-580 (2013).

Yoshida, Z, "Heteroatom-Substituted Cyclopropenium Compounds", *Topics in Current Chemistry*, Vol. 40, page 47-72 (1973).

Yoshida, Z. & Tawara, Y. Aminocyclopropenium ion. *J. Am. Chem. Soc.* 93, 2573-2574 (1971).

Yoshida, Z., Tawara, Y., Hirota, S. & Ogoshi, H. Vibrational spectrum of trisdimethylaminocyclopropenium perchlorate. *Bull. Chem. Soc. Jpn* 47, 797800 (1974).

Yuan, J. & Antonietti, M. Poly(ionic liquid)s: polymers expanding classical property profiles. *Polymer* 52, 1469-1482 (2011).

Yuan, J., Mecerreyes, D. & Antonietti, M. Poly(ionic liquid) s: an update. *Prog. Polym. Sci.* 38, 1009-1036 (2013).

All documents cited in this application are hereby incorporated by reference as if recited in full herein.

Although illustrative embodiments of the present invention have been described herein, it should be understood that the invention is not limited to those described, and that various other changes or modifications may be made by one skilled in the art without departing from the scope or spirit of the invention.

What is claimed is:

1. A stable, polycationic compound made by a process for incorporating a cyclopropenium ion into a polymeric system comprising contacting a functionalized cyclopropenium ion with a functionalized compound capable of reacting with the functional group of the cyclopropenium ion for a period of time and under conditions suitable for the functionalized cyclopropenium and the functionalized compound to react and form a polymeric system that comprises a stable cyclopropenium cation that remains positively charged at a high pH, wherein the functionalized cyclopropenium ion is a compound of formula:

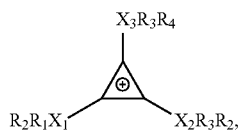

wherein $X_1R_1R_2$ is Cl, Br, F or I, or N bonded to $R_1$ and $R_2$, $X_2R_3R_2$ is Cl, Br, F or I, or N bonded to $R_2$ and $R_3$, and $X_3R_3R_4$ is Cl, Br, F or I, or N bonded to $R_3$ and $R_4$, wherein $R_{1-4}$ are independently selected from the group consisting of no atom, amino, aryl, heteroaryl, $C_{1-10}$alkoxy, $C_{2-10}$alkenyloxy, $C_{2-10}$alkynyloxy, $C_{1-10}$alkyl, $C_{3-10}$cycloalkyl, $C_{2-10}$alkenyl, $C_{3-10}$cycloalkenyl, $C_{2-10}$alkynyl, halogen, aryloxy, heteroaryloxy, $C_{2-10}$alkoxycarbonyl, $C_{1-10}$alkylthio, $C_{2-10}$alkenylthio, $C_{2-10}$alkynylthio, $C_{1-10}$alkylsulfonyl, $C_{1-10}$alkylsulfinyl, aryl-$C_{1-10}$alkyl, heteroaryl-$C_{1-10}$alkyl, aryl-$C_{1-10}$heteroalkyl, heteroaryl-$C_{1-10}$heteroalkyl, a phosphorous group, a silicon group and a boron group, wherein $R_1$ and $R_2$ or $R_3$ and $R_4$ are optionally combined to form a 5 to 8-membered carbocyclic or heterocyclic ring; further wherein the aliphatic or aromatic portions of $R_1$ and $R_2$ are optionally substituted with from 1 to 4 substituents selected from the group consisting of halogen, cyano, nitro, $C_{1-4}$alkyl, $C_{2-6}$alkenyl, $C_{2-6}$alkynyl, aryl, $C_{1-6}$alkoxy, $C_{2-6}$alkenyloxy, $C_{2-6}$alkynyloxy, aryloxy, $C_{2-6}$alkoxycarbonyl, $C_{1-6}$alkylthio, $C_{1-6}$alkylsulfonyl, $C_{1-6}$alkylsulfinyl, oxo, imino, thiono, primary amino, carboxyl, $C_{1-6}$alkylamino, $C_{1-6}$dialkylamino, amido, nitrogen heterocycles, hydroxy, thiol and phosphorous.

2. A polymer that comprises a stable cyclopropenium cation that remains positively charged at a high pH, the polymer having the structure:

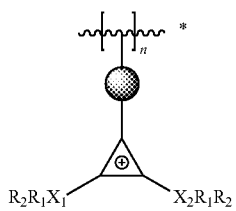

wherein
$X_{1-2}$ are independently selected from the group consisting of Cl, N, F, Br, and I;
$R_{1-2}$ are independently selected from the group consisting of no atom, amino, aryl, heteroaryl, $C_{1-10}$alkoxy, $C_{2-10}$alkenyloxy, $C_{2-10}$alkynyloxy, $C_{1-10}$alkyl, $C_{3-10}$cycloalkyl, $C_{2-10}$alkenyl, $C_{3-10}$cycloalkenyl, $C_{2-10}$alkynyl, halogen, aryloxy, heteroaryloxy, $C_{2-10}$alkoxycarbonyl, $C_{1-10}$alkylthio, $C_{2-10}$alkenylthio, $C_{2-10}$alkynylthio, $C_{1-10}$alkylsulfonyl, $C_{1-10}$alkylsulfinyl, aryl-$C_{1-10}$alkyl, heteroaryl-$C_{1-10}$alkyl, aryl-$C_{1-10}$heteroalkyl, heteroaryl-$C_{1-10}$heteroalkyl, a phosphorous group, a silicon group and a boron group, wherein $R_1$ and $R_2$ are optionally combined to form a 5 to 8-membered carbocyclic or heterocyclic ring; further wherein the aliphatic or aromatic portions of $R_1$ and $R_2$ are optionally substituted with from 1 to 4 substituents selected from the group consisting of halogen, cyano, nitro, $C_{1-4}$alkyl, $C_{2-6}$alkenyl, $C_{2-6}$alkynyl, aryl, $C_{1-6}$alkoxy, $C_{2-6}$alkenyloxy, $C_{2-6}$alkynyloxy, aryloxy, $C_{2-6}$alkoxycarbonyl, $C_{1-6}$alkylthio, $C_{1-6}$alkylsulfonyl, $C_{1-6}$alkylsulfinyl, oxo, imino, thiono, primary amino, carboxyl, $C_{1-6}$alkylamino, $C_{1-6}$dialkylamino, amido, nitrogen heterocycles, hydroxy, thiol and phosphorous;
wherein $X_1R_1R_2$ and $X_2R_1R_2$ are, individually, Cl, F, Br, I, or N bonded to $R_1$ and $R_2$,

represents a suitable linking group; and
n is an integer.

3. The polymer according to claim 2, wherein the polymer is selected from the group consisting of a linear polymer, a branched polymer, a cross-linked polymer, and a dendritic polymer.

4. The polymer according to claim 2, wherein the polymer is a homopolymer or a heteropolymer.

5. The polymer according to claim 4, wherein the heteropolymer is selected from the group consisting of a random copolymer, a block copolymer, and a graft copolymer.

6. The polymer according to claim 2, wherein the polymer backbone is formed from a monomer comprising a group selected from the group consisting of ethylene, propylene, styrene, (meth)acrylate, vinyl chloride, urethane, ethylene terephthalate, ester, amide, norbornene, silicon, ether, and combinations thereof.

7. The polymer according to claim 2, wherein the cyclopropenium cation remains positively charged in a pH range from 0 to greater than 14.

8. The polymer according to claim 2, wherein the cyclopropenium cation remains positively charged in a pH range from 8 to 13.

9. The A polymer that comprises a stable cyclopropenium cation that remains positively charged at a high pH, the polymer having the structure:

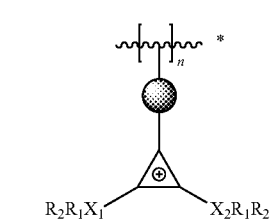

wherein
$X_{1-2}$ are independently selected from the group consisting of Cl, N, F, Br, and I;
$R_{1-2}$ are independently selected from the group consisting of no atom, amino, aryl, heteroaryl, $C_{1-10}$alkoxy, $C_{2-10}$alkenyloxy, $C_{2-10}$alkynyloxy, $C_{1-10}$alkyl, $C_{3-10}$cycloalkyl, $C_{2-10}$alkenyl, $C_{3-10}$cycloalkenyl, $C_{2-10}$alkynyl, halogen, aryloxy, heteroaryloxy, $C_{2-10}$alkoxycarbonyl, $C_{1-10}$alkylthio, $C_{2-10}$alkenylthio, $C_{2-10}$alkynylthio, $C_{1-10}$alkylsulfonyl, $C_{1-10}$alkylsulfinyl, aryl-$C_{1-10}$alkyl, heteroaryl-$C_{1-10}$alkyl, aryl-$C_{1-10}$heteroalkyl, heteroaryl-$C_{1-10}$heteroalkyl, a phosphorous group, a silicon group and a boron group, wherein $R_1$ and $R_2$ are optionally combined to form a 5 to 8-membered carbocyclic or heterocyclic ring; further wherein the aliphatic or aromatic portions of $R_1$ and $R_2$ are optionally substituted with from 1 to 4 substituents selected from the group consisting of halogen, cyano, nitro, $C_{1-4}$alkyl, $C_{2-6}$alkenyl, $C_{2-6}$alkynyl, aryl, $C_{1-6}$alkoxy, $C_{2-6}$alkenyloxy, $C_{2-6}$alkynyloxy, aryloxy, $C_{2-6}$alkoxycarbonyl, $C_{1-6}$alkylthio, $C_{1-6}$alkylsulfonyl, $C_{1-6}$alkylsulfinyl, oxo, imino, thiono, primary amino, carboxyl, $C_{1-6}$alkylamino, $C_{1-6}$dialkylamino, amido, nitrogen heterocycles, hydroxy, thiol and phosphorous;

wherein $X_1R_1R_2$ and $X_2R_1R_2$ are, individually, Cl, F, Br, I, or N bonded to $R_1$ and $R_2$,

represents a suitable linking group; and n is an integer, wherein $R_{1-2}$ are independently selected from the group consisting of

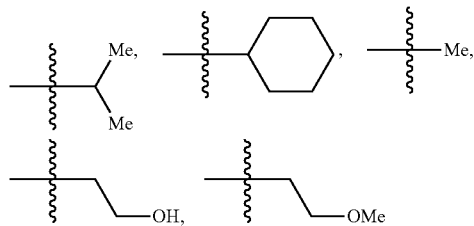

and combinations thereof.

10. A polymer selected from the group consisting of:

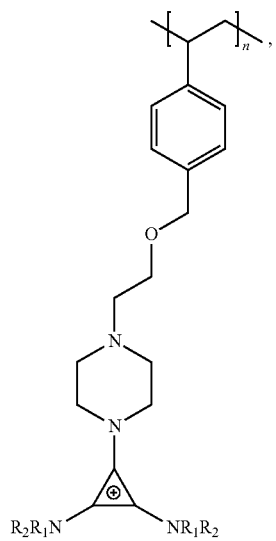

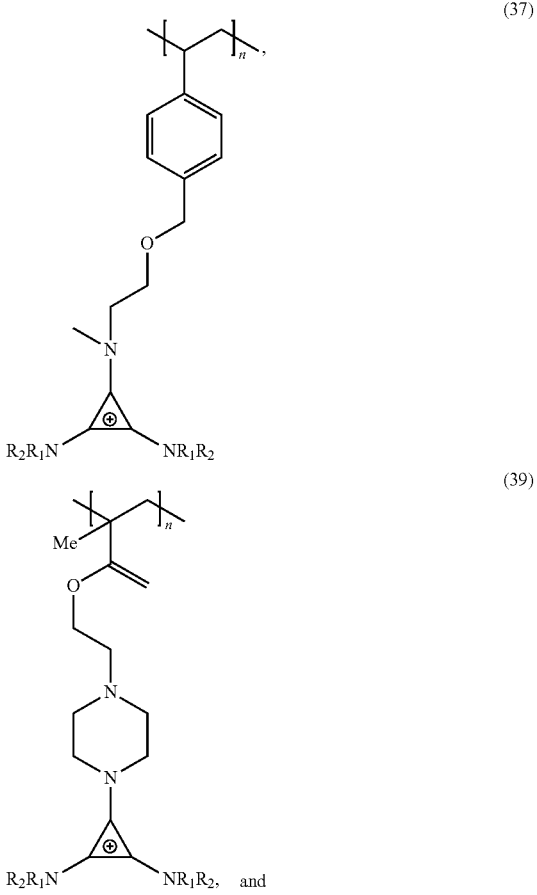

wherein:
$R_{1-2}$ are independently selected from the group consisting of no atom, amino, aryl, heteroaryl, $C_{1-10}$alkoxy, $C_{2-10}$alkenyloxy, $C_{2-10}$alkynyloxy, $C_{1-10}$alkyl, $C_{3-10}$cycloalkyl, $C_{2-10}$alkenyl, $C_{3-10}$cycloalkenyl, $C_{2-10}$alkynyl, halogen, aryloxy, heteroaryloxy, $C_{2-10}$alkoxycarbonyl, $C_{1-10}$alkylthio, $C_{2-10}$alkenylthio, $C_{2-10}$alkynylthio, $C_{1-10}$alkylsulfonyl, $C_{1-10}$alkylsulfinyl, aryl-$C_{1-10}$alkyl, heteroaryl-$C_{1-10}$alkyl, aryl-$C_{1-10}$heteroalkyl, heteroaryl-$C_{1-10}$heteroalkyl, a phosphorous group, a silicon group and a boron group, wherein $R_1$ and $R_2$ are optionally combined to form a 5 to 8-membered carbocyclic or heterocyclic ring; further wherein the aliphatic or aromatic portions of $R_1$ and $R_2$ are optionally substituted with from 1 to 4 substituents selected from the group consisting of halogen, cyano, nitro, $C_{1-4}$alkyl, $C_{2-6}$alkenyl, $C_{2-6}$alkynyl, aryl, $C_{1-6}$alkoxy, $C_{2-6}$alkenyloxy, $C_{2-6}$alkynyloxy, aryloxy, $C_{2-6}$alkoxycarbonyl, $C_{1-6}$alkylthio, $C_{1-6}$alkylsulfonyl, $C_{1-6}$alkylsulfinyl, oxo, imino, thiono, primary amino, carboxyl, $C_{1-6}$alkylamino, $C_{1-6}$dialkylamino, amido, nitrogen heterocycles, hydroxy, thiol and phosphorous;

and n is an integer.

11. A dendrimer having (1) a cationic core comprising a tri-functional cyclopropenium monomer and (2) at least two ordered dendritic core branches which (a) are covalently bonded to the cationic core, (b) extend through at least two generations, and (c) have at least 3 terminal groups per core branch.

12. The dendrimer according to claim 11, wherein the cationic core is:

(46)

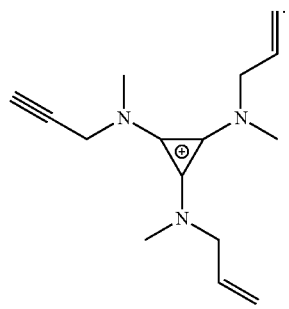

13. The dendrimer according to claim 11, wherein the dendritic core branches are independently selected from the group consisting of:

(47)

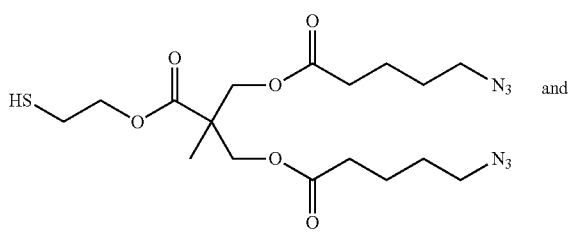

and (48)

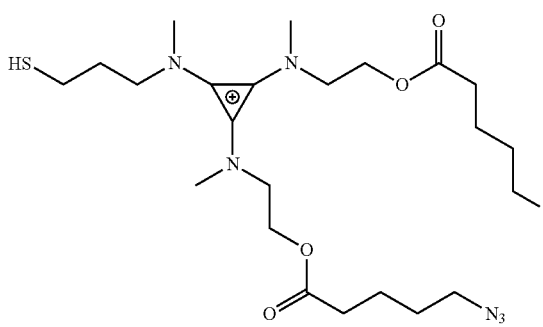

14. A drug delivery vehicle comprising a stable cationic dendritic polymer made by a process for making a dendritic polymer comprising the steps of:

a. providing a first functionalized compound comprising a cyclopropenium ion, which has a reactive group at each position of the ring; and b. grafting a second functionalized compound onto each reactive group of the first functionalized compound such that chemical bonds are formed between the first functionalized compound and the second functionalized compound at the reactive groups, the second functionalized compound including reactive groups capable of forming bonds with the reactive groups on the cyclopropenium ion, and wherein the bonds are formed through a click chemistry mechanism.

15. The compound according to claim 1, wherein the compound is self-assembling when contacted with a substrate, either as a consequence of interactions between molecules of the compounds, or of interactions between the compound and the surface of the substrate.

16. A polymer that comprises a stable cyclopropenium cation that remains positively charged at a high pH, the polymer having the structure:

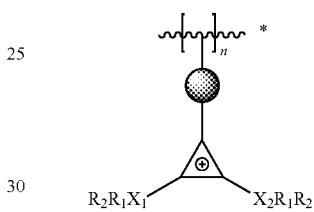

wherein $X_{1-2}$ are independently selected from the group consisting of Cl, N, F, Br, and I;

$R_{1-2}$ are independently selected from the group consisting of no atom, amino, aryl, heteroaryl, $C_{1-10}$alkoxy, $C_{2-10}$alkenyloxy, $C_{2-10}$alkynyloxy, $C_{1-10}$alkyl, $C_{3-10}$cycloalkyl, $C_{2-10}$alkenyl, $C_{3-10}$cycloalkenyl, $C_{2-10}$alkynyl, halogen, aryloxy, heteroaryloxy, $C_{2-10}$alkoxycarbonyl, $C_{1-10}$alkylthio, $C_{2-10}$alkenylthio, $C_{2-10}$alkynylthio, $C_{1-10}$alkylsulfonyl, $C_{1-10}$alkylsulfinyl, aryl-$C_{1-10}$alkyl, heteroaryl-$C_{1-10}$alkyl, aryl-$C_{1-10}$heteroalkyl, heteroaryl-$C_{1-10}$heteroalkyl, a phosphorous group, a silicon group and a boron group, wherein $R_1$ and $R_2$ are optionally combined to form a 5 to 8-membered carbocyclic or heterocyclic ring; further wherein the aliphatic or aromatic portions of $R_1$ and $R_2$ are optionally substituted with from 1 to 4 substituents selected from the group consisting of halogen, cyano, nitro, $C_{1-4}$alkyl, $C_{2-6}$alkenyl, $C_{2-6}$alkynyl, aryl, $C_{1-6}$alkoxy, $C_{2-6}$alkenyloxy, $C_{2-6}$alkynyloxy, aryloxy, $C_{2-6}$alkoxycarbonyl, $C_{1-6}$alkylthio, $C_{1-6}$alkylsulfonyl, $C_{1-6}$alkylsulfinyl, oxo, imino, thiono, primary amino, carboxyl, $C_{1-6}$alkylamino, $C_{1-6}$dialkylamino, amido, nitrogen heterocycles, hydroxy, thiol and phosphorous;

wherein $X_1R_1R_2$ and $X_2R_1R_2$ are, individually, Cl, F, Br, I, or N bonded to $R_1$ and $R_2$,

represents a suitable linking group; and n is an integer, wherein $R_{1-2}$ are independently selected from the group consisting of

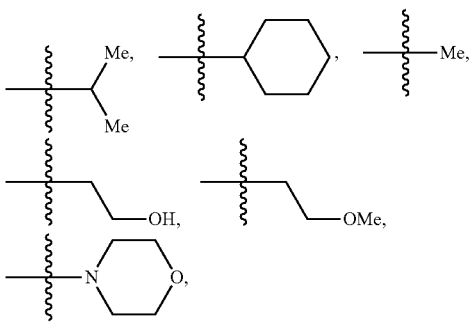

and combinations thereof.

17. A polymer of the formula:

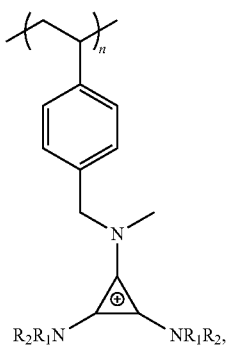

wherein:

$R_{1-2}$ are independently selected from the group consisting of no atom, amino, aryl, heteroaryl, $C_{1-10}$alkoxy, $C_{2-10}$alkenyloxy, $C_{2-10}$alkynyloxy, $C_{1-10}$alkyl, $C_{3-10}$cycloalkyl, $C_{2-10}$alkenyl, $C_{3-10}$cycloalkenyl, $C_{2-10}$alkynyl, halogen, aryloxy, heteroaryloxy, $C_{2-10}$alkoxycarbonyl, $C_{1-10}$alkylthio, $C_{2-10}$alkenylthio, $C_{2-10}$alkynylthio, $C_{1-10}$alkylsulfonyl, $C_{1-10}$alkylsulfinyl, aryl-$C_{1-10}$alkyl, heteroaryl-$C_{1-10}$alkyl, aryl-$C_{1-10}$heteroalkyl, heteroaryl-$C_{1-10}$heteroalkyl, a phosphorous group, a silicon group and a boron group, wherein $R_1$ and $R_2$ are optionally combined to form a 5 to 8-membered carbocyclic or heterocyclic ring; further wherein the aliphatic or aromatic portions of $R_1$ and $R_2$ are optionally substituted with from 1 to 4 substituents selected from the group consisting of halogen, cyano, nitro, $C_{1-4}$alkyl, $C_{2-6}$alkenyl, $C_{2-6}$alkynyl, aryl, $C_{1-6}$alkoxy, $C_{2-6}$alkenyloxy, $C_{2-6}$alkynyloxy, aryloxy, $C_{2-6}$alkoxycarbonyl, $C_{1-6}$alkylthio, $C_{1-6}$alkylsulfonyl, $C_{1-6}$alkylsulfinyl, oxo, imino, thiono, primary amino, carboxyl, $C_{1-6}$alkylamino, $C_{1-6}$dialkylamino, amido, nitrogen heterocycles, hydroxy, thiol and phosphorous;

and n is an integer.

18. The stable, polycationic compound of claim 1, wherein the process comprises emulsion polymerization.

* * * * *

UNITED STATES PATENT AND TRADEMARK OFFICE
CERTIFICATE OF CORRECTION

PATENT NO. : 10,385,150 B2  
APPLICATION NO. : 15/676686  
DATED : August 20, 2019  
INVENTOR(S) : Tristan Hayes Lambert et al.

Page 1 of 1

It is certified that error appears in the above-identified patent and that said Letters Patent is hereby corrected as shown below:

In the Claims

Claim 1, Column 89, Lines 12-17: the formula should read -- 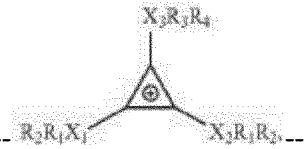 --

Claim 1, Column 89, Line 19: "X2R3R2 is Cl, Br, F or I, or N bonded to R2 and R3" should read --X2R1R2 is Cl, Br, F or I, or N bonded to R1 and R2--

Signed and Sealed this  
Twenty-ninth Day of March, 2022

Drew Hirshfeld  
*Performing the Functions and Duties of the*  
*Under Secretary of Commerce for Intellectual Property and*  
*Director of the United States Patent and Trademark Office*